(12) United States Patent
Nakazawa et al.

(10) Patent No.: US 12,677,079 B2
(45) Date of Patent: Jul. 7, 2026

(54) SOLID-STATE IMAGING ELEMENT, IMAGING DEVICE, AND METHOD FOR CONTROLLING SOLID-STATE IMAGING ELEMENT WITH A SAMPLE-AND-HOLD CIRCUIT INCLUDING A PLURALITY OF CAPACITOR ELEMENTS

(71) Applicant: SONY SEMICONDUCTOR SOLUTIONS CORPORATION, Kanagawa (JP)

(72) Inventors: Keigo Nakazawa, Kanagawa (JP); Ryohei Kawasaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 85 days.

(21) Appl. No.: 18/839,527

(22) PCT Filed: Dec. 28, 2022

(86) PCT No.: PCT/JP2022/048592
§ 371 (c)(1),
(2) Date: Aug. 19, 2024

(87) PCT Pub. No.: WO2023/162471
PCT Pub. Date: Aug. 31, 2023

(65) Prior Publication Data
US 2025/0159383 A1     May 15, 2025

(30) Foreign Application Priority Data
Feb. 28, 2022     (JP) ................................. 2022-029611

(51) Int. Cl.
*H04N 25/771*     (2023.01)
*H04N 23/741*     (2023.01)
(Continued)

(52) U.S. Cl.
CPC ......... *H04N 25/771* (2023.01); *H04N 23/741* (2023.01); *H04N 25/57* (2023.01);
(Continued)

(58) Field of Classification Search
CPC .... H04N 25/771; H04N 25/57; H04N 25/616; H04N 25/766; H04N 25/78; H04N 23/741
See application file for complete search history.

(56) References Cited

U.S. PATENT DOCUMENTS

| | | | | |
|---|---|---|---|---|
| 12,108,180 | B2 * | 10/2024 | Miyauchi | ................ H10F 39/18 |
| 2023/0156369 | A1 * | 5/2023 | Miyauchi | ................ H10F 39/18 |
| | | | | 348/308 |
| 2024/0089625 | A1 * | 3/2024 | Ikuma | ................... G01S 17/894 |

FOREIGN PATENT DOCUMENTS

| | | |
|---|---|---|
| JP | 2018-011162 A | 1/2018 |
| JP | 2019-057873 A | 4/2019 |
| JP | 2019-135815 A | 8/2019 |

OTHER PUBLICATIONS

International Search Report and Written Opinion of PCT Application No. PCT/JP2022/048592, issued on Mar. 20, 2023, 08 pages of ISRWO.

* cited by examiner

*Primary Examiner* — Nicholas G Giles
(74) *Attorney, Agent, or Firm* — CHIP LAW GROUP

(57) ABSTRACT
A circuit scale is reduced in a solid-state imaging element that combines a plurality of frames.
A pre-stage circuit generates an analog signal as a pixel signal. A sample-and-hold circuit holds a high gain signal obtained by amplifying the pixel signal with a gain corresponding to a capacitance of any of a plurality of capacitor elements, and generates a low gain signal obtained by amplifying the pixel signal with a gain corresponding to a
(Continued)

ratio of a combined capacitance of the plurality of capacitor elements to the capacitance. A post-stage circuit sequentially reads and outputs the high gain signal and the low gain signal from the sample-and-hold circuit.

16 Claims, 65 Drawing Sheets

(51) Int. Cl.
*H04N 25/57*          (2023.01)
*H04N 25/616*         (2023.01)
*H04N 25/766*         (2023.01)
*H04N 25/78*          (2023.01)
(52) U.S. Cl.
CPC ......... *H04N 25/616* (2023.01); *H04N 25/766* (2023.01); *H04N 25/78* (2023.01)

| OPERATION | NOISE | RN ( $\mu$ Vrms) | | REMARKS |
|---|---|---|---|---|
| | | SEVENTH EMBODIMENT | THIRTEENTH EMBODIMENT | |
| GLOBAL SHUTTER | PIXEL kTC NOISE | 450 | 450 | SH CAPACITANCE 50fF |
| SEQUENTIAL READING | NOISE OF PRE-STAGE SF | 380 | 0 | — |
| | NOISE AFTER SF IN SUBSEQUENT STAGE | 160 | 160 | INCLUDING ADC NOISE |
| TOTAL | | 610 | 478 | — |

SOLID-STATE IMAGING ELEMENT, IMAGING DEVICE, AND METHOD FOR CONTROLLING SOLID-STATE IMAGING ELEMENT WITH A SAMPLE-AND-HOLD CIRCUIT INCLUDING A PLURALITY OF CAPACITOR ELEMENTS

CROSS REFERENCE TO RELATED APPLICATIONS

This application is a U.S. National Phase of International Patent Application No. PCT/JP2022/048592 filed on Dec. 28, 2022, which claims priority benefit of Japanese Patent Application No. JP 2022-029611 filed in the Japan Patent Office on Feb. 28, 2022. Each of the above-referenced applications is hereby incorporated herein by reference in its entirety.

TECHNICAL FIELD

The present technology relates to a solid-state imaging element. More specifically, the present technology relates to a solid-state imaging element that amplifies a signal, an imaging device, and a method for controlling a solid-state imaging element.

BACKGROUND ART

In the related art, for the purpose of improving image quality, processing of combining a plurality of pieces of image data (in other words, frames) has been executed in an imaging device or the like. For example, there has been proposed a solid-state imaging element that holds a frame in a frame memory, amplifies a signal of the frame with each of a high gain and a low gain to generate two frames, and combines the frames (see, for example, Patent Document 1).

CITATION LIST

Patent Document

Patent Document 1: Japanese Patent Application Laid-Open No. 2018-011162

SUMMARY OF THE INVENTION

Problems to be Solved by the Invention

In the above-described related art, a dynamic range is expanded by combining a frame generated with high gain and a frame generated with low gain. However, the above-described solid-state imaging element requires a frame memory, which causes a problem in that a circuit scale increases accordingly.

The present technology has been made in view of such a situation, and an object of the present technology is to reduce a circuit scale in a solid-state imaging element that combines a plurality of frames.

Solutions to Problems

The present technology has been made to solve the above-described problems, and a first aspect thereof relates to a solid-state imaging element and a method for controlling the same, the solid-state imaging element including: a pre-stage circuit that generates an analog signal as a pixel signal; a sample-and-hold circuit that holds a high gain signal obtained by amplifying the pixel signal with a predetermined high gain in any of a plurality of capacitor elements, and generates a low gain signal obtained by amplifying the pixel signal with a low gain that is smaller than the high gain and corresponds to a combined capacitance of the plurality of capacitor elements; and a post-stage circuit that sequentially reads and outputs the high gain signal and the low gain signal from the sample-and-hold circuit. This brings about an effect of reducing a circuit scale.

Furthermore, in the first aspect, the plurality of capacitor elements may include a first capacitor element, a second capacitor element, a third capacitor element, and a fourth capacitor element, and the sample-and-hold circuit may include: the first capacitor element; the second capacitor element; the third capacitor element; the fourth capacitor element; and a selection circuit that connects one or more of the first capacitor element, the second capacitor element, the third capacitor element, and the fourth capacitor element to the post-stage circuit. This brings about an effect that a low gain signal is generated by connection of a plurality of capacitor elements.

Furthermore, in the first aspect, the pre-stage circuit, the sample-and-hold circuit, and the post-stage circuit may be disposed in each of a plurality of pixels, a level of the pixel signal may include a reset level when a floating diffusion layer in the pre-stage circuit is initialized and a signal level when a charge is transferred to the floating diffusion layer, the pre-stage circuit may generate the reset level immediately before a timing at which exposure of all of the plurality of pixels ends, and generate the signal level at the timing, and the selection circuit may connect the first capacitor element to the post-stage circuit immediately before the timing, and connect the third capacitor element to the post-stage circuit at the timing. This brings about an effect that the reset level and signal level are held at the end of exposure using the global shutter method.

Furthermore, in the first aspect, the selection circuit may sequentially perform control to connect the first capacitor element to the post-stage circuit, control to connect the first capacitor element and the second capacitor element to the post-stage circuit, control to connect the third capacitor element to the post-stage circuit, and control to connect the third capacitor element and the fourth capacitor element to the post-stage circuit within a read period of the pixel signal. This brings about an effect that high gain and low gain signals are generated.

Furthermore, in the first aspect, the selection circuit may sequentially perform control to connect the first capacitor element to the post-stage circuit, control to connect the first capacitor element and the second capacitor element to the post-stage circuit, and control to connect the third capacitor element to the post-stage circuit in a case where it is determined that the signal level does not exceed a predetermined determination value and to connect the third capacitor element and the fourth capacitor element to the post-stage circuit in a case where it is determined that the signal level is higher than the determination value within a read period of the pixel signal. This brings about an effect of improving a read speed.

Furthermore, in the first aspect, a determination circuit that determines whether or not the signal level is higher than the determination value and supplies a determination result to the sample-and-hold circuit may be further included. This brings about an effect of reducing a processing load on the post-stage circuit.

Furthermore, in the first aspect, the determination circuit may be disposed in each of the plurality of pixels. This brings about an effect of reducing the circuit scale at the subsequent stage of the pixel.

Furthermore, in the first aspect, the determination circuit may be disposed outside the plurality of pixels. This brings about an effect of reducing the circuit scale of the pixel.

Furthermore, in the first aspect, the determination circuit may compare a determination signal corresponding to the determination value with the high gain signal corresponding to the signal level to generate the determination result.

Furthermore, in the first aspect, an analog-to-digital converter that converts each of the high gain signal and the low gain signal into a digital signal on the basis of a predetermined ramp signal may be further included, and the determination circuit may compare the ramp signal with the high gain signal corresponding to the signal level to generate the determination result. This brings about an effect of reducing the amount of wiring.

Furthermore, in the first aspect, a coupling circuit may be further included, the pre-stage circuit, the sample-and-hold circuit, and the post-stage circuit may be disposed in each of a plurality of pixels, and the coupling circuit may couple the sample-and-hold circuit of each of a pair of pixels among the plurality of pixels. This brings about an effect of improving resolution.

Furthermore, in the first aspect, the coupling circuit may select and connect one of the sample-and-hold circuit of each of a pair of pixels arranged in a predetermined direction and the sample-and-hold circuit of each of a pair of pixels arranged in a direction perpendicular to the predetermined direction. This brings about an effect that the direction in which the resolution is improved is variable.

Furthermore, in the first aspect, a logic circuit that combines a frame in which digital signals obtained by converting the high gain signals are arranged and a frame in which digital signals obtained by converting the low gain signals are arranged may be further included. This brings about an effect of expanding the dynamic range.

Furthermore, in the first aspect, a post-stage reset transistor that initializes a predetermined post-stage node when the plurality of capacitor elements is disconnected from the post-stage node may be further included, the plurality of capacitor elements may include a first capacitor element, a second capacitor element, a third capacitor element, and a fourth capacitor element, the post-stage circuit may read the pixel signal via the post-stage node, and the sample-and-hold circuit may include: the first capacitor element; the second capacitor element; the third capacitor element; the fourth capacitor element; and a selection circuit that sequentially performs control to connect the first capacitor element to the post-stage node, control to disconnect the first capacitor element, the second capacitor element, the third capacitor element, and the fourth capacitor element from the post-stage node, and control to connect the third capacitor element to the post-stage node. This brings about an effect of reducing noise.

Furthermore, a second aspect of the present technology relates to an imaging device including: a pre-stage circuit that generates an analog signal as a pixel signal; a sample-and-hold circuit that holds a high gain signal obtained by amplifying the pixel signal with a predetermined high gain in any of a plurality of capacitor elements, and generates a low gain signal obtained by amplifying the pixel signal with a low gain that is smaller than the high gain and corresponds to a combined capacitance of the plurality of capacitor elements; a post-stage circuit that sequentially reads and outputs the high gain signal and the low gain signal from the sample-and-hold circuit; and a recording unit that records a frame generated from the high gain signal and the low gain signal. This brings about an effect of reducing a circuit scale of the imaging device.

BRIEF DESCRIPTION OF DRAWINGS

FIG. 63 is a diagram for describing effects according to the thirteenth embodiment of the present technology.

FIG. 64 is a block diagram illustrating a schematic configuration example of a vehicle control system.

MODE FOR CARRYING OUT THE INVENTION

Figure 1:
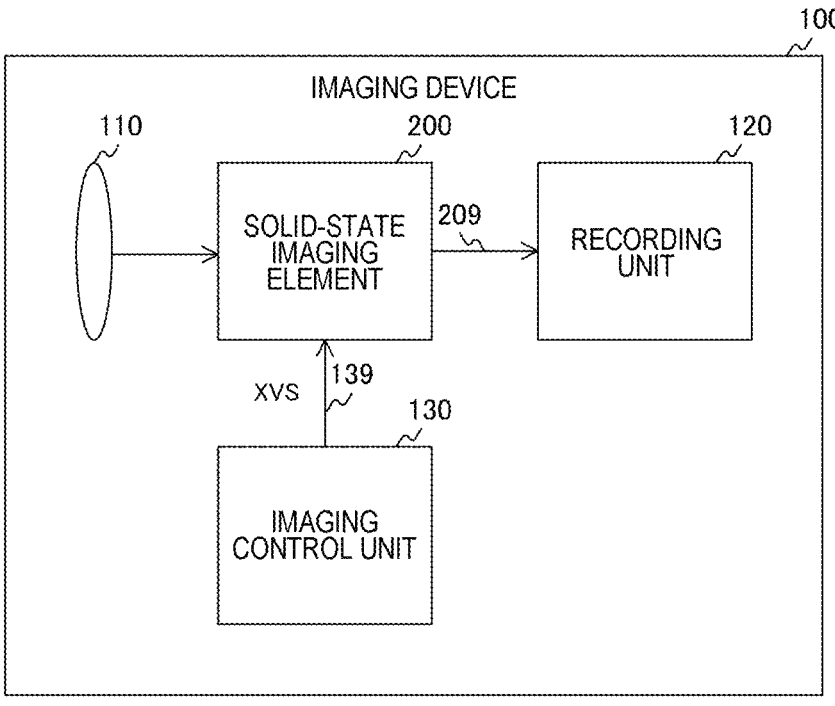
FIG. 1 is a block diagram illustrating a configuration example of an imaging device according to a first embodiment of the present technology.

Modes for carrying out the present technology (hereinafter referred to as embodiments) are hereinafter described. The description will be given in the following order.
1. First Embodiment (Example of Connecting Plurality Of Capacitor Elements)
2. Second Embodiment (Example of Connecting Plurality of Capacitor Elements According to Determination Result Within Pixel)
3. Third Embodiment (Example of Connecting Plurality of Capacitor Elements According to Determination Result Outside Pixel)
4. Fourth Embodiment (Example of Connecting Plurality of Capacitor Elements According to Determination Result Outside Pixel Using Ramp Signal)
5. Fifth Embodiment (Example of Connecting Respective Capacitor Elements of Plurality of Adjacent Pixels)
6. Sixth Embodiment (Example of Connecting Respective Capacitor Elements of Plurality of Pixels Adjacent in Horizontal Direction or Horizontal Direction)
7. Seventh Embodiment (Example of Initializing Post-Stage Node When Capacitor Element Is Disconnected)
8. Eighth Embodiment (Example of Adding Discharge Transistor)
9. Ninth Embodiment (Example of Controlling Reset Power Supply Voltage)
10. Tenth Embodiment (Example of Switching Level Held for Each Frame)
11. Eleventh Embodiment (Example of Suppressing Black Spot Phenomenon)
12. Twelfth Embodiment (Example of Rolling Shutter Operation)
13. Thirteenth Embodiment (Example in Which Pre-Stage Source Follower Is Brought into Off State During Reading)
14. Application Example to Mobile Body 1. First Embodiment Configuration Example of Imaging Device FIG. 1 is a block diagram illustrating a configuration example of an imaging device 100 according to a first embodiment of the present technology. The imaging device 100 is a device that captures image data (frames), and includes an imaging lens 110, a solid-state imaging element 200, a recording unit 120, and an imaging control unit 130. As the imaging device 100, a digital camera or an electronic device (a smartphone, a personal computer, or the like) having an imaging function is assumed.

The solid-state imaging element 200 captures frames under control of the imaging control unit 130. The solid-state imaging element 200 supplies frames to the recording unit 120 via a signal line 209.

The imaging lens 110 condenses light and guides the light to the solid-state imaging element 200. The imaging control unit 130 controls the solid-state imaging element 200 to capture frames. For example, the imaging control unit 130 supplies an imaging control signal including a vertical synchronization signal XVS to the solid-state imaging element 200 via a signal line 139. The recording unit 120 records frames.

Here, the vertical synchronization signal XVS is a signal indicating imaging timing, and a periodic signal of a constant frequency (60 hertz or the like) is used as the vertical synchronization signal XVS.

Note that, although the imaging device 100 records frames, the frames may be transmitted to the outside of the imaging device 100. In this case, an external interface for transmitting frames is further provided. Alternatively, the imaging device 100 may further display frames. In this case, a display section is further provided.

Configuration Example of Solid-State Imaging Element

Figure 2:
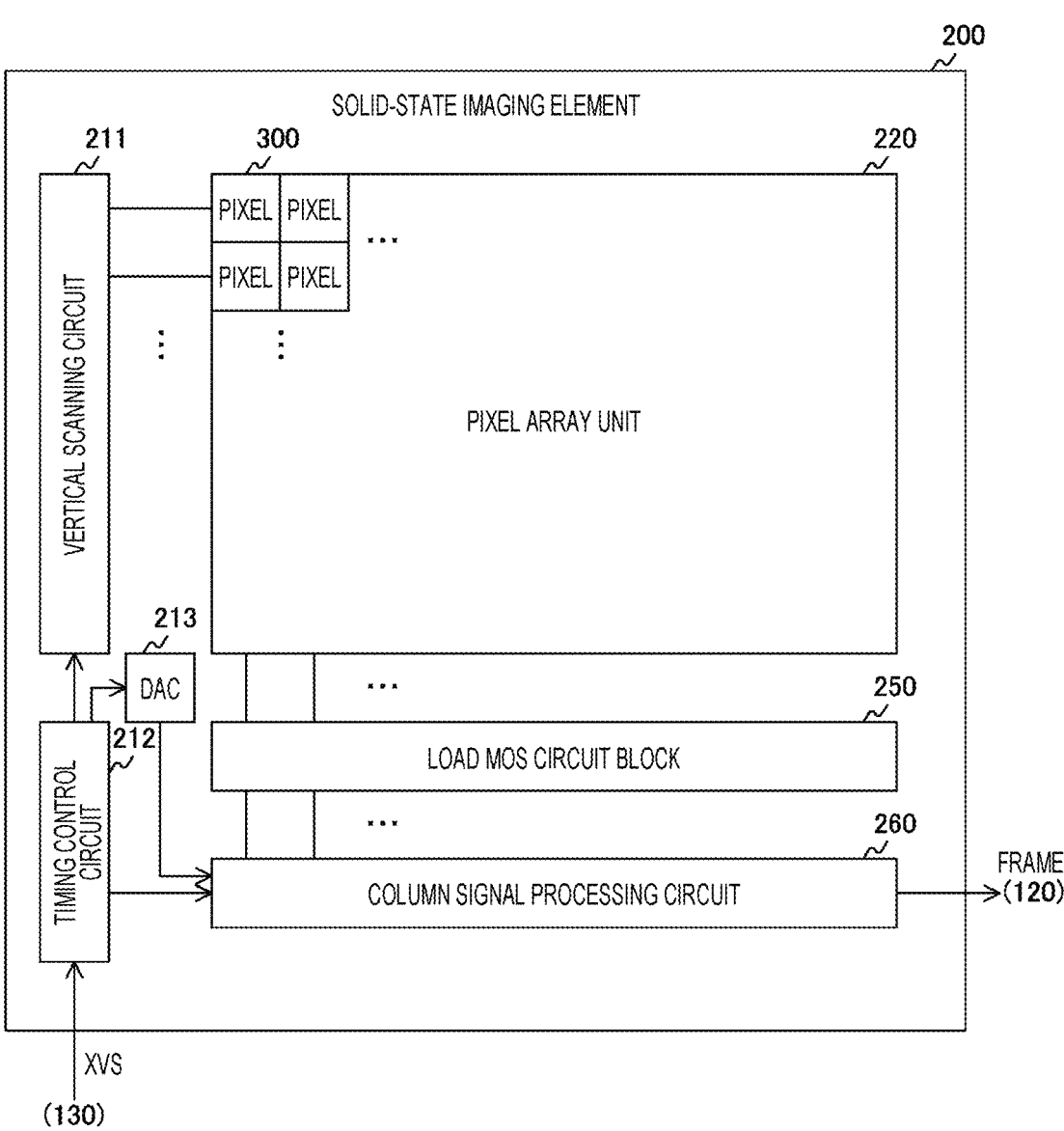
FIG. 2 is a block diagram illustrating a configuration example of a solid-state imaging element according to the first embodiment of the present technology.

FIG. 2 is a block diagram illustrating a configuration example of the solid-state imaging element 200 according to the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels 300 is arranged in a two-dimensional grid pattern. Furthermore, each circuit in the solid-state imaging element 200 is provided in, for example, a single semiconductor chip.

Hereinafter, a set of pixels 300 arranged in a horizontal direction is referred to as "row", and a set of pixels 300 arranged in a direction perpendicular to the row is referred to as "column".

The timing control circuit 212 controls operation timings of each of the vertical scanning circuit 211, the DAC 213, and the column signal processing circuit 260 in synchronization with the vertical synchronization signal XVS from the imaging control unit 130.

The DAC 213 generates a sawtooth-shaped ramp signal by digital to analog (DA) conversion. The DAC 213 supplies the generated ramp signal to the column signal processing circuit 260.

The vertical scanning circuit 211 sequentially selects and drives rows to output analog pixel signals. The pixel 300 photoelectrically converts incident light to generate the analog pixel signal. This pixel 300 supplies a pixel signal to the column signal processing circuit 260 via the load MOS circuit block 250.

In the load MOS circuit block 250, a MOS transistor that supplies a constant current is provided for each column.

The column signal processing circuit 260 executes signal processing such as analog to digital (AD) conversion processing and correlated double sampling (CDS) processing on the pixel signal for each column. The column signal processing circuit 260 supplies image data (frame) including the processed signals to the recording unit 120.

Configuration Example of Pixel

Figure 3:
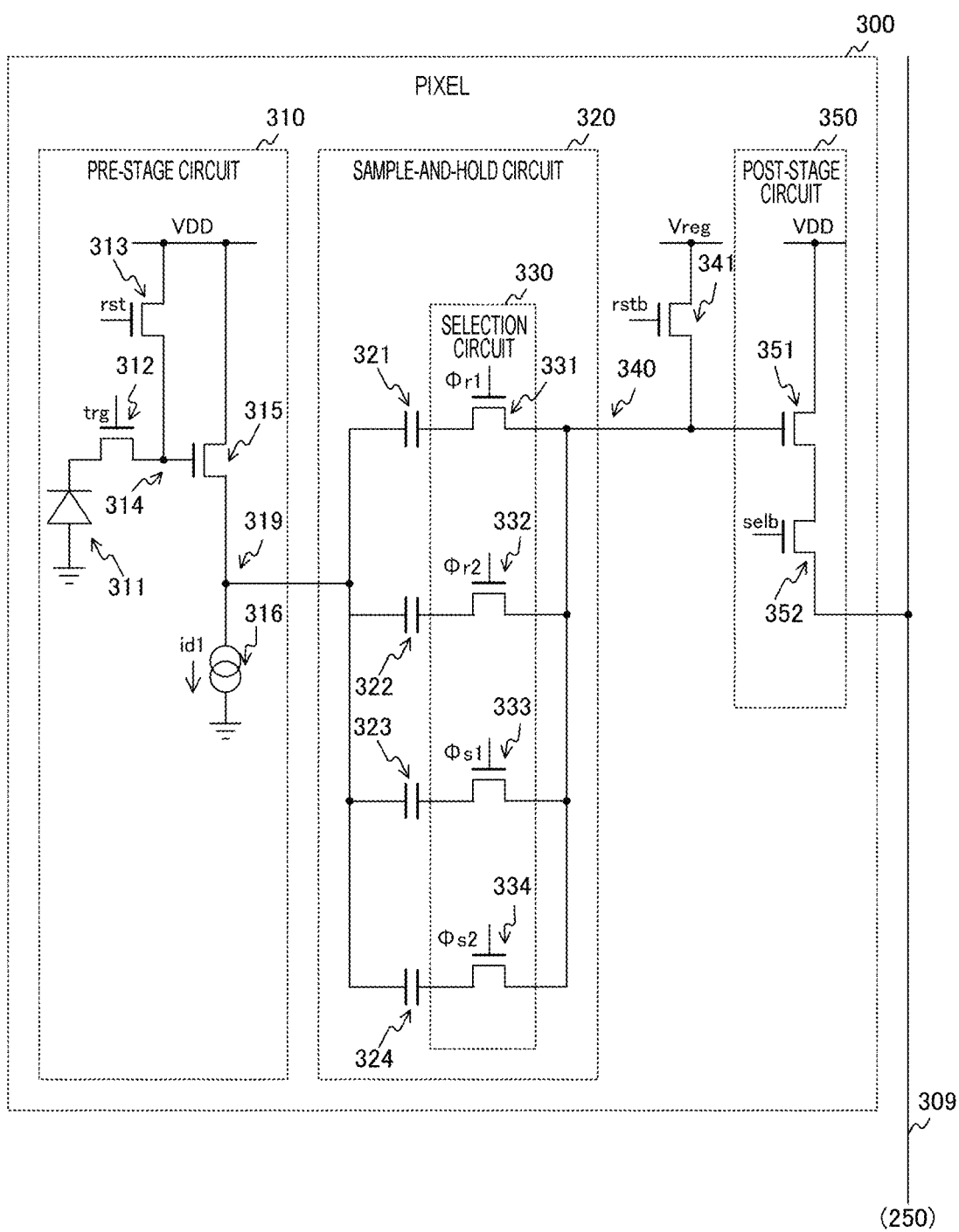
FIG. 3 is a circuit diagram illustrating a configuration example of a pixel according to the first embodiment of the present technology.

FIG. 3 is a circuit diagram illustrating a configuration example of the pixel 300 according to the first embodiment of the present technology. The pixel 300 includes a pre-stage circuit 310, a sample-and-hold circuit 320, a post-stage reset transistor 341, and a post-stage circuit 350.

The pre-stage circuit 310 includes a photoelectric conversion element 311, a transfer transistor 312, a floating diffusion (FD) reset transistor 313, an FD 314, a pre-stage amplification transistor 315, and a current source transistor 316.

The photoelectric conversion element 311 generates charges by the photoelectric conversion. The transfer transistor 312 transfers the charges from the photoelectric conversion element 311 to the FD 314 in accordance with a transfer signal trg from the vertical scanning circuit 211.

The FD reset transistor 313 extracts the charges from the FD 314 to initialize the FD 314 in accordance with an FD reset signal rst from the vertical scanning circuit 211. The FD 314 accumulates charges, and generates a voltage corresponding to a charge amount. The pre-stage amplification transistor 315 amplifies a level of a voltage of the FD 314, and outputs the amplified voltage to a pre-stage node 319.

Furthermore, the FD reset transistor 313 and the pre-stage amplification transistor 315 have their respective sources connected to a power supply voltage VDD. The current source transistor 316 is connected to a drain of the pre-stage amplification transistor 315. The current source transistor 316 supplies the current id1 under the control of the vertical scanning circuit 211.

The sample-and-hold circuit 320 samples and holds a pixel signal. The sample-and-hold circuit 320 includes capacitor elements 321, 322, 323, and 324 and a selection circuit 330.

The capacitor elements 321 to 324 have their respective one ends commonly connected to the pre-stage node 319 and have their respective other ends connected to the selection circuit 330. Note that the capacitor elements 321, 322, 323, and 324 are examples of a first capacitor element, a second capacitor element, a third capacitor element, and a fourth capacitor element described in the claims.

The selection circuit 330 includes selection transistors 331, 332, 333, and 334. The selection transistor 331 opens and closes a path between the capacitor element 321 and a post-stage node 340 in accordance with a selection signal Φr1 from the vertical scanning circuit 211. The selection transistor 332 opens and closes a path between the capacitor element 322 and a post-stage node 340 in accordance with a selection signal Φr2 from the vertical scanning circuit 211.

In addition, the selection transistor 333 opens and closes a path between the capacitor element 323 and the post-stage node 340 in accordance with a selection signal Φs1 from the vertical scanning circuit 211. The selection transistor 334 opens and closes a path between the capacitor element 324 and the post-stage node 340 in accordance with a selection signal Φs2 from the vertical scanning circuit 211.

The post-stage reset transistor 341 initializes a level of the post-stage node 340 to a predetermined potential Vreg in accordance with a post-stage reset signal rstb from the vertical scanning circuit 211. A potential different from the power supply potential VDD (for example, a potential lower than VDD) is set as the potential Vreg.

The post-stage circuit 350 includes a post-stage amplification transistor 351, and a post-stage selection transistor 352. The post-stage amplification transistor 351 amplifies the level of the post-stage node 340. The post-stage selection transistor 352 outputs a signal at the level amplified by the post-stage amplification transistor 351 to a vertical signal line 309 as a pixel signal in accordance with a post-stage selection signal selb from the vertical scanning circuit 211.

Note that, for example, n-channel metal oxide semiconductor (nMOS) transistors are used as various transistors (transfer transistor 312 and the like) in the pixel 300.

The vertical scanning circuit 211 supplies a high-level FD reset signal rst and a high-level transfer signal trg to all pixels at the start of exposure. Accordingly, the photoelectric conversion element 311 is initialized. Hereinafter, this control is referred to as "PD reset".

Then, the vertical scanning circuit 211 supplies a high-level FD reset signal rst over a pulse period while setting the post-stage reset signal rstb and the selection signal Φr1 to the high level for all pixels immediately before the end of exposure. Accordingly, the FD 314 is initialized, and a level corresponding to the level of the FD 314 at that time is held in the capacitor element 321. This control is hereinafter referred to as "FD reset". The level of the FD 314 at the time of the FD reset is hereinafter referred to as a "P-phase" or a "reset level".

At the end of exposure, the vertical scanning circuit 211 supplies a high-level transfer signal trg over the pulse period while setting the post-stage reset signal rstb and the selection signal Φs1 to the high level for all pixels. Accordingly, signal charges corresponding to an exposure amount are transferred to the FD 314, and a level corresponding to the level of the FD 314 at that time is held in the capacitor element 323. The level of the FD 314 at the time of signal charge transfer is hereinafter referred to as "D-phase" or "signal level".

The exposure control of simultaneously starting and ending the exposure for all pixels in this manner is called a global shutter method. Through this exposure control, the pre-stage circuit 310 of all pixels sequentially generates a reset level and a signal level. A level corresponding to the reset level is held in the capacitor element 321, and a level corresponding to the signal level is held in the capacitor element 323.

After the end of exposure, the vertical scanning circuit 211 sequentially selects a row, and sequentially outputs the reset level and the signal level of the row. In a case of outputting the reset level, the vertical scanning circuit 211 supplies a high-level selection signal Φr1 over a predetermined period while setting the FD reset signal rst and the post-stage selection signal selb of the selected row to the high level. Accordingly, the capacitor element 321 is connected to the post-stage node 340. The level held in the capacitor element 321 corresponds to a level obtained by amplifying the level (reset level) of the FD 314 at the time of FD reset by the pre-stage amplification transistor 315. The analog gain in this amplification is assumed to be G1.

Next, the vertical scanning circuit 211 supplies high-level selection signals Φr1 and Φr2 over a predetermined period while setting the FD reset signal rst and the post-stage selection signal selb of the selected row to the high level. Accordingly, the capacitor elements 321 and 322 are connected to the post-stage node 340. At this time, since the capacitor elements 321 and 322 are connected in parallel, their combined capacitance becomes larger than that of the capacitor element 321. Therefore, the level held in the coupled capacitor elements 321 and 322 is lower than in a case where only the capacitor element 321 is connected to the post-stage node 340.

If the capacitance value of the capacitor element 321 is assumed to be C1 and the capacitance value of the combined capacitance is assumed to be Cr, the level held in the capacitor elements 321 and 322 is a level obtained by amplifying the reset level with an analog gain of $G1 \times C1/Cr$. Since the combined capacitance Cr is larger than C1, the gain at the time of coupling the capacitor elements 321 and 322 is smaller than G1. Then, the vertical scanning circuit 211 supplies a high-level selection signal Φs1 over a predetermined period while setting the FD reset signal rst and the post-stage selection signal selb of the selected row to the high level. Accordingly, the capacitor element 323 is connected to the post-stage node 340. The level held in the capacitor element 323 corresponds to a level obtained by amplifying the level (signal level) of the FD 314 at the time of transfer by the pre-stage amplification transistor 315. The analog gain in this amplification is assumed to be G3.

Next, the vertical scanning circuit 211 supplies high-level selection signals Φs1 and Φs2 over a predetermined period while setting the FD reset signal rst and the post-stage selection signal selb of the selected row to the high level. Accordingly, the capacitor elements 323 and 324 are connected to the post-stage node 340. The gain at the time of coupling the capacitor elements 323 and 324 is smaller than G3.

Hereinafter, the gain (G1 or G3) in a case where the capacitor element 321 or 323 is connected is referred to as "high gain". On the other hand, the gain when the two capacitor elements (such as the capacitor elements 321 and 322) are coupled is smaller than the high gain, and thus is hereinafter referred to as "low gain".

Furthermore, the pixel signal (reset level or signal level) amplified with high gain is referred to as a "high gain signal", and the pixel signal amplified with low gain is referred to as a "low gain signal".

The post-stage circuit 350 of the selected row sequentially reads the high gain signal and the low gain signal via the post-stage node 340 and outputs the read high gain signal and low gain signal to the vertical signal line 309.

Through the above-described control, the pre-stage circuit 310 generates an analog pixel signal (reset level or signal level). The sample-and-hold circuit 320 holds a high gain signal obtained by amplifying a pixel signal with a predetermined high gain (G1 or G3) in the capacitor elements 321 and 323. Then, the sample-and-hold circuit 320 generates a low gain signal which is smaller than the high gain and obtained by amplifying the pixel signal with a low gain (G1×C1/Cr or the like) corresponding to the combined capacitance such as the capacitors 321 and 322.

Configuration Example of Column Signal Processing Circuit

Figure 4:
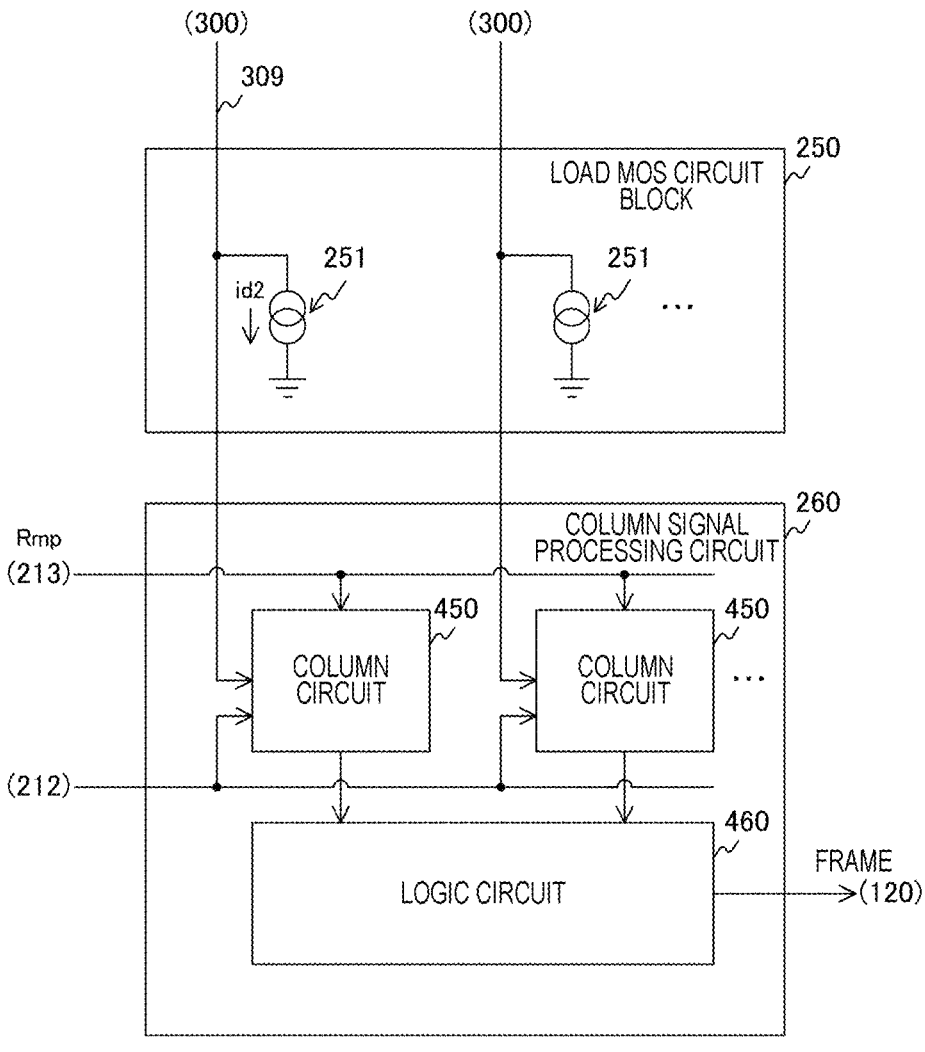
FIG. 4 is a block diagram illustrating a configuration example of a load MOS circuit block and a column signal processing circuit according to the first embodiment of the present technology.

FIG. 4 is a block diagram illustrating a configuration example of the load MOS circuit block 250 and the column signal processing circuit 260 according to the first embodiment of the present technology.

In the load MOS circuit block 250, the vertical signal line 309 is wired for each column. In a case where the number of columns is I (I is an integer), I vertical signal lines 309 are wired. Furthermore, a load MOS transistor 251 that supplies a constant current id2 is connected to each of the vertical signal lines 309.

In the column signal processing circuit 260, a plurality of column circuits 450 and a logic circuit 460 are disposed. The column circuits 450 are disposed for each column. If the number of columns is assumed to be I, I column circuits 450 are disposed.

The column circuit 450 performs AD conversion processing and CDS processing on the analog signal from the corresponding column. The column circuit 450 supplies the processed digital signal to the logic circuit 460.

The logic circuit 460 combines a frame in which digital signals obtained by converting high gain signals are arranged and a frame in which digital signals obtained by converting low gain signals are arranged. The dynamic range can be expanded by this composition, and this composition is called high-dynamic-range (HDR) composition. Furthermore, the logic circuit 460 performs various types of signal processing such as white balance correction processing and demosaic processing on the combined frame as necessary. Then, the logic circuit 460 outputs the processed frame to the recording unit 120.

Configuration Example of Column Circuit

Figure 5:
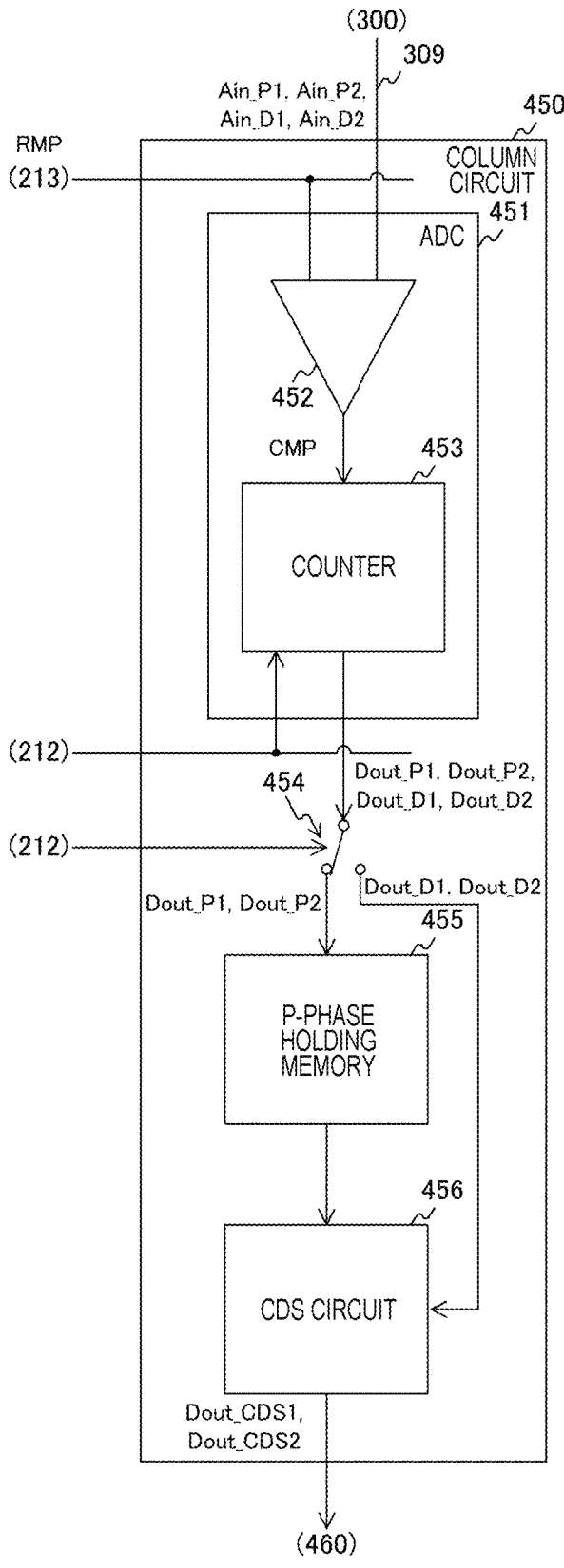
FIG. 5 is a block diagram illustrating a configuration example of a column circuit according to the first embodiment of the present technology.

FIG. 5 is a block diagram illustrating a configuration example of the column circuit 450 according to the first embodiment of the present technology. The column circuit 450 includes an ADC 451, a selector 454, a P-phase holding memory 455, and a CDS circuit 456.

The ADC 451 converts an analog signal into a digital signal. This ADC 451 includes a comparator 452 and a counter 453. The analog high gain signal and low gain signal from the corresponding column are input to the ADC 451. Among the high gain signals, a signal corresponding to the reset level (P-phase level) is assumed to be Ain_P1, and a signal corresponding to the signal level (D-phase level) is assumed to be Ain_D1. Among the low gain signals, a signal corresponding to the reset level is assumed to be Ain_P2, and a signal corresponding to the signal level is assumed to be Ain_D2.

The comparator 452 compares a ramp signal RMP from the DAC 213 with an analog signal from the corresponding column. The comparator 452 supplies a comparison result CMP to the counter 453.

The counter 453 counts a count value over a period until the comparison result CMP is inverted. The counter 453 supplies a digital signal indicating the count value to the selector 454. Digital signals corresponding to the analog signals Ain_P1, Ain_P2, Ain_D1, and Ain_D2 are assumed to be Dout_P1, Dout_P2, Dout_D1, and Dout_D2.

The selector 454 switches the output destination of the digital signal under the control of the timing control circuit 212. The selector 454 outputs the digital signals Dout_P1 and Dout_P2 corresponding to the P-phase level to the P-phase holding memory 455 to hold them. Furthermore, the selector 454 supplies the digital signals Dout_D1 and Dout_D2 corresponding to the D-phase level to the CDS circuit 456.

The P-phase holding memory 455 temporarily holds the digital signals Dout_P1 and Dout_P2. Since the P-phase holding memory 455 is provided for each column, the memory in which they are arranged is a line memory for two lines.

The CDS circuit 456 performs CDS processing of obtaining a difference between the reset level and the signal level. The CDS circuit 456 reads the digital signal Dout_P1 from the P-phase holding memory 455 and obtains a difference from the digital signal Dout_D1. The digital signal of the difference is assumed to be Dout_CDS1. In addition, the CDS circuit 456 reads the digital signal Dout_P2 from the P-phase holding memory 455 and obtains a difference from the digital signal Dout_D2. The digital signal of the difference is assumed to be Dout_CDS2.

The digital signals Dout_CDS1 and Dout_CDS2 are supplied to the logic circuit 460. The frame in which the digital signal Dout_CDS1 is arranged is a frame corresponding to high gain, and the frame in which the digital signal Dout_CDS2 is arranged is a frame corresponding to low gain. These frames are subjected to HDR composition.

Here, a configuration in which the sample-and-hold circuit 320 is not provided within the pixel and a frame memory is added is assumed as a comparative example.

Figure 6:
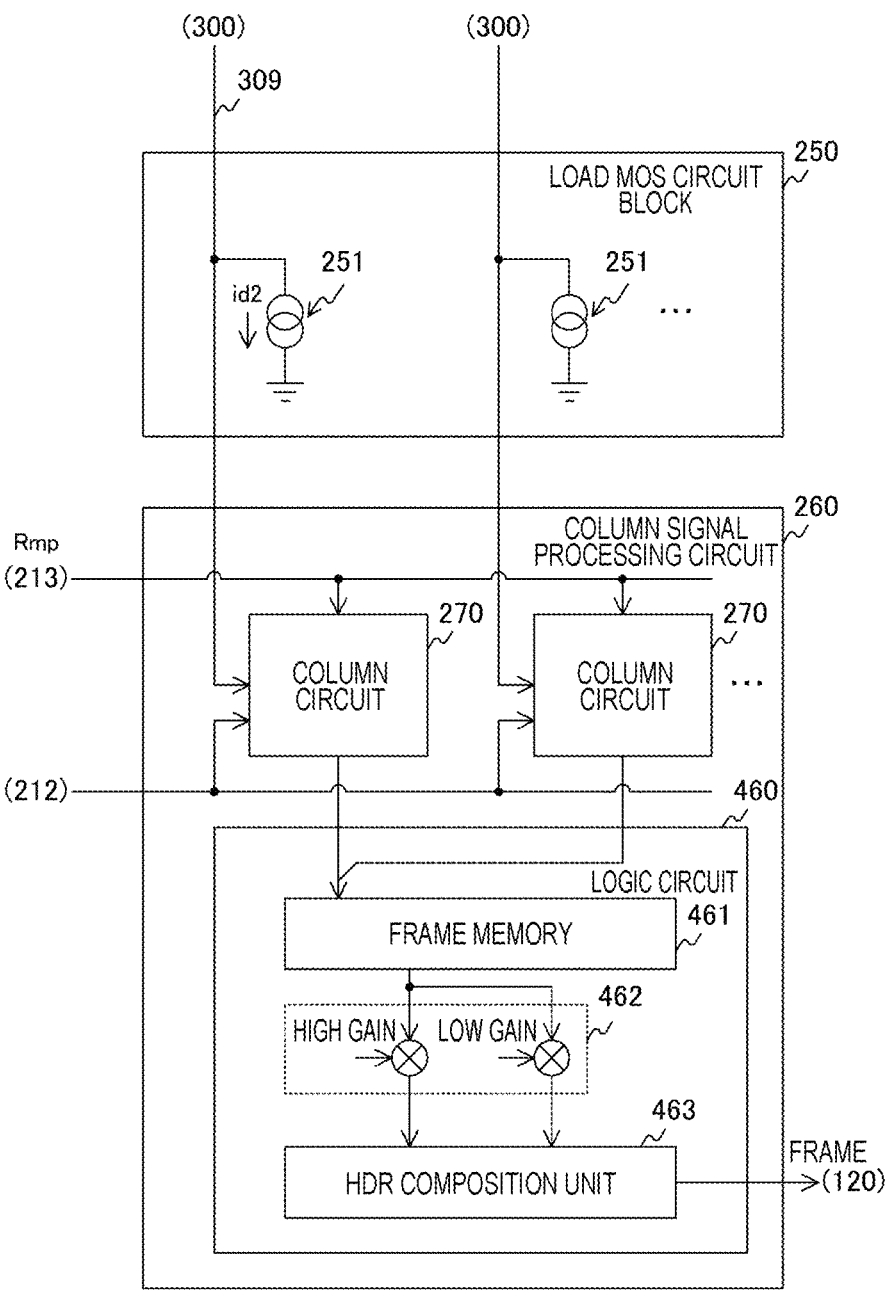
FIG. 6 is a block diagram illustrating a configuration example of a load MOS circuit block and a column signal processing circuit according to a comparative example.

FIG. 6 is a block diagram illustrating a configuration example of the load MOS circuit block 250 and the column signal processing circuit 260 according to the comparative example. The logic circuit 460 of the comparative example includes a frame memory 461, a multiplication circuit 462, and an HDR composition unit 463.

The frame memory 461 holds a frame in which digital signals after AD conversion and CDS processing are arranged.

The multiplication circuit 462 amplifies each of the digital signals in the frame held in the frame memory 461 with digital high gain or low gain. Accordingly, two frames having different gains are generated and supplied to the HDR composition unit 463. The HDR composition unit 463 combines two frames from the multiplication circuit 462.

In the comparative example in which the sample-and-hold circuit 320 is not provided within the pixel, a high gain signal and a low gain signal cannot be generated within the pixel. Therefore, it is necessary for the multiplication circuit 462 to generate a high gain signal and a low gain signal by amplifying one frame with digital high gain and low gain. In this case, the frame memory 461 is required to hold the digital signal to be amplified.

On the other hand, in a case where the sample-and-hold circuit 320 having a circuit configuration is provided for each pixel as illustrated in FIG. 3, each of the pixels can generate and hold a high gain signal and a low gain signal. Assuming that the number of pixels is N, a total of N sample-and-hold circuits 320 in all pixels can be considered as analog memories capable of holding a frame. Therefore, it is not necessary to provide the frame memory 461 at the subsequent stage of the pixel. As described above, the line memory for holding the P-phase level is necessary, but the frame memory 461 is unnecessary, so that the circuit scale can be reduced as compared with the comparative example.

Operation Example of Solid-State Imaging Element

Figure 7:
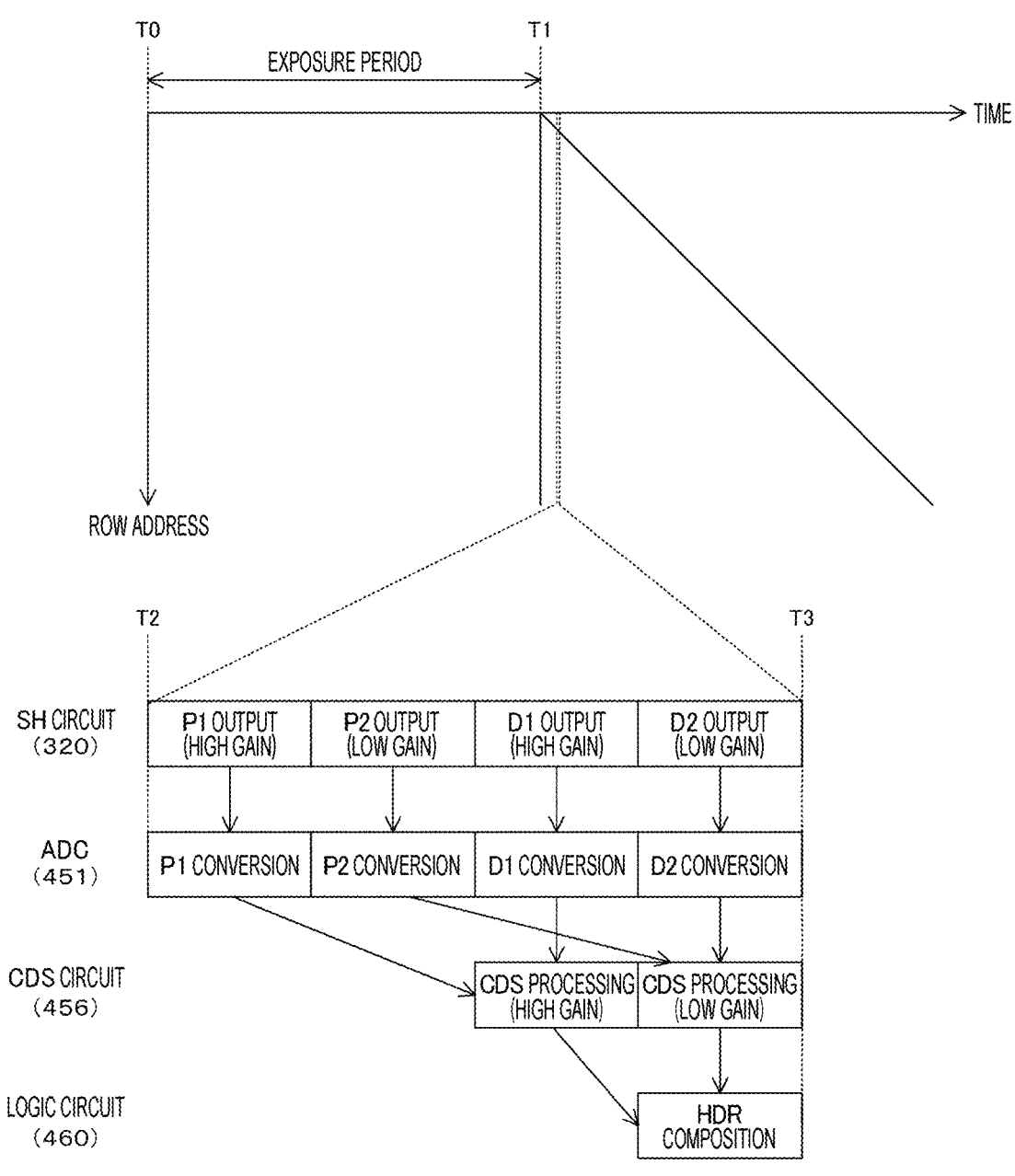
FIG. 7 is a timing chart illustrating an example of an operation of the solid-state imaging element according to the first embodiment of the present technology.

FIG. 7 is a timing chart illustrating an example of an operation of the solid-state imaging element 200 according to the first embodiment of the present technology. The vertical scanning circuit 211 exposes all pixels over the exposure period from timing T0 to timing T1. That is, the pixel array unit 220 is exposed by the global shutter method. At the end of exposure, the sample-and-hold circuit 320 of each pixel holds a high gain signal obtained by amplifying the P-phase level and the D-phase level with high gain. A high gain signal corresponding to the P-phase level is assumed to be P1, and a high gain signal corresponding to the D-phase level is assumed to be D1.

After timing T1, the pixel signals are sequentially read for each row. It is assumed that a read period of a certain row is from timing T2 to timing T3.

Within the read period, the sample-and-hold circuit 320 in the corresponding row outputs a held high gain signal P1, and generates and outputs the low gain signal P2 by coupling the capacitor elements 321 and 322. Then, the sample-and-hold circuit 320 outputs the held high gain signal D1, and generates and outputs the low gain signal D2 by coupling the capacitor elements 323 and 324.

The ADC 451 in the corresponding row converts each of the analog P1, P2, D1, and D2 into a digital signal. The CDS circuit 456 obtains a difference between the digital signal corresponding to P1 and the digital signal corresponding to D1, and supplies the difference to the logic circuit 460. In addition, the CDS circuit 456 obtains a difference between the digital signal corresponding to P2 and the digital signal corresponding to D2, and supplies the difference to the logic circuit 460. The logic circuit 460 performs HDR composition.

Figure 8:
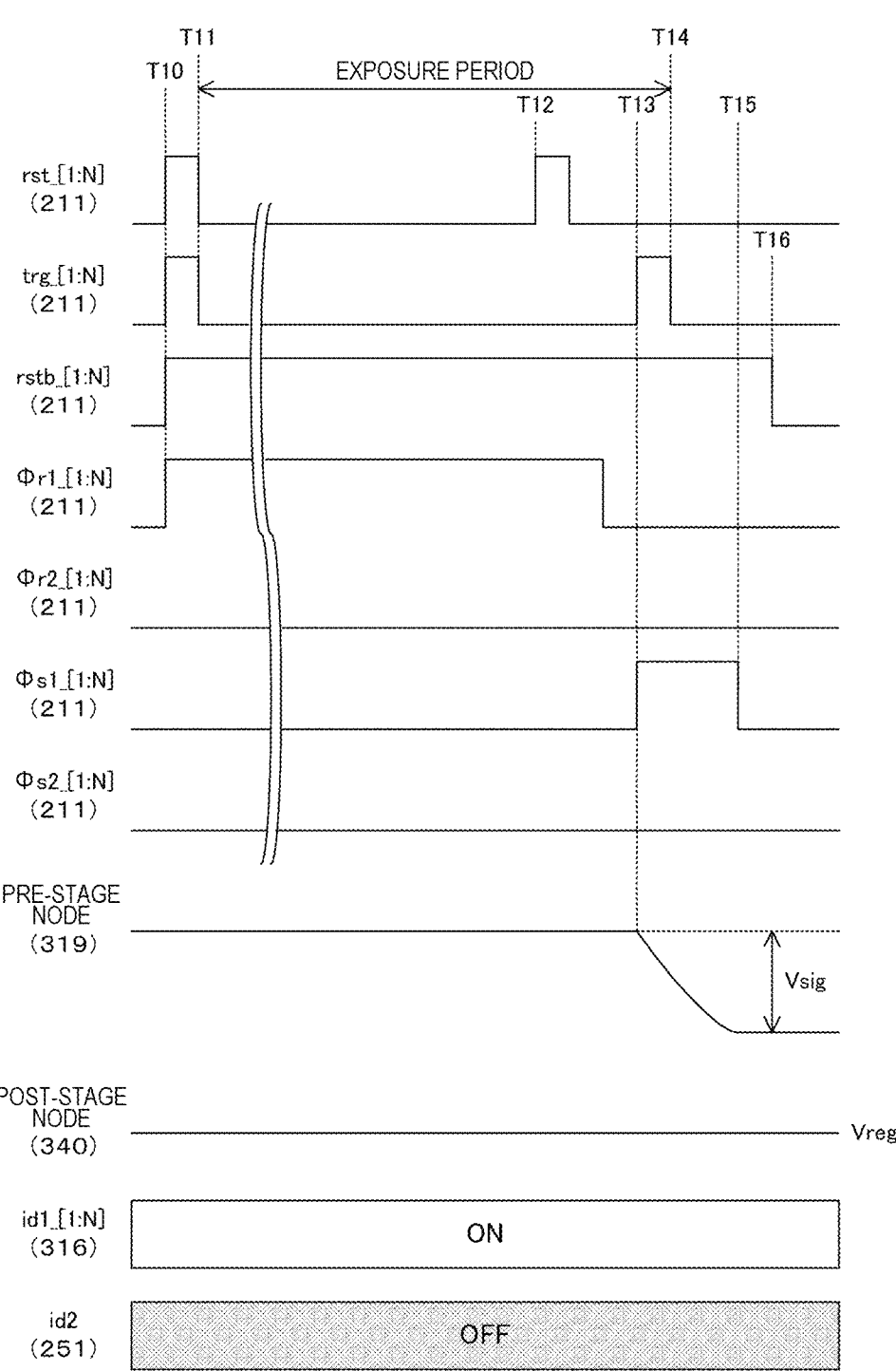
FIG. 8 is a timing chart illustrating an example of a global shutter operation according to the first embodiment of the present technology.

FIG. 8 is a timing chart illustrating an example of a global shutter operation according to the first embodiment of the present technology. This drawing illustrates details of control of the exposure period in FIG. 7. The vertical scanning circuit 211 sets the post-stage reset signal rstb and the selection signal Φr1 to the high level for all rows (in other words, all pixels) at timing T10 immediately before the start of the exposure.

Furthermore, the vertical scanning circuit 211 supplies a high-level FD reset signal rst and the high-level transfer signal trg to all rows over a period from timing T10 to timing T11 after the pulse period has elapsed. Accordingly, all pixels are PD reset, and the exposure simultaneously starts in all rows.

Here, rst_[n], trg_[n], rstb_[n], Φr1_[n], Φr2_[n], Φs1_[n], and Φs2_[n] in the drawing indicate signals to pixels in an n-th row among N rows. N is an integer indicating the total number of rows, and n is an integer from 1 to N.

Then, at timing T12 immediately before the end of the exposure period, the vertical scanning circuit 211 supplies a high-level FD reset signal rst over the pulse period while setting the post-stage reset signal rstb and the selection signal Φr1 to the high level for all pixels. Accordingly, the pre-stage circuit 310 of all pixels generates the reset level, and the selection circuit 330 connects only the capacitor element 321 to the post-stage circuit 350. As a result, a signal obtained by amplifying the reset level with high gain is sampled and held.

Within the pulse period from timing T13 to timing T14 at the end of exposure, the vertical scanning circuit 211 supplies a high-level transfer signal trg while setting the post-stage reset signal rstb and the selection signal Φs1 to the high level for all pixels. Accordingly, the pre-stage circuit 310 of all pixels generates the signal level, and the selection circuit 330 connects only the capacitor element 323 to the post-stage circuit 350. As a result, the signal obtained by amplifying the signal level with high gain is sampled and held. The level of the pre-stage node 319 decreases by Vsig. Here, Vsig is a net signal level obtained by the CDS processing.

At timing T15 after timing T14, the vertical scanning circuit 211 returns the selection signal Φs1 to the low level, and returns the post-stage reset signal rstb to the low level at the later timing T16.

Furthermore, the vertical scanning circuit 211 controls the current source transistors 316 of all rows (all pixels) to supply a current id1. Here, id1_[n] in the drawing indicates a current of pixels in the n-th row. The larger the current id, the larger IR drop becomes, so that it is required that the current id1 be on the order of several nanoamperes (nA) to several tens of nanoamperes (nA). On the other hand, the load MOS transistors 251 of all columns are in the off state, and the current id2 is not supplied to the vertical signal line 309.

Figure 9:
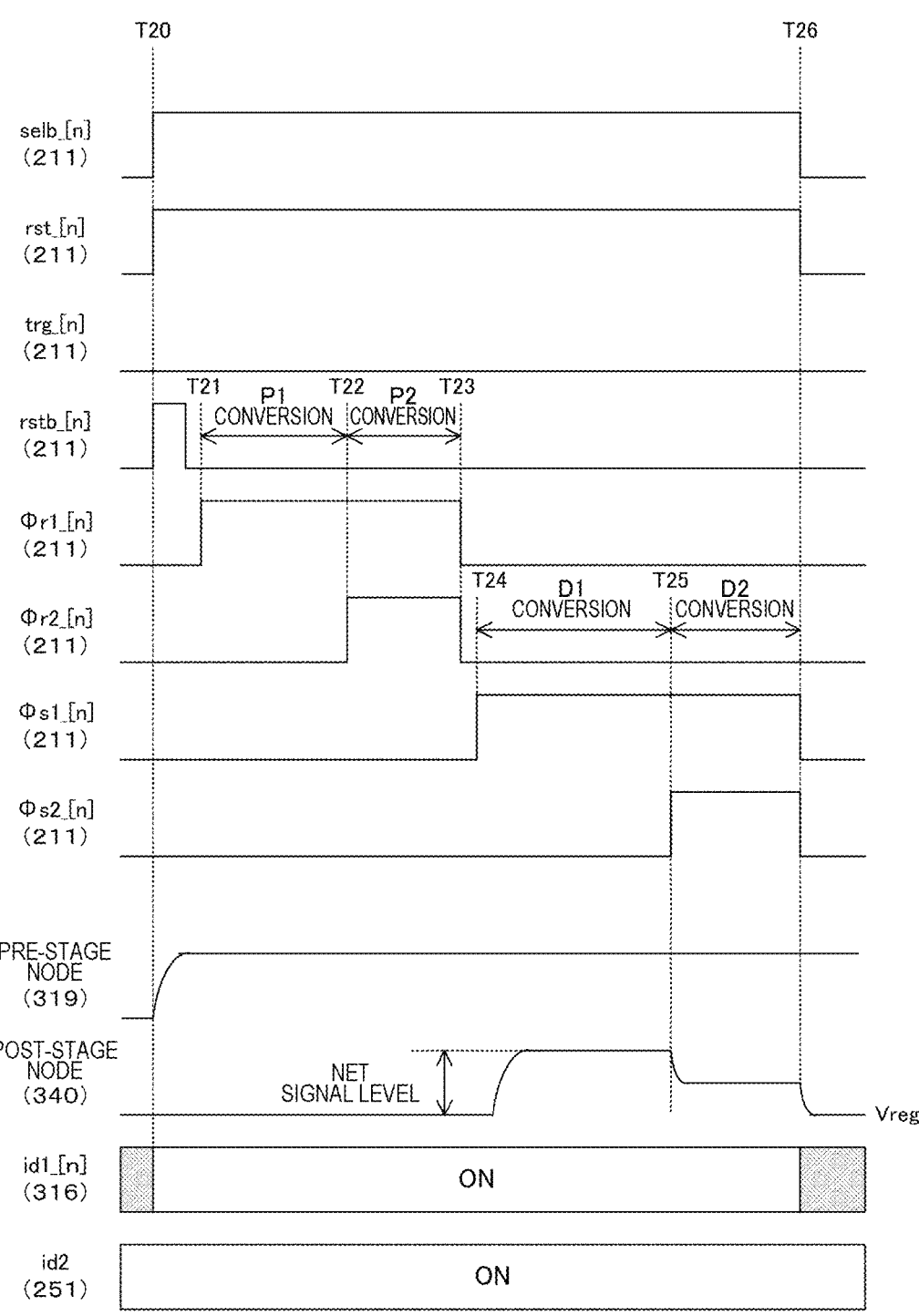
FIG. 9 is a timing chart illustrating an example of a read operation according to the first embodiment of the present technology.

FIG. 9 is a timing chart illustrating an example of a read operation according to the first embodiment of the present technology. This drawing illustrates details of control of the read period for one row in FIG. 7.

During a read period of the n-th row from timing T20 to timing T26, the vertical scanning circuit 211 sets the FD reset signal rst and the post-stage selection signal selb of the n-th row to the high level. Furthermore, during the read period, the transfer signals trg of all rows are controlled to the low level. Here, selb_[n] in the drawing indicates signals to pixels in the n-th row.

The vertical scanning circuit 211 supplies a high-level post-stage reset signal rstb to the n-th row over a predetermined pulse period from timing T20. Accordingly, the level of the post-stage node 340 is initialized.

Then, within a period from timing T21 to timing T22, the vertical scanning circuit 211 supplies a high-level selection signal Φr1 to the n-th row, and the selection circuit 330 connects the capacitor element 321 to the post-stage circuit 350 in accordance with this signal. Within this period, a high gain signal P1 corresponding to the P-phase level is output and converted into a digital signal. Within a period from timing T22 to timing T23, the vertical scanning circuit 211 supplies high-level selection signals Φr1 and Φr2 to the n-th row, and the selection circuit 330 connects the capacitor elements 321 and 322 to the post-stage circuit 350 in accordance with this signal. Within this period, a low gain signal P2 corresponding to the P-phase level is generated and converted into a digital signal.

Subsequently, the vertical scanning circuit 211 supplies a high-level selection signal Φs1 to the n-th row within a period from timing T24 to timing T25. The level of the post-stage node 340 changes by a net signal level. Within this period, a high gain signal D1 corresponding to the D-phase level is output and converted into a digital signal. The vertical scanning circuit 211 supplies high-level selection signals Φs1 and Φs2 to the n-th row within a period from timing T25 to timing T26. Since the gain decreases due to the coupling of the capacitor elements, the level of the post-stage node 340 decreases. Within this period, a low gain signal D2 corresponding to the D-phase level is generated and converted into a digital signal.

Furthermore, the vertical scanning circuit 211 controls the current source transistor 316 of the n-th row to be read over the period from timing T20 to timing T26 to supply the current id1. Furthermore, the timing control circuit 212 controls the load MOS transistors 251 of all columns to supply the current id2 within the read period of all rows.

Figure 10:
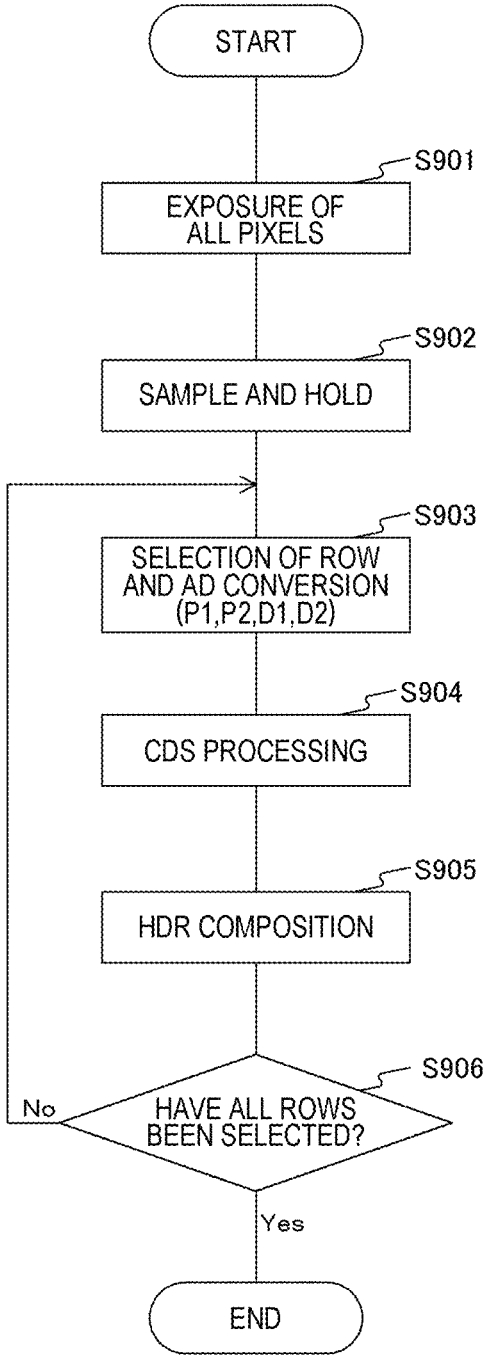
FIG. 10 is a flowchart illustrating an example of an operation of the solid-state imaging element according to the first embodiment of the present technology.

FIG. 10 is a flowchart illustrating an example of an operation of the solid-state imaging element 200 according to the first embodiment of the present technology. This operation is started, for example, in a case where a predetermined application for capturing a frame is executed.

The vertical scanning circuit 211 in the solid-state imaging element 200 exposes all pixels within the exposure period (step S901), and causes all pixels to sample and hold the high gain signal (step S902).

The vertical scanning circuit 211 selects a row to be read, and outputs analog signals of P1, P2, D1, and D2 to the selected row. The ADC 451 performs AD conversion on these analog signals (step S903).

In addition, the CDS circuit 456 performs CDS processing on P1 and D1 and CDS processing on P2 and D2 (step S904). The logic circuit 460 performs HDR composition (step S905).

The vertical scanning circuit 211 determines whether or not all rows have been selected (step S906). In a case where there is a row that has not been selected (step S906: No), the solid-state imaging element 200 repeatedly executes step S903 and subsequent steps. In a case where all rows are selected (step S906: Yes), the solid-state imaging element 200 ends the operation for imaging.

Note that, in a case where a plurality of frames is continuously captured in synchronization with the vertical synchronization signal XVS, the processing of steps S901 to S906 is repeatedly executed in synchronization with the vertical synchronization signal XVS.

Figures 11A, 11B, 11C:
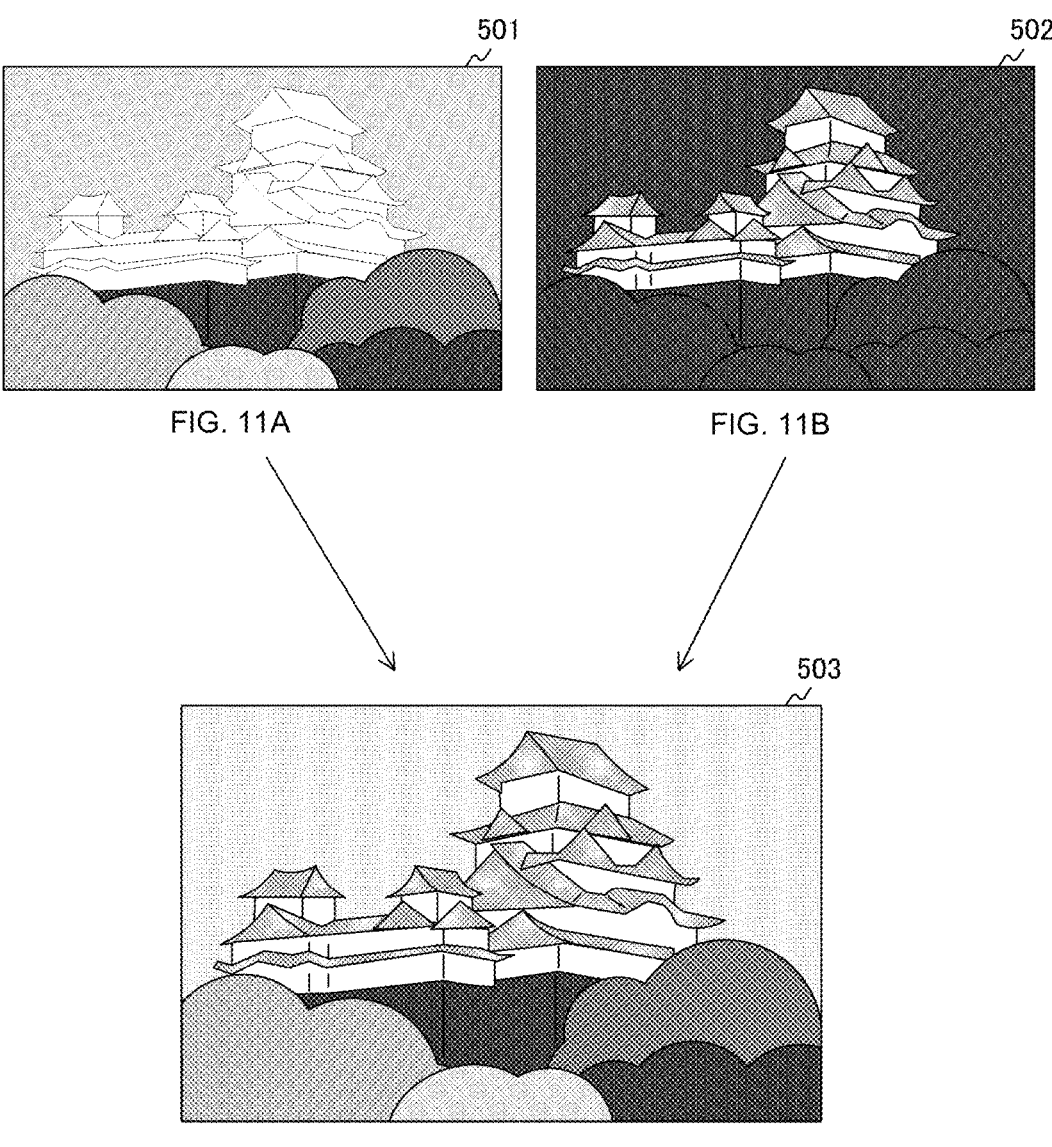
FIGS. 11A, 11B, and 11C are diagrams illustrating an example of frames before and after combination according to the first embodiment of the present technology.

FIGS. 11A, 11B, and 11C are diagrams illustrating an example of frames before and after combination according to the first embodiment of the present technology. In the drawing, FIG. 11A is an example of a frame 501 in which high gain signals are arranged. In the drawing, FIG. 11B is an example of a frame 502 in which low gain signals are arranged. In the drawing, FIG. 11C is an example of a combined frame 503.

As illustrated in FIG. 11A of the drawing, if the gain is large, a phenomenon (so-called "overexposure") in which gradation is lost in a bright portion is likely to occur. On the other hand, as illustrated in FIG. 11B of the drawing, if the gain is small, a phenomenon (so-called "underexposure") in which gradation is lost in a dark portion is likely to occur.

As illustrated in FIG. 11C of the drawing, a frame 503 having a wide dynamic range is obtained by combining the frames 501 and 502 having different gains. This prevents overexposure and underexposure from occurring.

Figure 12:
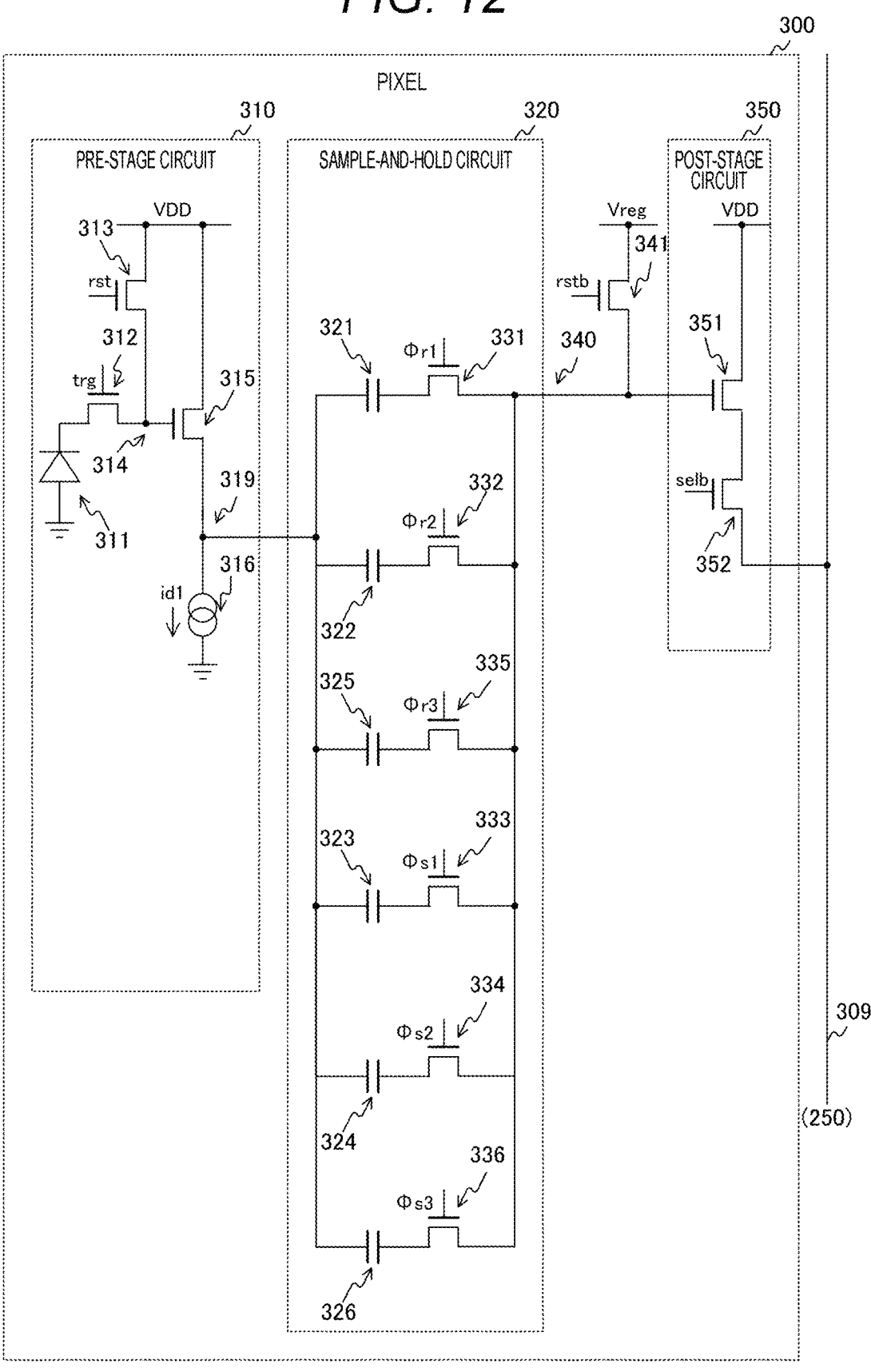
FIG. 12 is a circuit diagram illustrating a configuration example of a pixel when three or more gains are used according to the first embodiment of the present technology.

Note that, in the circuit illustrated in FIG. 3, gains in two stages of high gain and low gain are used, but gains in three or more stages can also be used. In a case where the gain is set to three stages, for example, as illustrated in FIG. 12, capacitor elements 325 and 326 and selection transistors 335 and 336 are further provided in the sample-and-hold circuit 320.

The capacitor elements 325 and 326 are connected to the pre-stage node 319 in parallel with the capacitor elements 321 to 324. The selection transistor 335 opens and closes a path between the capacitor element 325 and the post-stage node 340, and the selection transistor 336 opens and closes a path between the capacitor element 326 and the post-stage node 340. It is sufficient if the vertical scanning circuit 211 couples two capacitor elements in the case of generating a middle gain signal between a high gain and a low gain, and couples three capacitor elements in the case of generating a low gain signal. In a case where the gain is set to four or more stages, a capacitor element and a selection transistor are further added according to the number of stages.

In this way, according to the first embodiment of the present technology, since the sample-and-hold circuit 320 holds the high gain signal and generates the low gain signal, a frame memory is unnecessary when performing HDR composition. Accordingly, the circuit scale of the solid-state imaging element 200 can be reduced.

Modification Example

In the above-described first embodiment, the pixels 300 having the circuit configuration illustrated in FIG. 3 are arranged, but the circuit configuration of the pixels 300 is not limited to that illustrated in FIG. 3. A solid-state imaging element 200 according to a modification example of the first embodiment is different from the solid-state imaging element 200 of the first embodiment in that a circuit configuration different from that in FIG. 3 is used.

Figure 13:
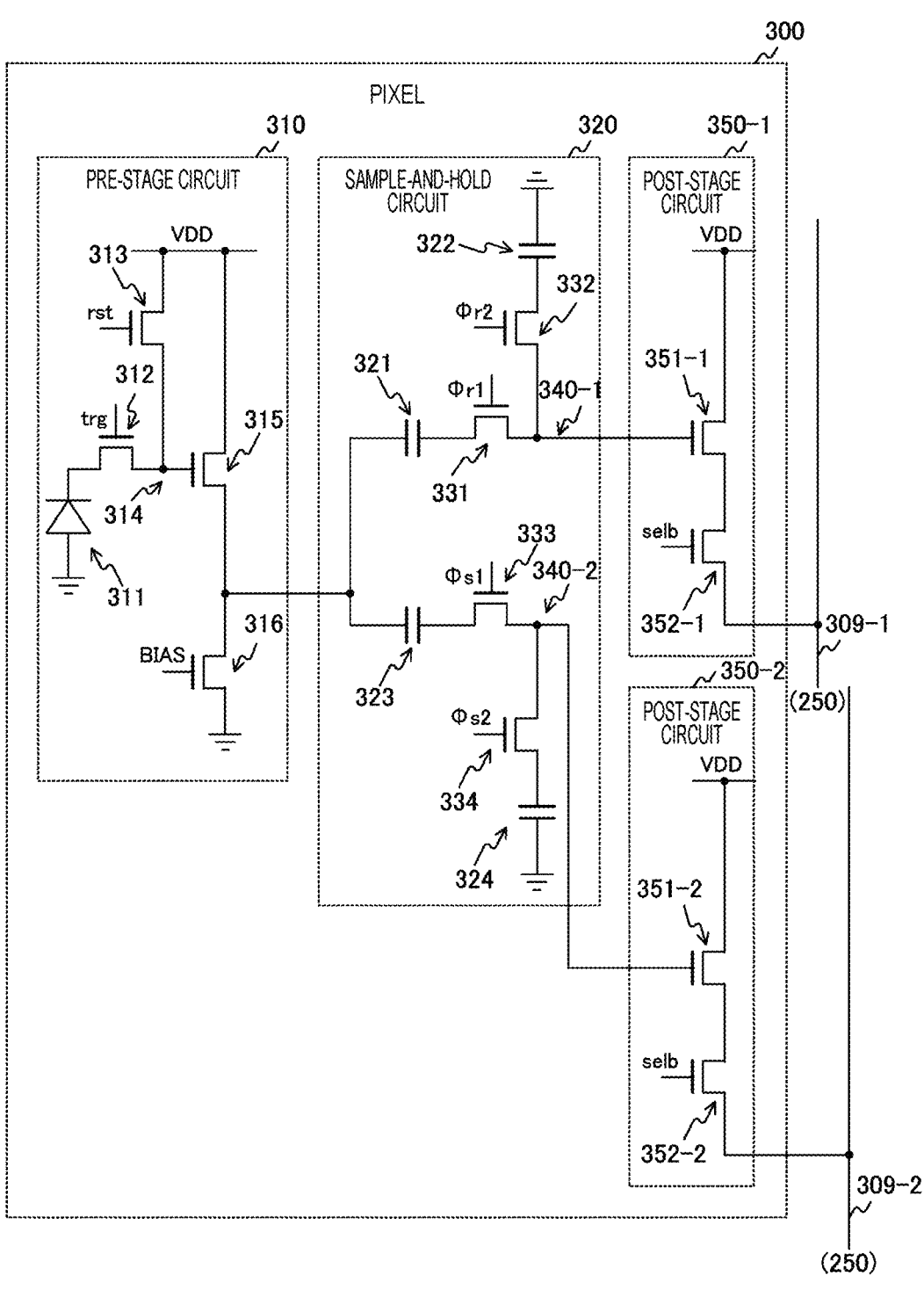
FIG. 13 is a circuit diagram illustrating a configuration example of a pixel according to a modification example of the first embodiment of the present technology.

FIG. 13 is a circuit diagram illustrating a configuration example of a pixel 300 according to a modification example of the first embodiment of the present technology. The pixel 300 according to the modification example of the first embodiment is different from the pixel 300 of the first embodiment in that the post-stage circuit has two systems.

Post-stage circuits 350-1 and 350-2 are disposed in the pixel 300, a post-stage amplification transistor 351-1 and a post-stage selection transistor 352-1 are disposed in the post-stage circuit 350-1, and a post-stage selection transistor 352-1 is connected to a vertical signal line 309-1. A post-stage amplification transistor 351-2 and a post-stage selection transistor 352-2 are disposed in the post-stage circuit 350-2, and the post-stage selection transistor 352-2 is connected to a vertical signal line 309-2.

Further, in the sample-and-hold circuit 320, one end of the capacitor element 322 is grounded. The selection transistor 332 opens and closes a path between a post-stage node 340-1 and the other end of the capacitor element 322. Further, one end of the capacitor element 324 is grounded. The selection transistor 334 opens and closes a path between a post-stage node 340-2 and the other end of the capacitor element 324. With the circuit configuration illustrated in the drawing, it is possible to suppress fluctuation in the level of the post-stage node.

Figure 14:
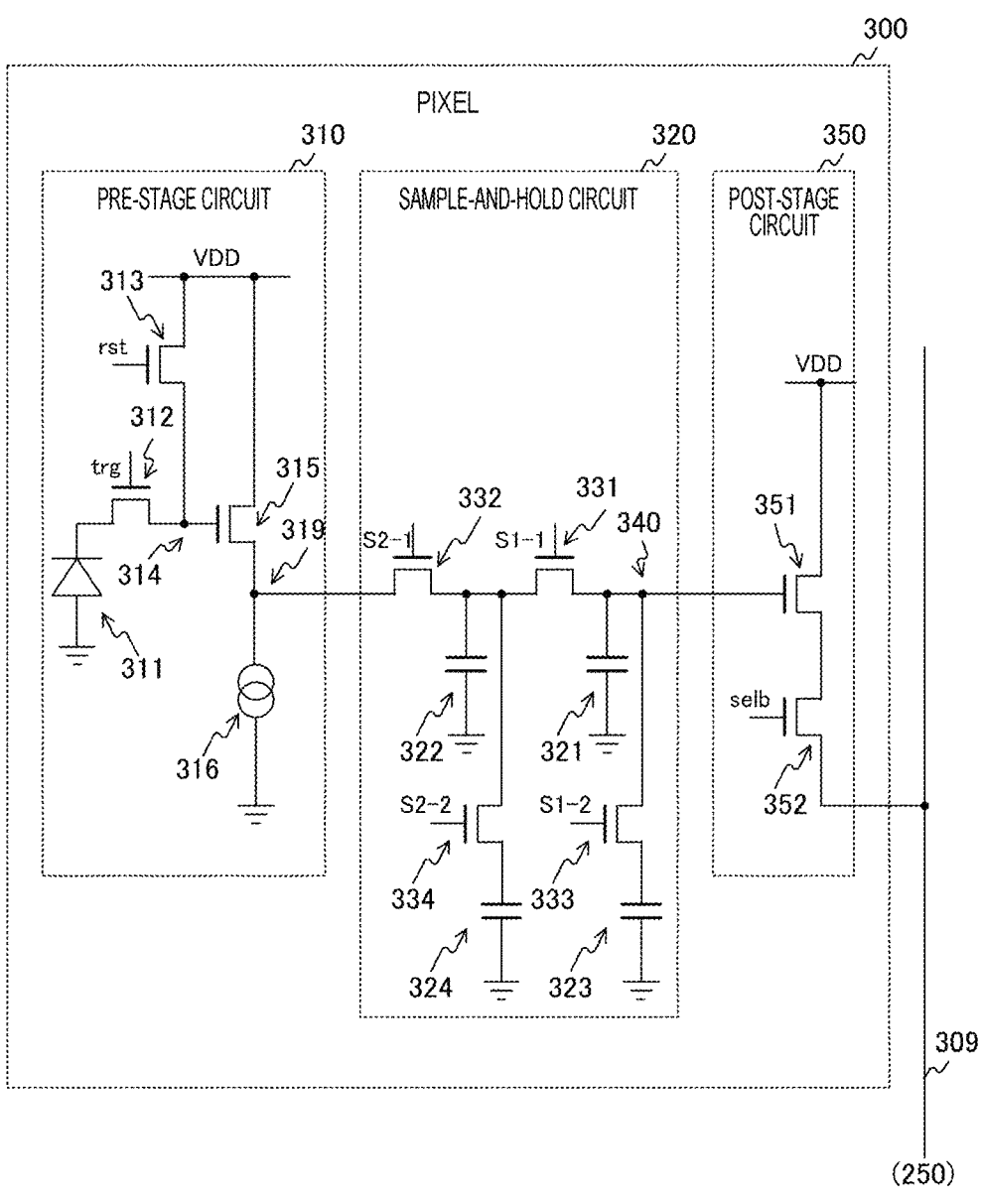
FIG. 14 is a circuit diagram illustrating another example of a pixel according to a modification example of the first embodiment of the present technology.

Note that, as illustrated in FIG. 14, the selection transistors 331 and 332 can be connected in series between the pre-stage circuit 310 and the post-stage circuit 350. In this case, the capacitor element 321 is inserted between the post-stage node 340 and a ground terminal. The capacitor element 322 is inserted between a connection node of the selection transistors 331 and 332 and a ground terminal. In addition, the selection transistor 333 and the capacitor element 323 are inserted in series between the post-stage node 340 and a ground terminal. The selection transistor 334 and the capacitor element 324 are inserted in series between a connection node of the selection transistors 331 and 332 and a ground terminal.

Regarding the circuit illustrated in the drawing, the control described in, for example, "Chen Xu et al., A Stacked Global-Shutter CMOS Imager with SC-Type Hybrid-GS Pixel and Self-Knee Point Calibration Single-Frame HDR and On-Chip Binarization Algorithm for Smart Vision Applications ISSCC2019" can be referred to.

Figure 15:
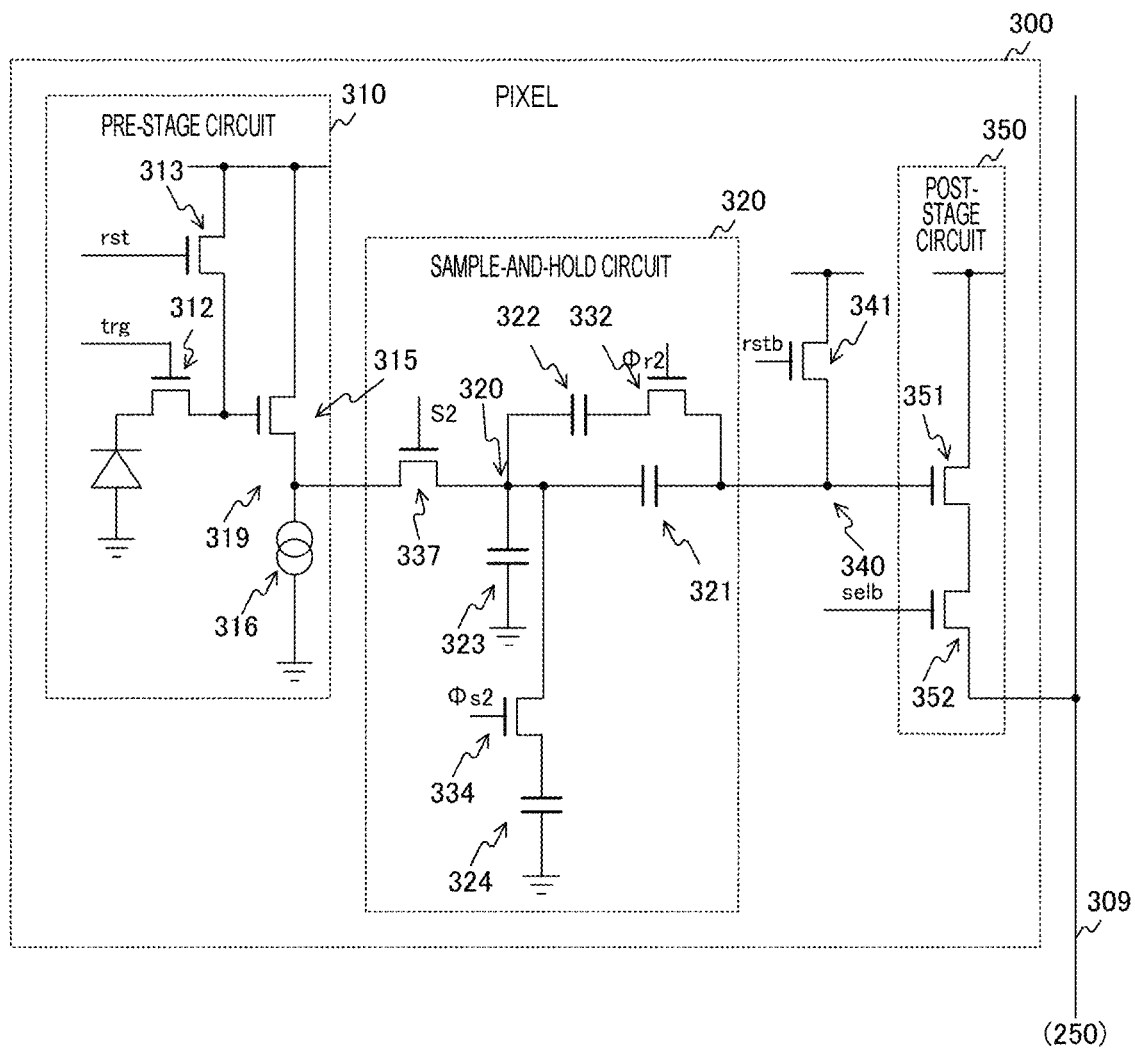
FIG. 15 is a circuit diagram illustrating a configuration example of a pixel in which the number of transistors is reduced in a modification example of the first embodiment of the present technology.

Furthermore, as illustrated in FIG. 15, a sampling transistor 337 can be disposed instead of the selection transistors 331 and 333 in the sample-and-hold circuit 320. In this case, the sampling transistor 337 and the capacitor element 321 are connected in series between the pre-stage circuit 310 and the post-stage circuit 350. The capacitor element 322 and the selection transistor 332 are connected in series between a connection node of the sampling transistor 337 and the capacitor element 321 and the post-stage node 340. The capacitor element 323 is inserted between a connection node of the sampling transistor 337 and the capacitor element 321 and a ground terminal. The capacitor element 324 and the selection transistor 334 are connected in series between a connection node of the sampling transistor 337 and the capacitor element 321 and a ground terminal. The number of transistors can be reduced by the circuit configuration illustrated in the drawing.

Regarding the circuit illustrated in the drawing, the control described in, for example, "Jae-kyu Lee, et al., A 2.1e-Temporal Noise and −105 dB Parasitic Light Sensitivity Backside-Illuminated 2.3 μm-Pixel Voltage-Domain Global Shutter CMOS Image Sensor Using High-Capacity DRAM Capacitor Technology, ISSCC 2020" can be referred to.

In this way, according to the first modification example of the first embodiment of the present technology, since the post-stage circuit has two systems, it is possible to suppress the fluctuation in the level of the post-stage node.

2. Second Embodiment

In the first embodiment described above, the sample-and-hold circuit 320 outputs both the high gain signal D1 and the low gain signal D2 corresponding to the signal level, but in this configuration, it is difficult to improve the read speed. A pixel 300 of this second embodiment is different from the pixel 300 of the first embodiment in that one of the high gain signal D1 and the low gain signal D2 is output according to the signal level.

Figure 16:
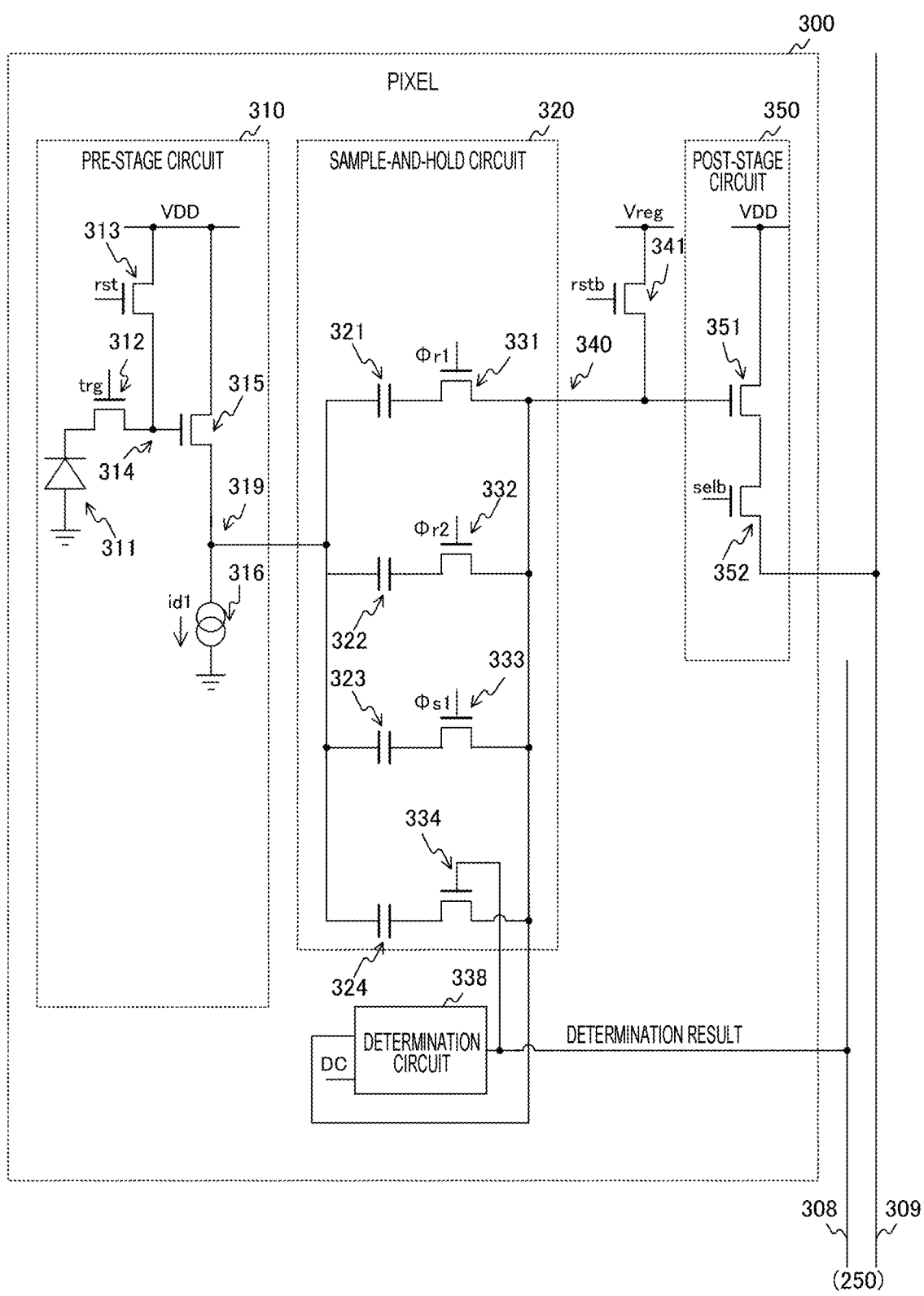
FIG. 16 is a circuit diagram illustrating a configuration example of a pixel according to a second embodiment of the present technology.

FIG. 16 is a circuit diagram illustrating a configuration example of the pixel 300 according to the second embodiment of the present technology. The pixel 300 of the second embodiment is different from the pixel 300 of the first embodiment in that a determination circuit 338 is further provided.

The determination circuit 338 determines whether or not the signal level exceeds a predetermined determination value. For example, a comparator is used as the determination circuit 338. A determination signal DC is input to one of two input terminals of the determination circuit 338, and the other is connected to the post-stage node 340. Since the level obtained by amplifying the signal level with the high gain is compared with the determination signal DC, a signal having a value obtained by multiplying the determination value by the high gain is supplied as the determination signal DC by the vertical scanning circuit 211. Further, an output terminal of the determination circuit 338 is connected to a gate of the selection transistor 334.

The vertical scanning circuit 211 supplies the determination signal DC at a timing when the high gain signal D1 corresponding to the signal level is output from the post-stage node 340. The determination circuit 338 compares the determination signal DC with the high gain signal D1. In a case where the high gain signal D1 is higher than the determination signal DC, that is, in a case where the signal level is higher than the determination value, the determination circuit 338 outputs a high level as the determination result. Accordingly, the low gain signal D2 is generated by coupling of the capacitor elements 323 and 324, and is AD-converted.

On the other hand, in a case where the high gain signal D1 is equal to or lower than the determination signal DC, that is, in a case where the signal level is equal to or lower than the determination value, the determination circuit 338 outputs a low level as the determination result. Accordingly, the high gain signal D1 is AD-converted.

Furthermore, a vertical signal line 308 is further wired for each column, and the determination result of the determination circuit 338 is supplied to the CDS circuit 456 via the vertical signal line 308.

Figure 17:
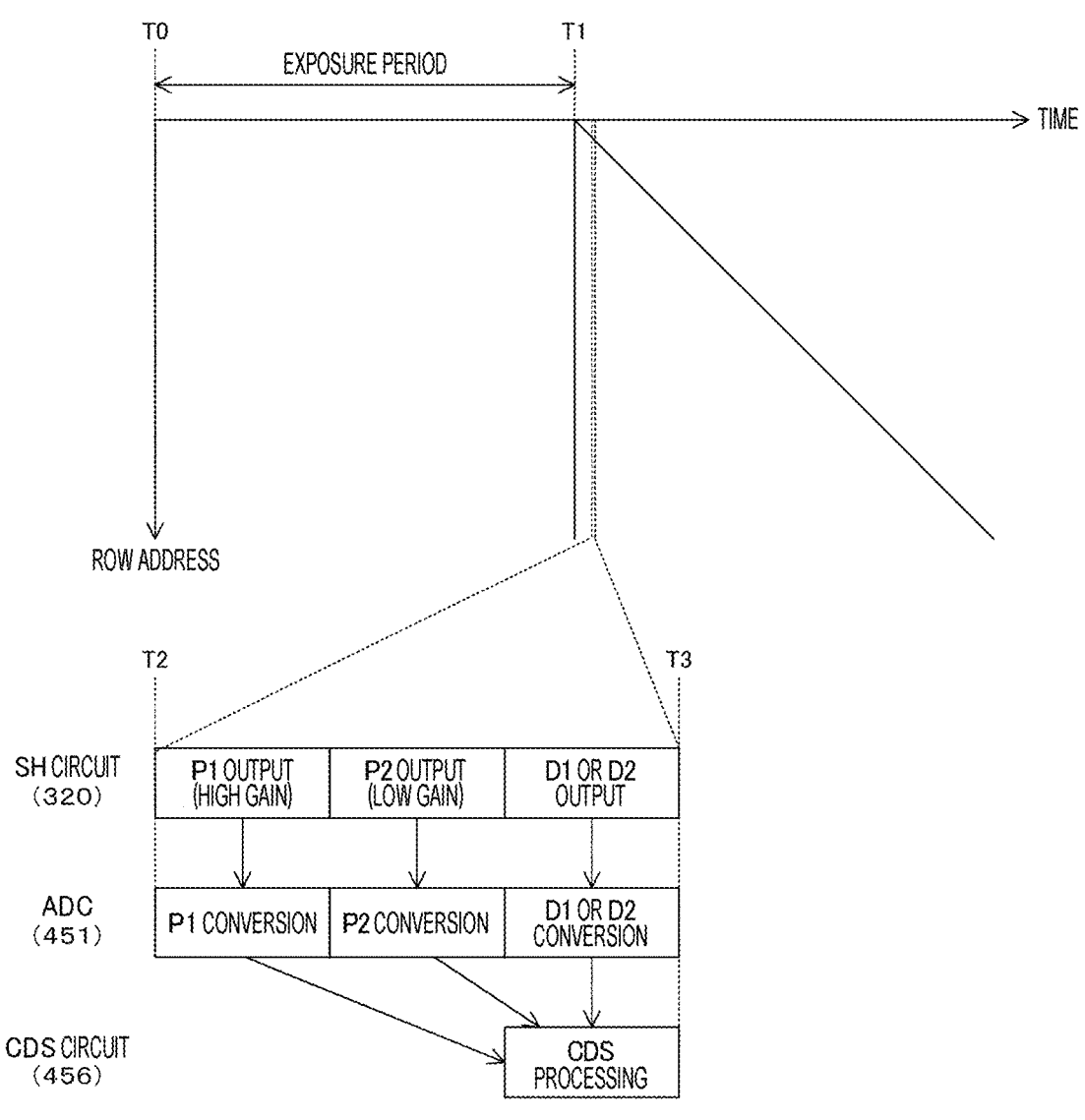
FIG. 17 is a timing chart illustrating an example of an operation of a solid-state imaging element according to the second embodiment of the present technology.

FIG. 17 is a timing chart illustrating an example of an operation of a solid-state imaging element 200 according to the second embodiment of the present technology.

During the read period, the sample-and-hold circuit 320 in the corresponding row sequentially outputs the high gain signal P1 and the low gain signal P2. Then, the sample-and-hold circuit 320 outputs either the high gain signal D1 or the low gain signal D2 on the basis of the determination result of the determination circuit 338.

The ADC 451 in the corresponding row converts each of the analog P1 and P2 and D1 or D2 into a digital signal.

In a case where it is determined that the signal level is higher than the determination value, the CDS circuit 456 obtains a difference between the digital signal corresponding to P2 and the digital signal corresponding to D2. On the other hand, in a case where it is determined that the signal level is equal to or lower than the determination value, the CDS circuit 456 obtains a difference between the digital signal corresponding to P1 and the digital signal corresponding to D1.

A frame in which the digital signals subjected to the CDS processing are arranged is a frame in which a dynamic range is expanded. Therefore, the logic circuit 460 does not need to perform HDR composition.

Figure 18:
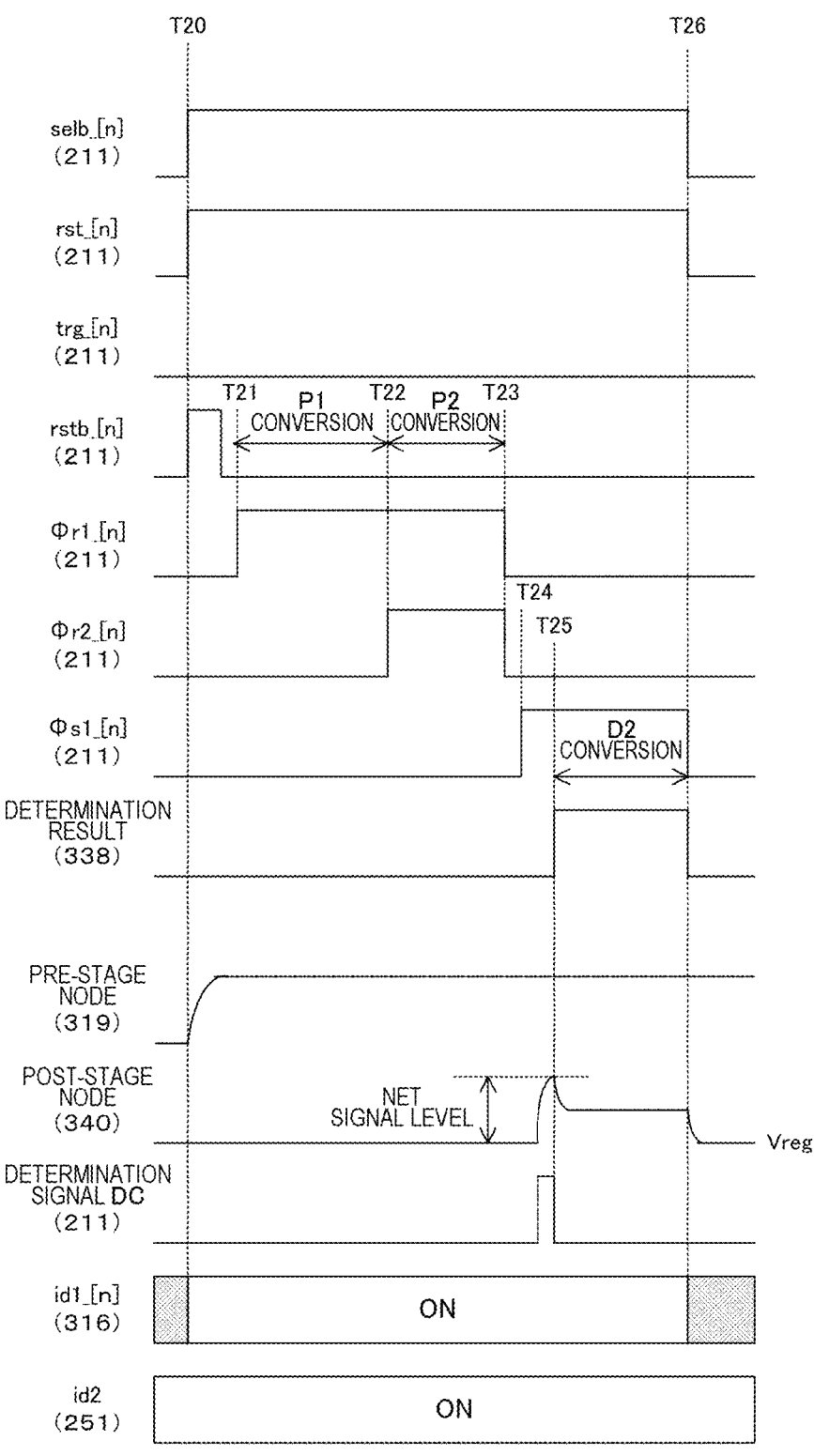
FIG. 18 is a timing chart illustrating an example of a read operation according to the second embodiment of the present technology.

FIG. 18 is a timing chart illustrating an example of a read operation according to the second embodiment of the present technology. In the drawing, control up to timing T24 at which the selection signal Φs1 becomes the high level is similar to that of the first embodiment.

During a pulse period from immediately after timing T24 to timing T25, the vertical scanning circuit 211 supplies a high-level determination signal DC higher than the initial value. The initial value of the determination signal DC is equal to or lower than the level at the time of initialization of the post-stage node 340.

In the drawing, it is assumed that the determination circuit 338 determines that the high gain signal D1 corresponding to the signal level is higher than the determination signal DC at timing T25. In this case, at timing T25, the determination circuit 338 changes the determination result from the low level to the high level, and the selection circuit 330 connects the capacitor elements 323 and 324 to the post-stage circuit 350. Accordingly, the capacitor elements 323 and 324 are coupled, and the low gain signal D2 is generated and is AD-converted at timing T25 to timing T26.

Figure 19:
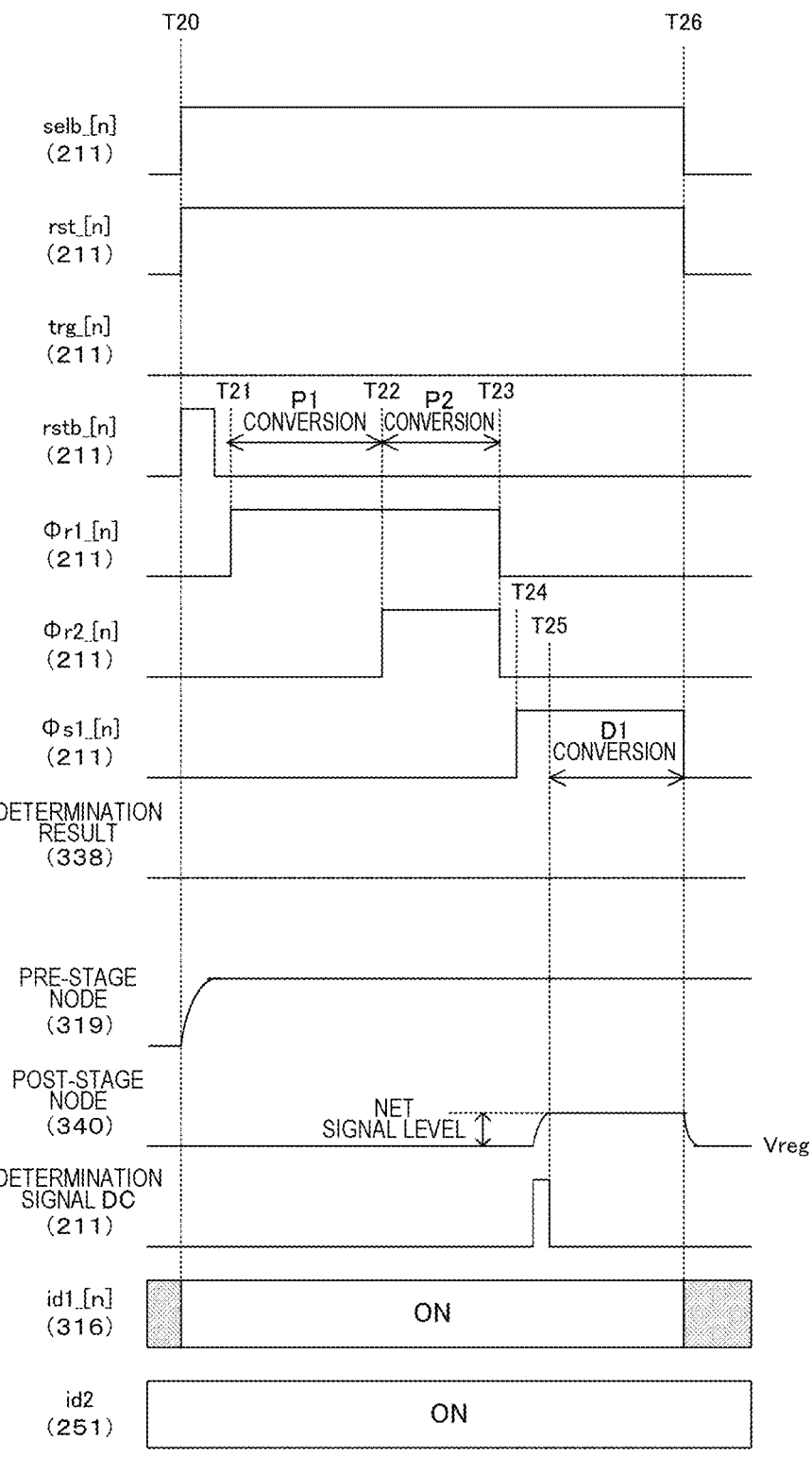
FIG. 19 is a timing chart illustrating another example of the read operation according to the second embodiment of the present technology.

FIG. 19 is a timing chart illustrating another example of the read operation according to the second embodiment of the present technology. In the drawing, the control up to timing T24 is similar to that in FIG. 18.

In FIG. 19, it is assumed that the determination circuit 338 determines that the high gain signal D1 corresponding to the signal level is equal to or lower than the determination signal DC at timing T25. In this case, the determination result after timing T25 remains at the low level, and the selection circuit 330 connects only the capacitor element 323 to the post-stage circuit 350. Accordingly, the capacitor elements 323 and 324 are not coupled, and the high gain signal D1 is output and is AD-converted at timing T25 to timing T26.

As illustrated in FIGS. 18 and 19, the sample-and-hold circuit 320 outputs either the high gain signal D1 or the low gain signal D2 according to the signal level. Therefore, the ADC 451 only needs to perform AD conversion on only one of D1 and D2, and the read speed can be improved as compared with the first embodiment in which AD conversion is performed on both of D1 and D2. In addition, since the logic circuit 460 does not need to execute the HDR composition processing, the processing load of the logic circuit 460 can be reduced.

Note that a modification example of the first embodiment can be applied to the second embodiment.

In this way, according to the second embodiment of the present technology, since the sample-and-hold circuit 320 outputs either the high gain signal D1 or the low gain signal D2 according to the signal level, the read speed can be improved as compared with the first embodiment.

3. Third Embodiment

In the second embodiment described above, the determination circuit 338 is disposed in the pixel, but in this configuration, the circuit scale of the pixel increases as compared with a case where the determination circuit 338 is not disposed in the pixel. A solid-state imaging element 200 of this third embodiment is different from the solid-state imaging element 200 of the second embodiment in that a determination circuit is disposed outside the pixel.

Figure 20:
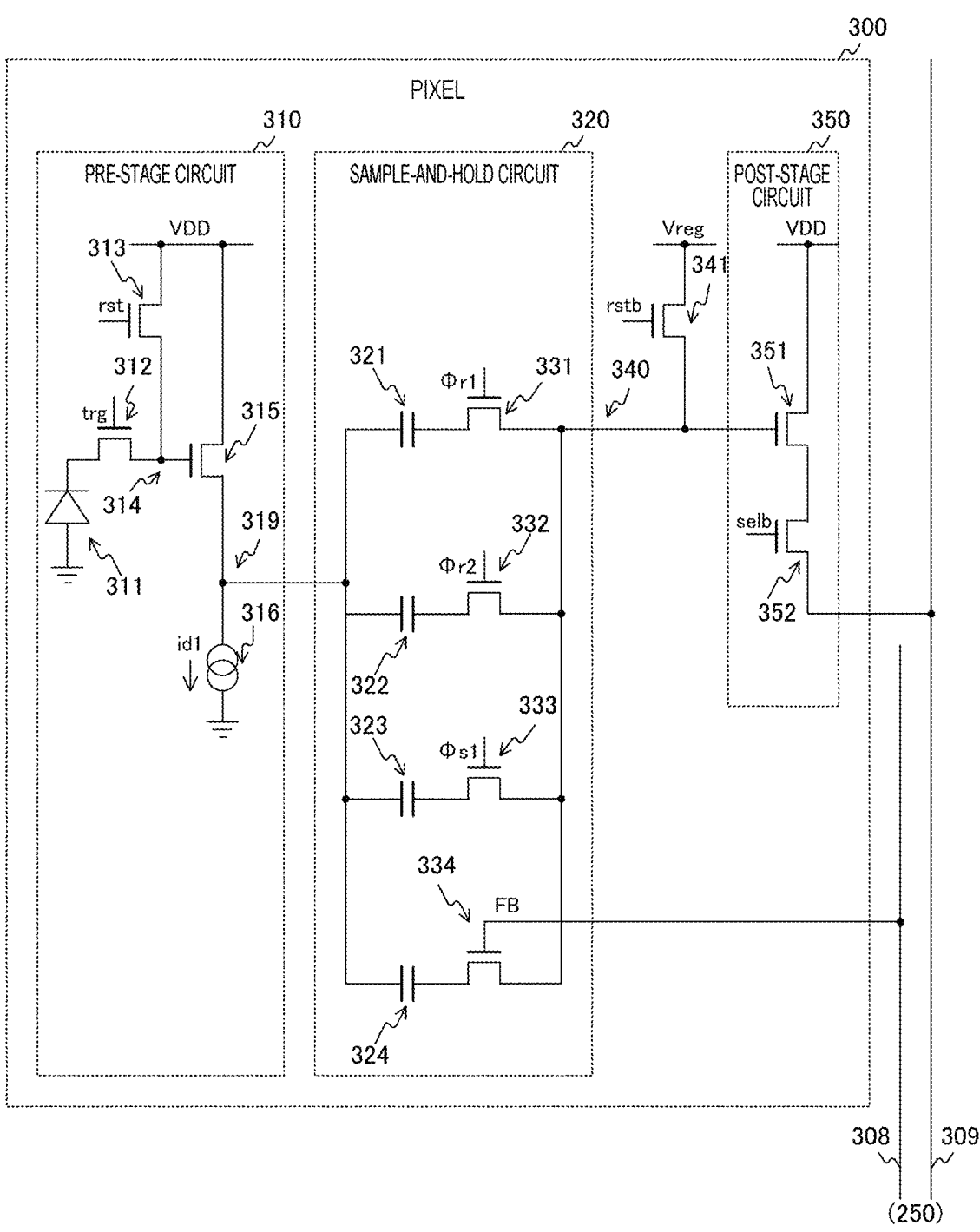
FIG. 20 is a circuit diagram illustrating a configuration example of a pixel according to a third embodiment of the present technology.

FIG. 20 is a circuit diagram illustrating a configuration example of a pixel 300 according to the third embodiment of the present technology. The pixel 300 of the third embodiment is different from the pixel 300 of the second embodiment in that the determination circuit 338 is not disposed. Furthermore, a feedback signal FB from the vertical signal line 308 is input to the gate of the selection transistor 334 of the third embodiment.

Figure 21:
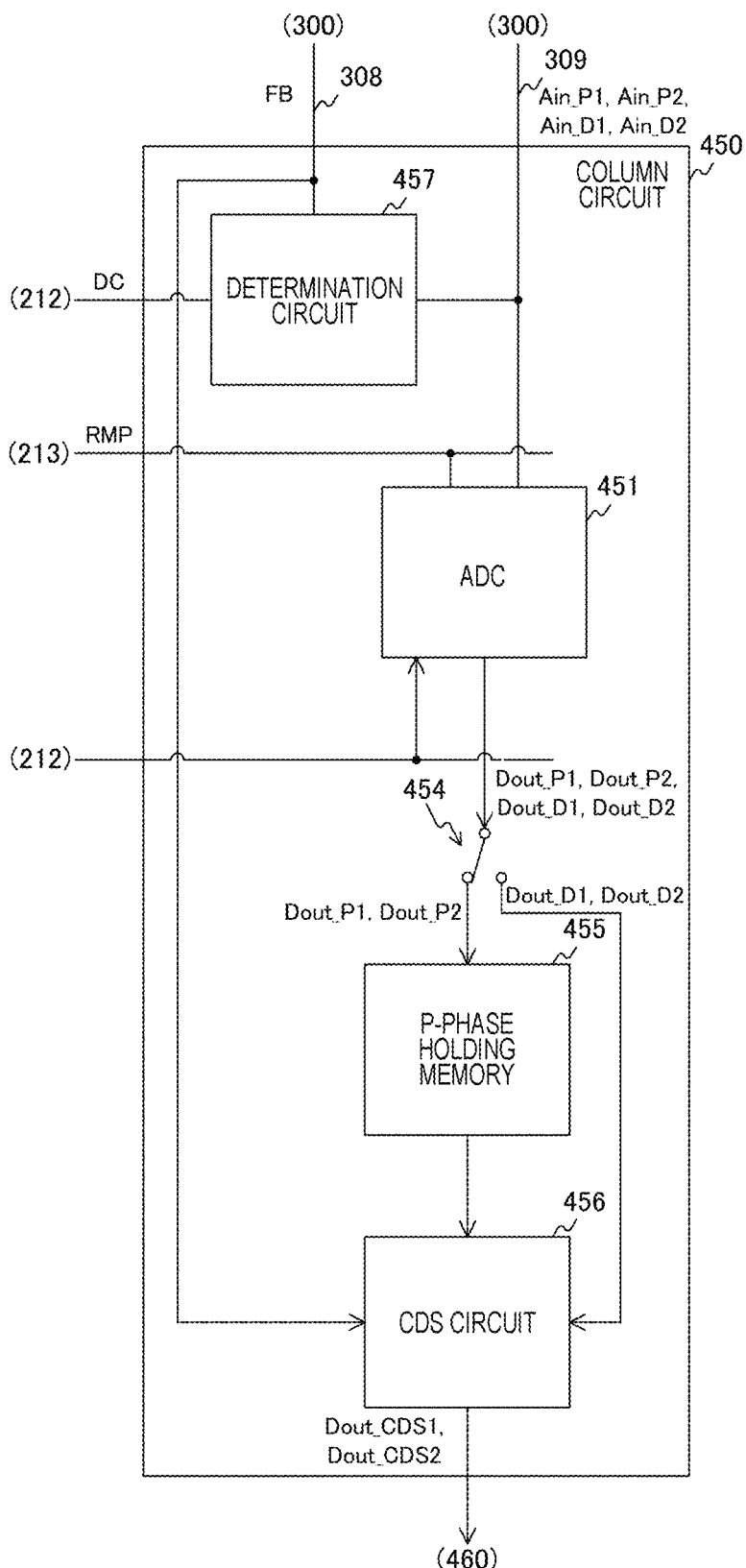
FIG. 21 is a block diagram illustrating a configuration example of a column circuit according to the third embodiment of the present technology.

FIG. 21 is a block diagram illustrating a configuration example of a column circuit 450 according to the third embodiment of the present technology. The column circuit 450 of the third embodiment is different from the column circuit 450 of the second embodiment in that a determination circuit 457 is further disposed. For example, a comparator is used as the determination circuit 457.

The determination circuit 457 determines whether or not the signal level is higher than a determination value. One of two input terminals of the determination circuit 457 is connected to the vertical signal line 309, and the determination signal DC from the timing control circuit 212 is input to the other. The determination signal DC is supplied at timing when the analog signal Ain_D1 corresponding to the signal level is output from the vertical signal line 309.

The determination circuit 457 compares the analog signal Ain_D1 with the determination signal DC, and determines whether or not the analog signal Ain_D1 is higher than the determination signal DC (that is, the signal level is higher than the determination value). The determination circuit 457 outputs a signal indicating the determination result to the sample-and-hold circuit 320 via the vertical signal line 308 as a feedback signal FB. Further, the determination circuit 457 also supplies the feedback signal FB to the CDS circuit 456.

Figure 22:
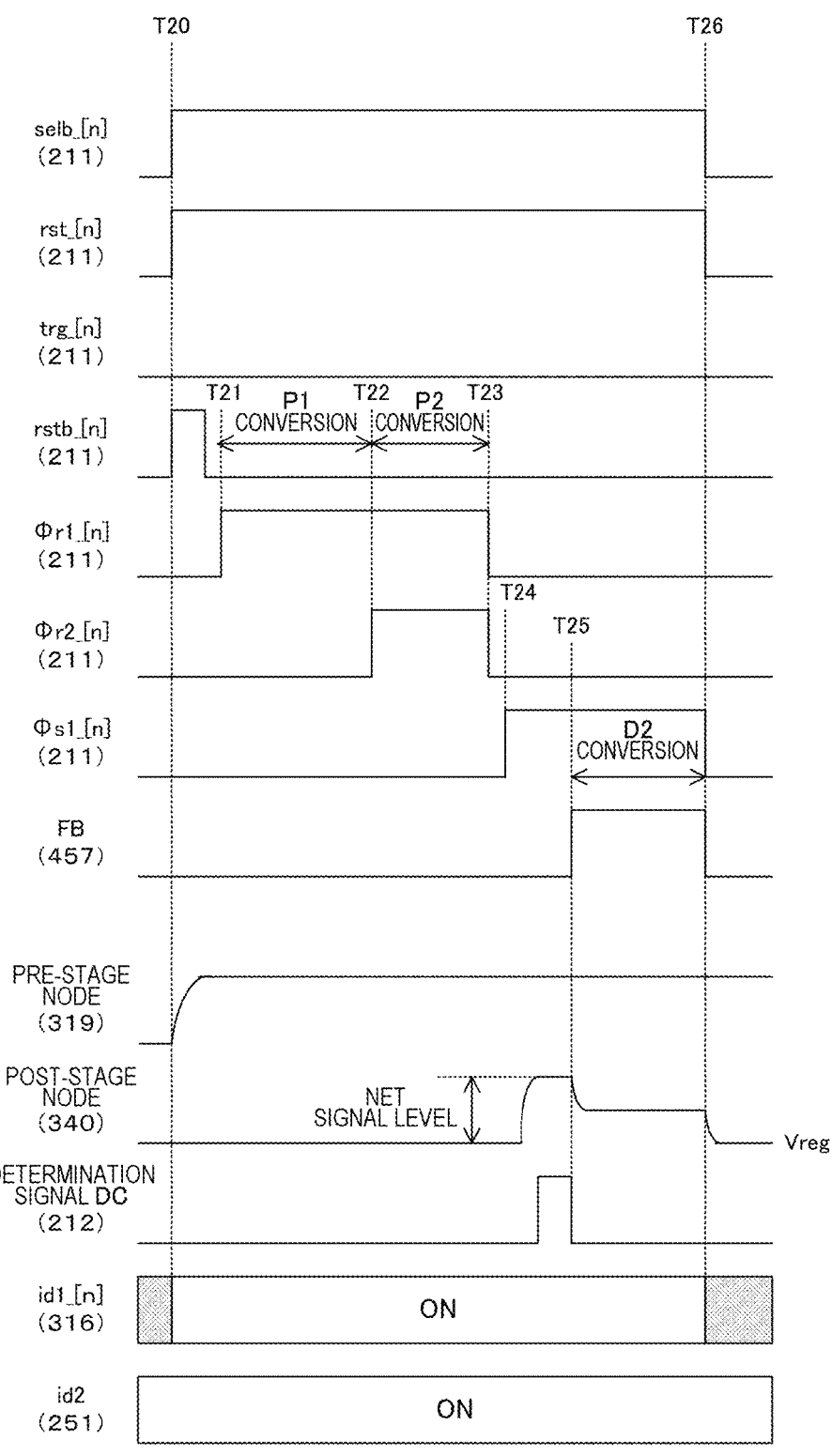
FIG. 22 is a timing chart illustrating an example of a read operation according to the third embodiment of the present technology.
Figure 23:
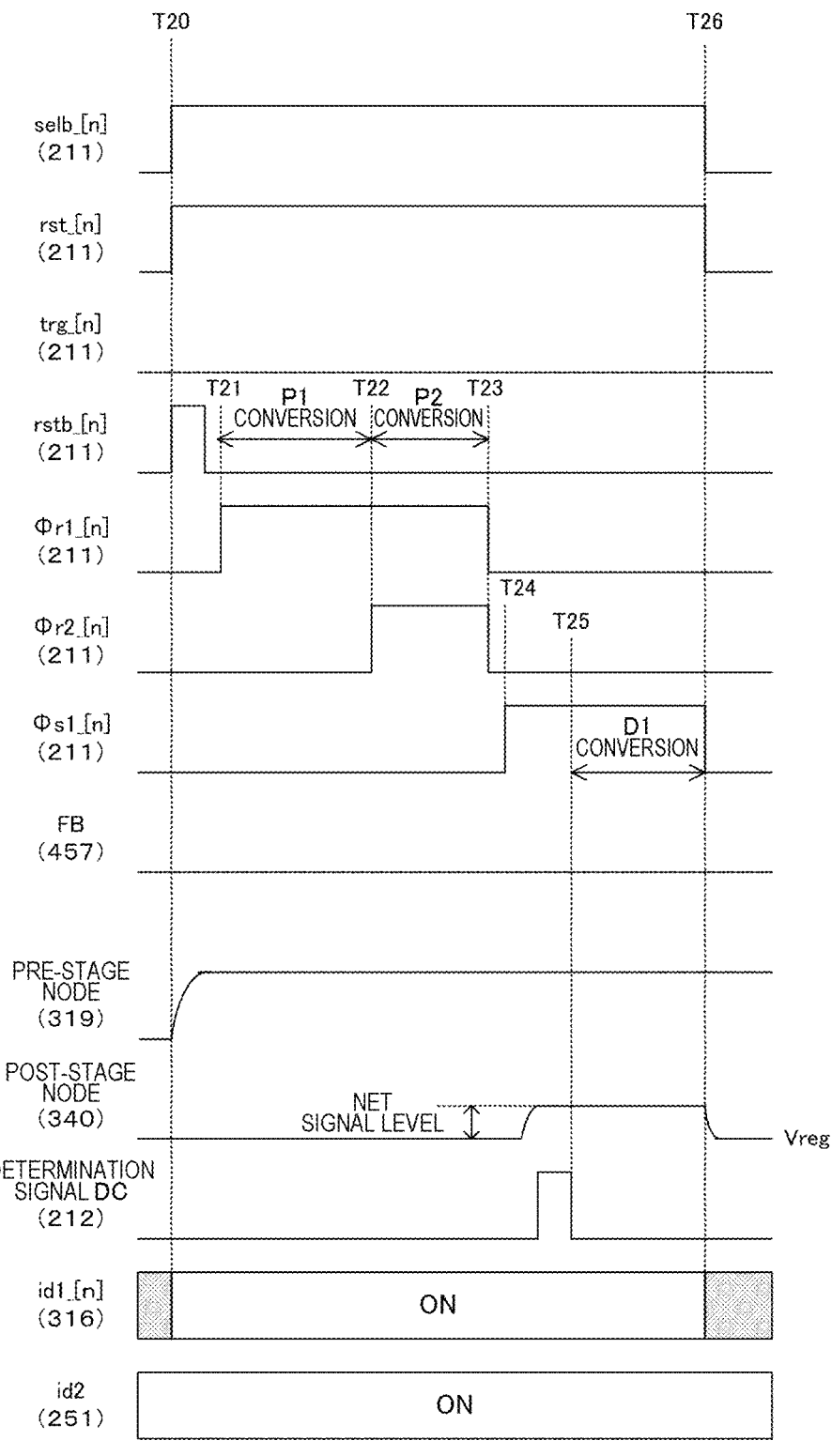
FIG. 23 is a timing chart illustrating another example of the read operation according to the third embodiment of the present technology.

FIGS. 22 and 23 are timing charts illustrating an example of a read operation according to the third embodiment of the present technology. FIG. 22 is a timing chart in a case where it is determined that the signal level is higher than the determination value, and FIG. 23 is a timing chart in a case where it is determined that the signal level is equal to or lower than the determination value.

As illustrated in FIGS. 22 and 23, in the third embodiment, the pulse width of the determination signal DC is set to a value larger than that in the second embodiment.

In this way, according to the third embodiment of the present technology, since the determination circuit 457 is disposed outside the pixel, the circuit scale of the pixel can be reduced as compared with the second embodiment in which the determination circuit 338 is disposed in the pixel.

4. Fourth Embodiment

In the third embodiment described above, the determination circuit 457 compares the determination signal DC with the analog signal Ain_D1 according to the signal level, but in this configuration, it is necessary to wire a signal line for transmitting the determination signal DC. A solid-state imaging element 200 of this fourth embodiment is different from the solid-state imaging element 200 of the third embodiment in that a ramp signal RMP is input to the determination circuit 457 instead of the determination signal DC.

Figure 24:
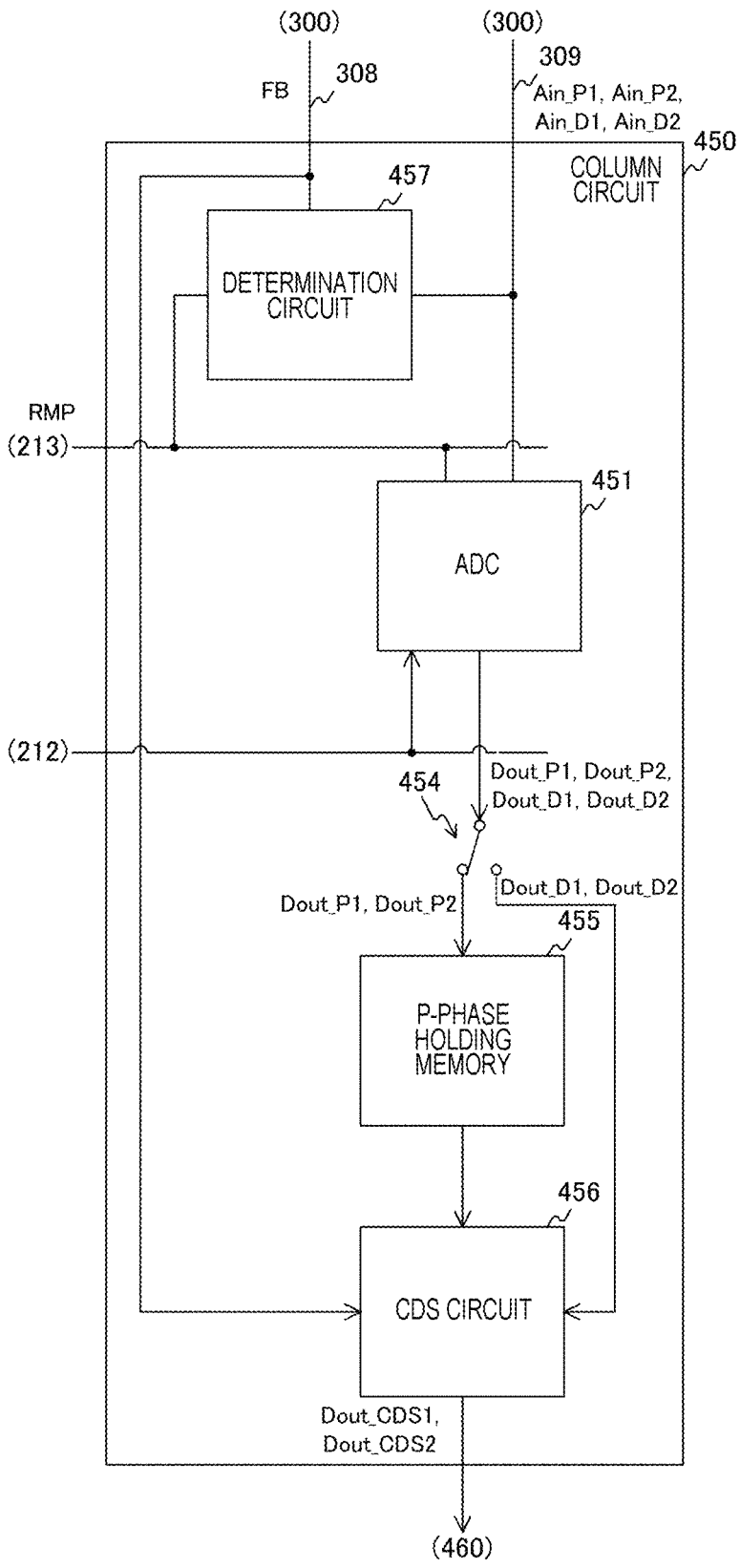
FIG. 24 is a block diagram illustrating a configuration example of a column circuit according to a fourth embodiment of the present technology.

FIG. 24 is a block diagram illustrating a configuration example of a column circuit 450 according to the fourth embodiment of the present technology. The column circuit 450 of the fourth embodiment is different from the column circuit 450 of the third embodiment in that the ramp signal RMP from the DAC 213 is input to the determination circuit

457 instead of the determination signal DC. The maximum value of the ramp signal RMP is set to a value corresponding to the determination value.

The determination circuit 457 of the fourth embodiment compares the analog signal Ain_D1 with the ramp signal RMP, and determines whether or not the analog signal Ain_D1 is higher than the ramp signal RMP (that is, the signal level is higher than the determination value). Since the determination circuit 457 compares the high gain signal (Ain_D1) corresponding to the signal level with the ramp signal RMP, the wiring for transmitting the determination signal DC becomes unnecessary, and the wiring can be reduced.

Figure 25:
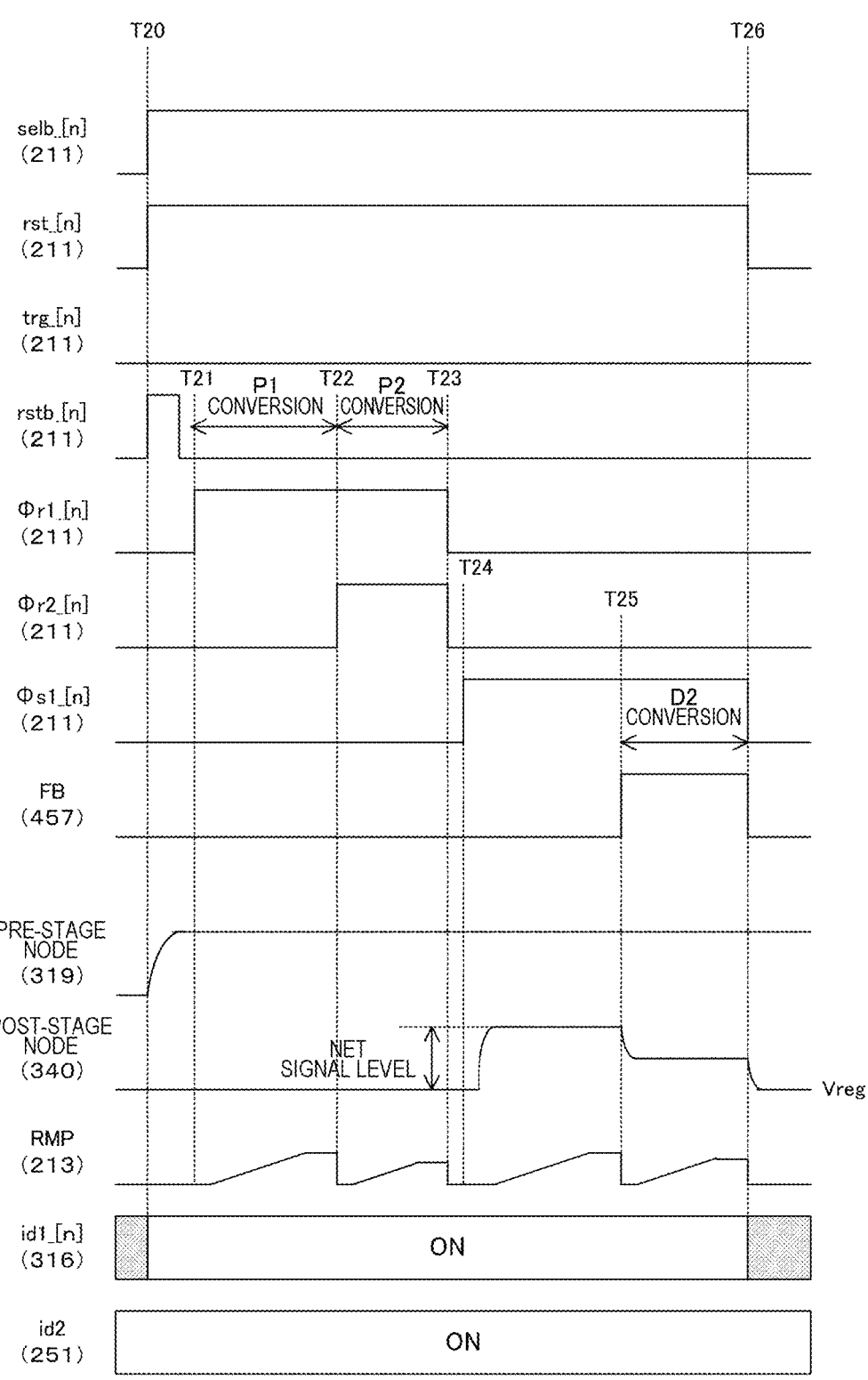
FIG. 25 is a timing chart illustrating an example of a read operation according to the fourth embodiment of the present technology.
Figure 26:
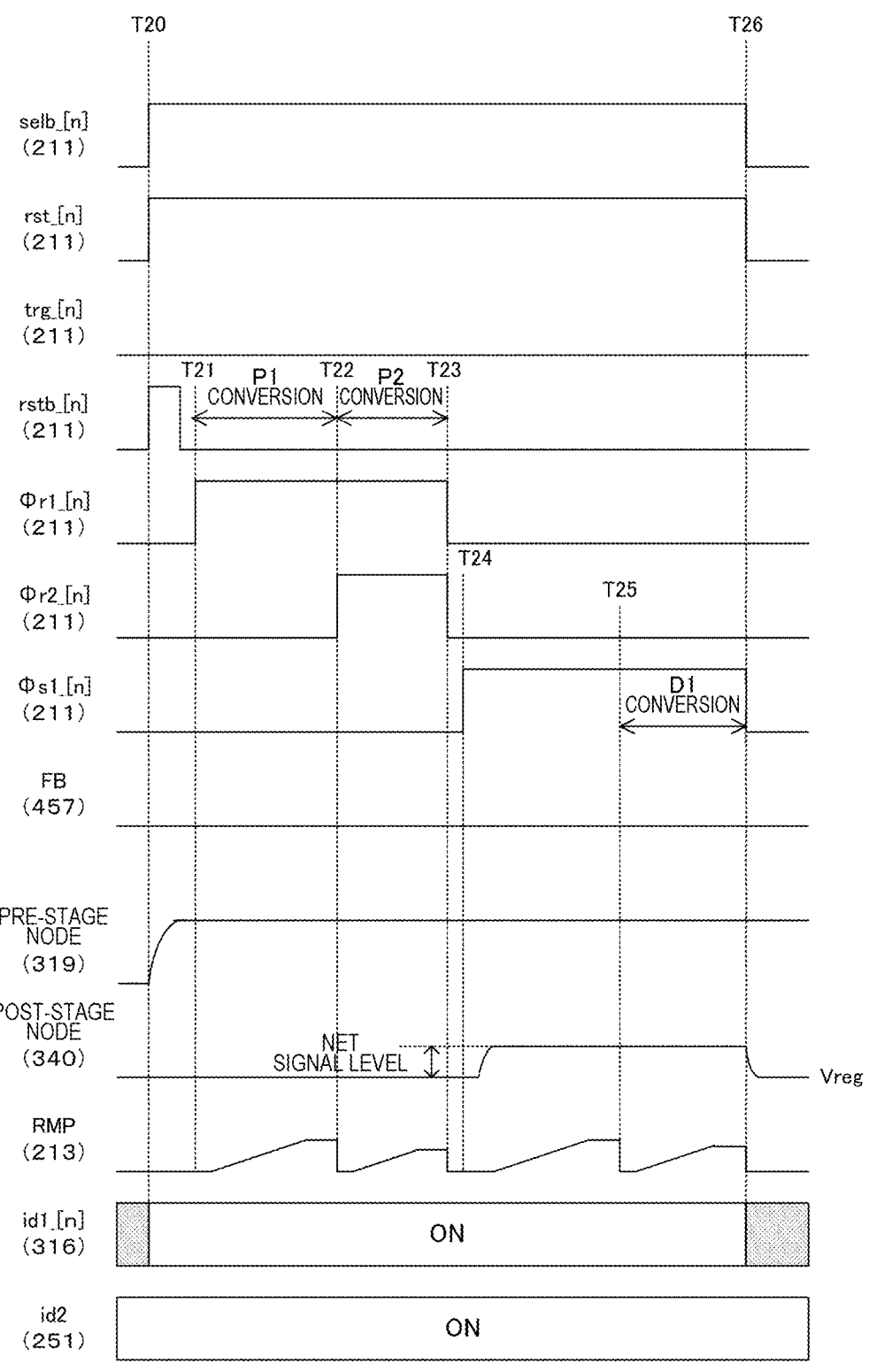
FIG. 26 is a timing chart illustrating another example of the read operation according to the fourth embodiment of the present technology.

FIGS. 25 and 26 are timing charts illustrating an example of a read operation according to the fourth embodiment of the present technology. FIG. 25 is a timing chart in a case where it is determined that the signal level is higher than the determination value, and FIG. 26 is a timing chart in a case where it is determined that the signal level is equal to or lower than the determination value.

As illustrated in FIGS. 25 and 26, during the conversion period of the high gain signal P1 and the low gain signal P2, the DAC 213 changes the ramp signal RMP into a sawtooth shape over time. Furthermore, even within the determination period from timing T24 to timing T25, the DAC 213 changes the ramp signal RMP over time.

In this way, according to the fourth embodiment of the present technology, since the determination circuit 457 compares the high gain signal corresponding to the signal level with the ramp signal RMP, the number of wires for transmitting the determination signal DC can be reduced.

5. Fifth Embodiment

In the first embodiment described above, the solid-state imaging element 200 performs the HDR composition processing using the high gain signal and the low gain signal. However, signal processing other than the HDR composition processing can be performed using these signals. A solid-state imaging element 200 of this fifth embodiment is different from the solid-state imaging element 200 of the first embodiment in that processing for improving resolution is performed.

Figure 27:
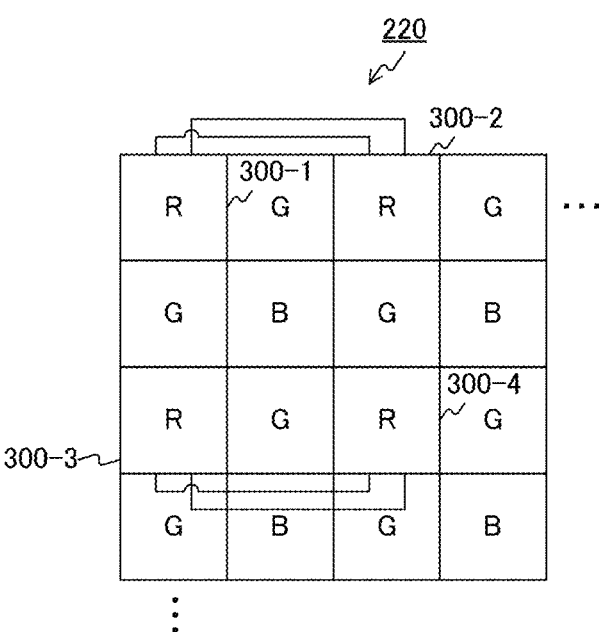
FIG. 27 is a block diagram illustrating a configuration example of a pixel array unit according to a fifth embodiment of the present technology.

FIG. 27 is a block diagram illustrating a configuration example of a pixel array unit 220 according to the fifth embodiment of the present technology. In the pixel array unit 220, for example, red (R), green (G), and blue (B) pixels are arranged in a Bayer array. Further, two pixels of the same color adjacent in the horizontal direction are connected by two signal lines. For example, R pixels 300-1 and 300-2 adjacent in the horizontal direction are connected. R pixels 300-3 and 300-4 adjacent in the horizontal direction are also connected. Similarly, for B and G, two pixels of the same color adjacent in the horizontal direction are connected. In the drawing, signal lines connecting B and G pixels are omitted for convenience of description.

Figure 28:
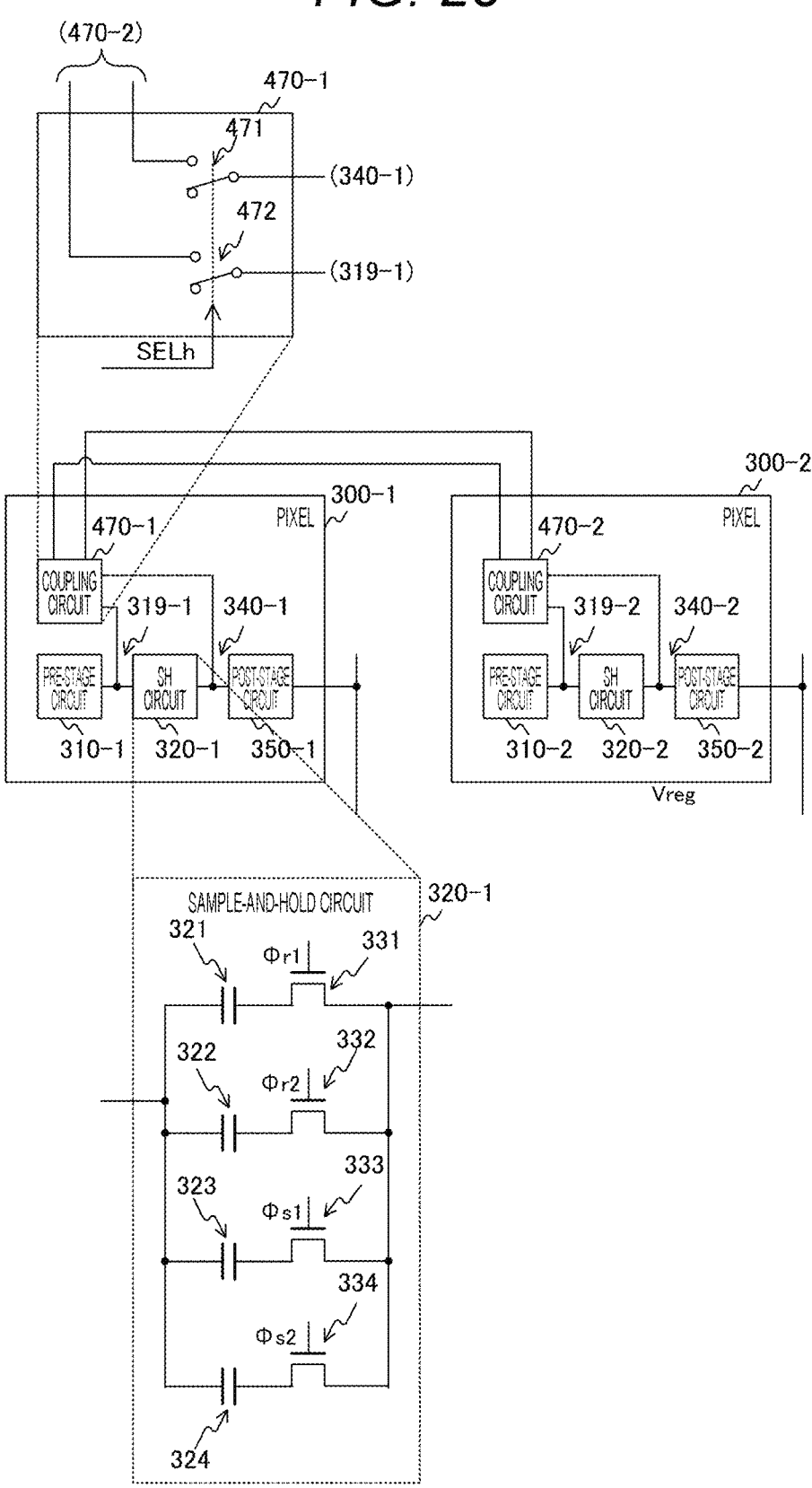
FIG. 28 is a circuit diagram illustrating a configuration example of a pixel according to the fifth embodiment of the present technology.

FIG. 28 is a circuit diagram illustrating a configuration example of pixels 300-1 and 300-2 according to the fifth embodiment of the present technology. The pixel 300-1 includes a pre-stage circuit 310-1, a sample-and-hold circuit 320-1, a post-stage circuit 350-1, and a coupling circuit 470-1. The pixel 300-2 includes a pre-stage circuit 310-2, a sample-and-hold circuit 320-2, a post-stage circuit 350-2, and a coupling circuit 470-2. Furthermore, the pixels 300-1 and 300-2 further include a post-stage reset transistor 341, but the post-stage reset transistor 341 is omitted in the drawing for convenience of description.

The coupling circuits 470-1 and 470-2 couple the sample-and-hold circuit 320-1 and the sample-and-hold circuit 320-2 in parallel in accordance with a selection signal SELh from the vertical scanning circuit 211.

The coupling circuit 470-1 includes selectors 471 and 472. The selector 471 opens and closes a path between the post-stage node 340-1 of the pixel 300-1 and the coupling circuit 470-2 in accordance with the selection signal SELh. The selector 472 opens and closes a path between a pre-stage node 319-1 of the pixel 300-1 and the coupling circuit 470-2 in accordance with the selection signal SELh. The circuit configuration of the coupling circuit 470-2 is similar to that of the coupling circuit 470-1.

When generating the low gain signal, the vertical scanning circuit 211 controls the coupling circuits 470-1 and 470-2 to couple the sample-and-hold circuit 320-1 and the sample-and-hold circuit 320-2 in parallel. Furthermore, at this time, the vertical scanning circuit 211 controls the two selection transistors (selection transistors 331 and 332, and the like) to be in a closed state as necessary. Through these controls, the plurality of capacitor elements is connected in parallel, and a low gain signal is generated.

Figure 29:
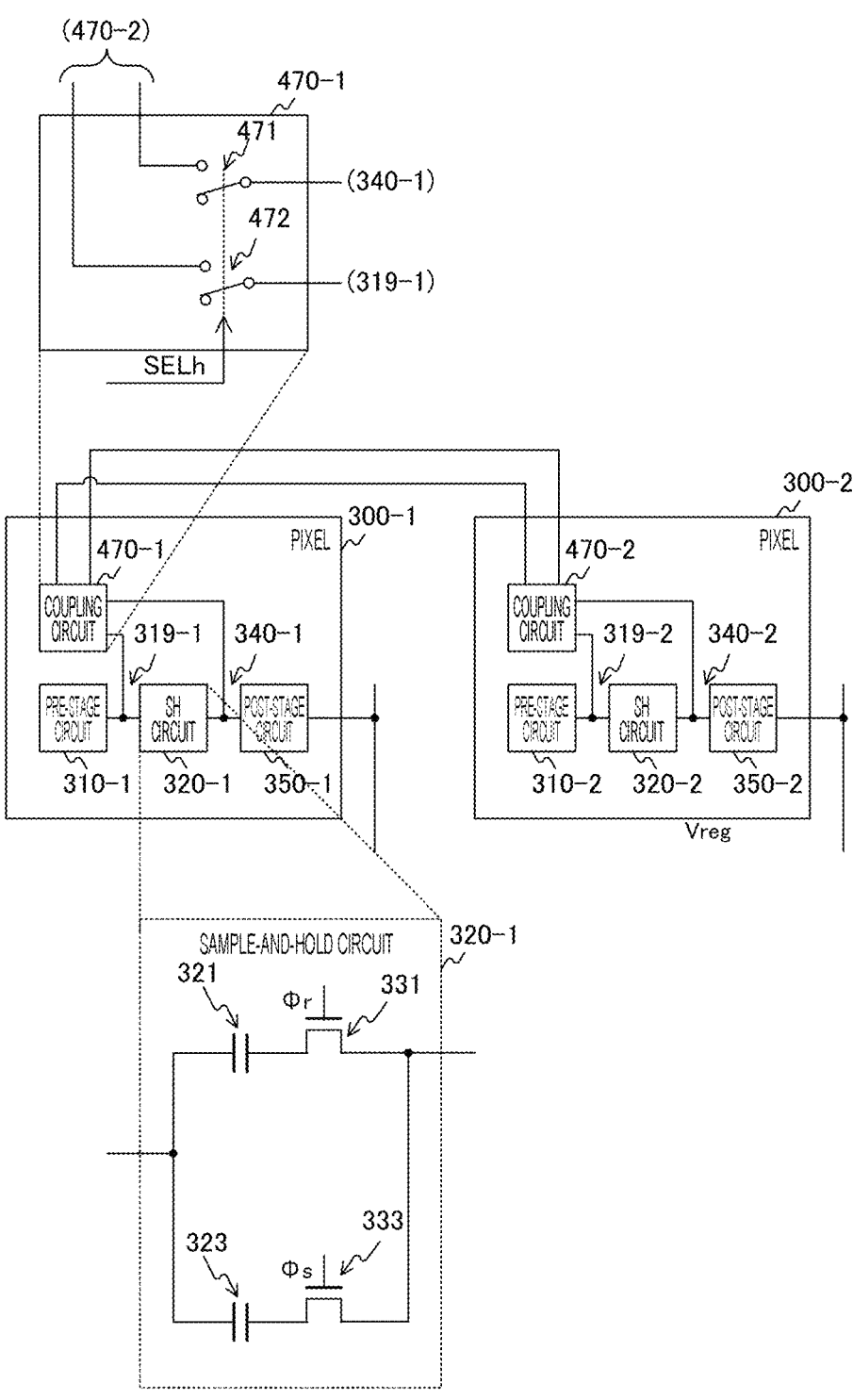
FIG. 29 is a circuit diagram illustrating a configuration example of a pixel with reduced elements according to the fifth embodiment of the present technology.

Note that, as illustrated in FIG. 29, in the fifth embodiment, the capacitor element and the selection transistor in the sample-and-hold circuit 320-1 can be reduced by half. Even in this case, a low gain signal can be generated by coupling the sample-and-hold circuits 320-1 and 320-2.

In addition, two pixels adjacent in the horizontal direction are connected, but three or more pixels can be connected. Furthermore, the pixels adjacent in the horizontal direction are not connected to each other, and instead, a plurality of pixels adjacent in the vertical direction can be connected.

Figure 30:
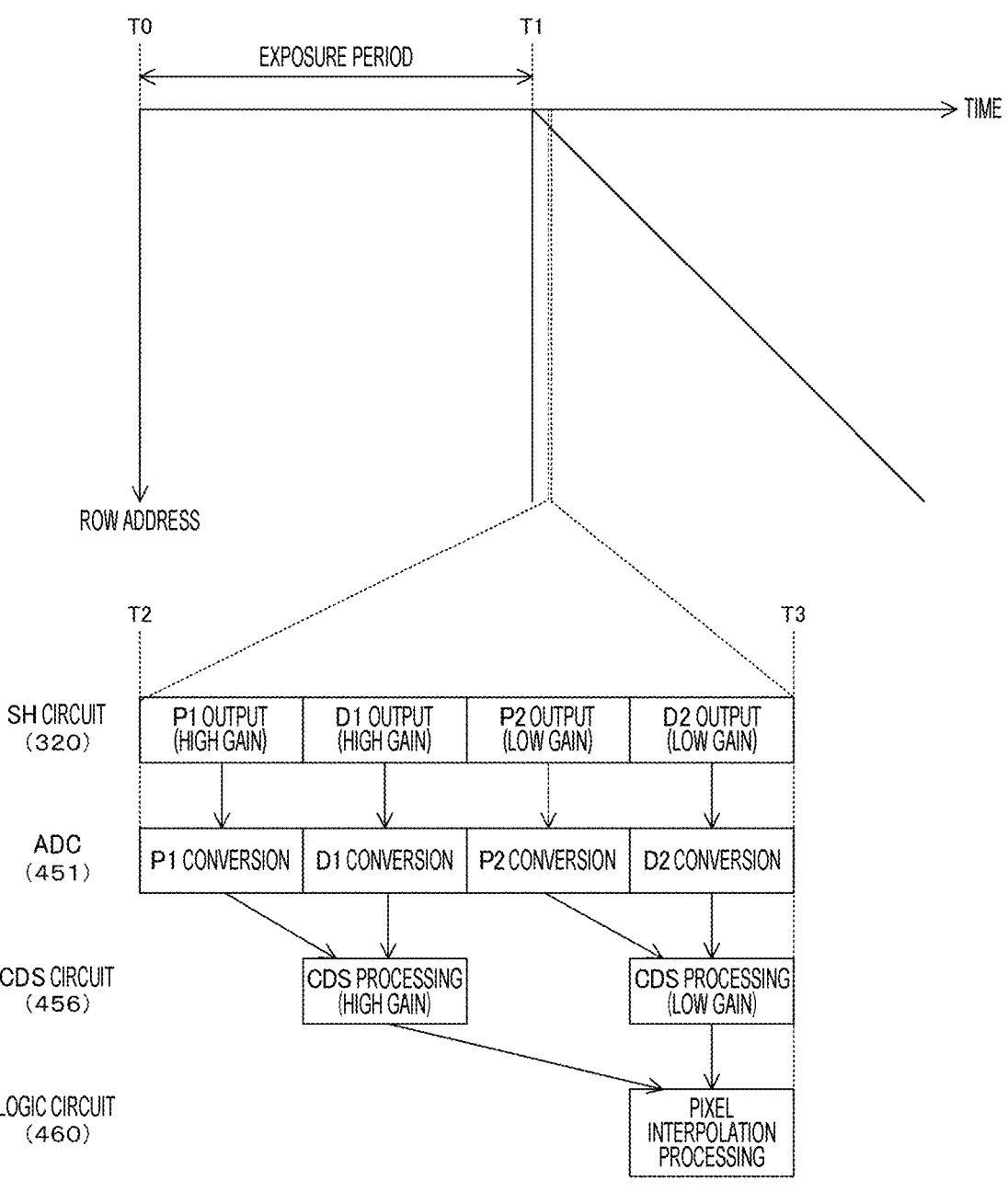
FIG. 30 is a timing chart illustrating an example of an operation of a solid-state imaging element according to the fifth embodiment of the present technology.

FIG. 30 is a timing chart illustrating an example of an operation of a solid-state imaging element 200 according to the fifth embodiment of the present technology. The pixel array unit 220 is exposed by the global shutter method. At the end of the exposure, each sample-and-hold circuit 320 of the pixel holds a high gain signal P1 corresponding to the P-phase level and a high gain signal D1 corresponding to the D-phase level.

After timing T1, the pixel signals are sequentially read for each row. It is assumed that a read period of a certain row is from timing T2 to timing T3. During this read period, the sample-and-hold circuit 320 in the corresponding row outputs the held high gain signals P1 and D1. The ADC 451 performs AD conversion on these analog signals, and the CDS circuit 456 performs CDS processing.

Then, the vertical scanning circuit 211 couples the sample-and-hold circuits of the two pixels adjacent in the horizontal direction to generate low gain signals P2 and D2. The sample-and-hold circuit 320 in the corresponding row outputs the generated low gain signals P2 and D2. The ADC 451 performs AD conversion on these analog signals, and the CDS circuit 456 performs CDS processing.

The result of the CDS processing on the high gain signals P1 and D1 corresponds to each pixel signal of two adjacent pixels. The result of the CDS processing on the low gain signals P2 and D2 corresponds to the average value of the respective pixel signals of the two adjacent pixels. The logic circuit 460 performs pixel interpolation processing of interpolating a pixel signal between two adjacent pixels using the average value. This processing improves the resolution in the horizontal direction. This interpolation processing is also called super-resolution processing.

Figure 31A:
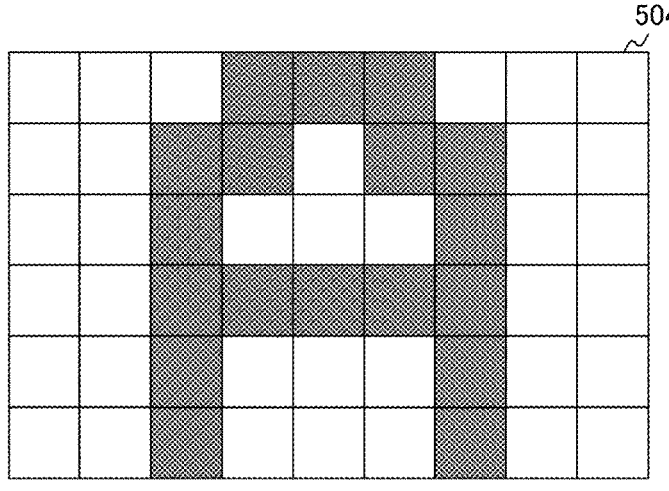
FIGS. 31A and 31B are diagrams illustrating an example of frames before and after pixel interpolation according to the fifth embodiment of the present technology.
Figure 31B:
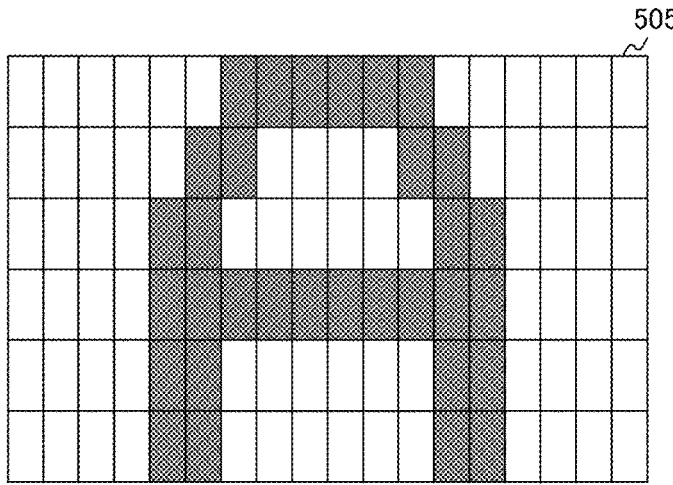

FIGS. 31A and 31B are diagrams illustrating an example of frames before and after pixel interpolation according to the fifth embodiment of the present technology. In the drawing, FIG. 31A illustrates an example of a frame 504 before pixel interpolation. In the drawing, FIG. 31B illustrates an example of a frame 505 after pixel interpolation. As illustrated in FIG. 31B of the drawing, the resolution in the horizontal direction is improved by the pixel interpolation as compared with FIG. 31A of the drawing.

In this way, according to the fifth embodiment of the present technology, since the coupling circuit 470-1 couples the sample-and-hold circuits of the two pixels adjacent in the horizontal direction, the resolution in the horizontal direction can be improved by the pixel interpolation processing.

6. Sixth Embodiment

In the fifth embodiment described above, the sample-and-hold circuits of two pixels adjacent in the horizontal direction are coupled, but a coupling direction and the number of pixels can be made variable. A solid-state imaging element 200 of this sixth embodiment is different from the solid-state imaging element 200 of the fifth embodiment in that a coupling direction is variable.

Figure 32:
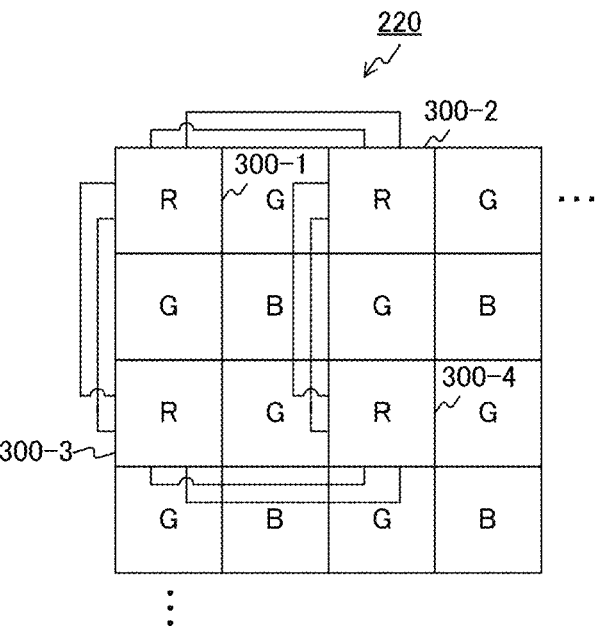
FIG. 32 is a block diagram illustrating a configuration example of a pixel array unit according to a sixth embodiment of the present technology.

FIG. 32 is a block diagram illustrating a configuration example of a pixel array unit 220 according to the sixth embodiment of the present technology. In the sixth embodiment, in addition to the horizontal direction, two pixels of the same color adjacent in the vertical direction are further connected.

For example, R pixels 300-1 and 300-2 adjacent in the horizontal direction are connected, and R pixels 300-1 and 300-3 adjacent in the vertical direction are connected. Similarly, for B and G, two pixels of the same color adjacent in the horizontal direction and the vertical direction are connected. In the drawing, signal lines connecting B and G pixels are omitted for convenience of description.

Figure 33:
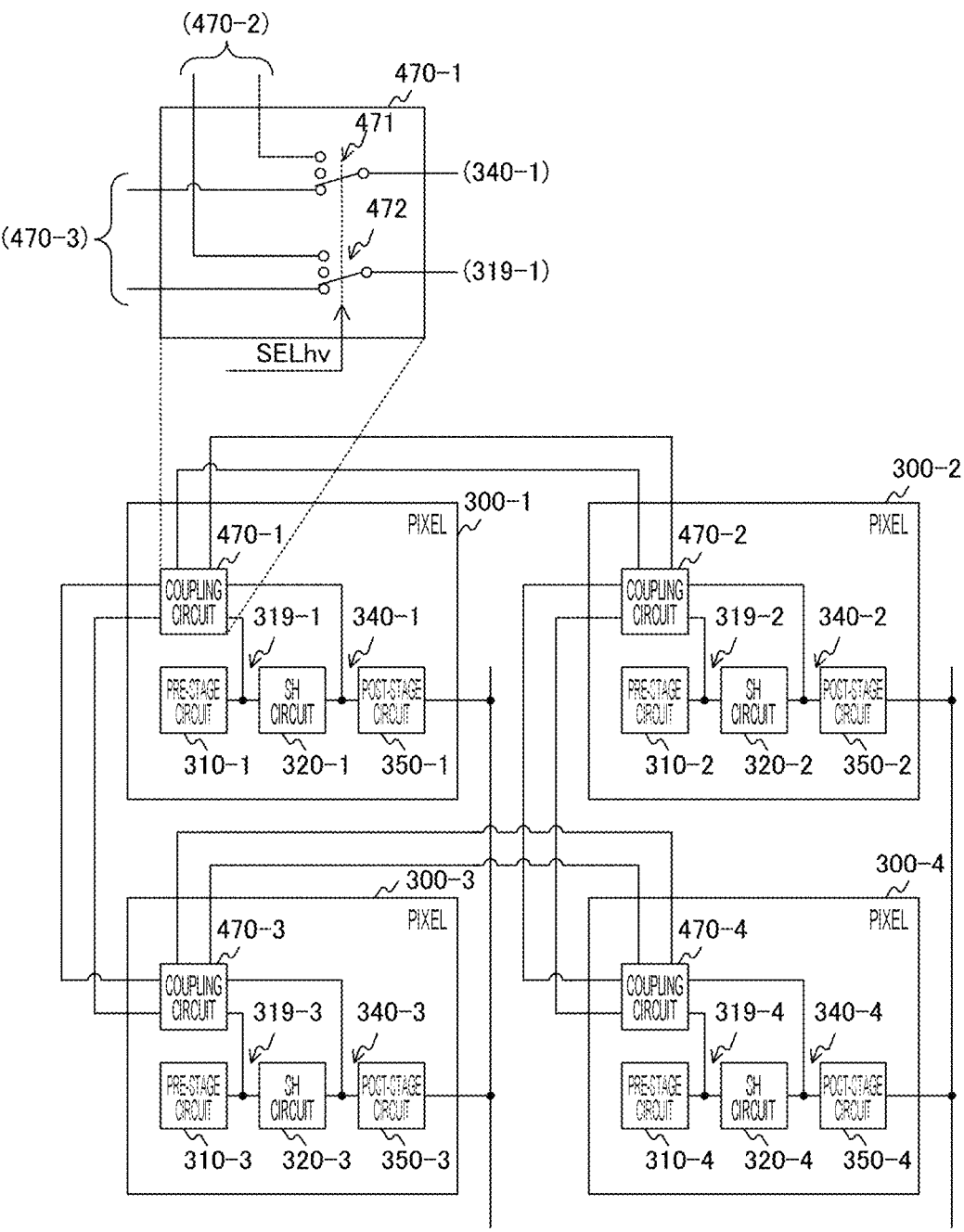
FIG. 33 is a circuit diagram illustrating a configuration example of a pixel according to the sixth embodiment of the present technology.

FIG. 33 is a circuit diagram illustrating a configuration example of pixels according to the sixth embodiment of the present technology. The pixel 300-3 includes a pre-stage circuit 310-3, a sample-and-hold circuit 320-3, a post-stage circuit 350-3, and a coupling circuit 470-3. Further, for convenience of description, the post-stage reset transistor 341 is omitted in the drawing.

In the coupling circuit 470-1, the selector 471 connects the connection destination of the post-stage node 340-1 to one of the sample-and-hold circuit 320-1, the sample-and-hold circuit 320-3, and a predetermined node in accordance with a selection signal SELhv. In the case of connecting to a predetermined node, the post-stage node 340-1 is disconnected from the sample-and-hold circuits 320-1 and 320-3. The selector 472 connects the connection destination of the pre-stage node 319-1 to one of the sample-and-hold circuit 320-1, the sample-and-hold circuit 320-3, and a predetermined node in accordance with the selection signal SELhv.

With the circuit configuration in the drawing, the vertical scanning circuit 211 can control the coupling direction to either the horizontal direction or the horizontal direction. In the case of coupling in the vertical direction, the resolution in the vertical direction can be improved by the pixel interpolation processing. Furthermore, in a case where both the horizontal direction and the vertical direction are sequentially coupled, the resolution in both the horizontal direction and the vertical direction can be improved by the pixel interpolation processing.

Note that the number of pixels to be coupled is fixed to two pixels, but the number of pixels to be coupled can be made variable.

Figure 34A:
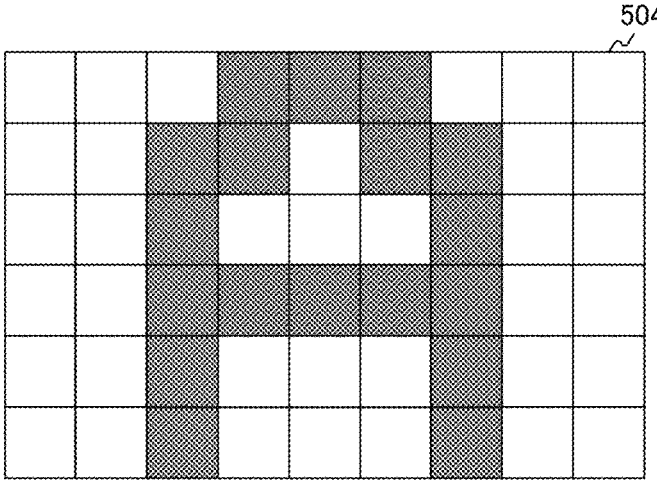
FIGS. 34A and 34B are diagrams illustrating an example of frames before and after pixel interpolation in a vertical direction according to the sixth embodiment of the present technology.
Figure 34B:
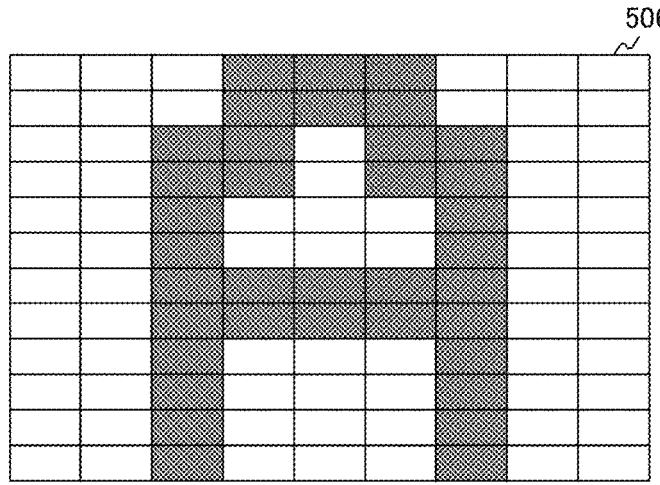

FIGS. 34A and 34B are diagrams illustrating an example of frames before and after pixel interpolation in the vertical direction according to the sixth embodiment of the present technology. In the drawing, FIG. 34A is a diagram illustrating an example of a frame 504 before pixel interpolation. In the drawing, FIG. 34B is a diagram illustrating an example of a frame 506 on which the pixel interpolation processing has been performed in the vertical direction. As illustrated in FIG. 34B of the drawing, the resolution in the vertical direction is improved by the pixel interpolation as compared with FIG. 34A of the drawing.

Figure 35A:
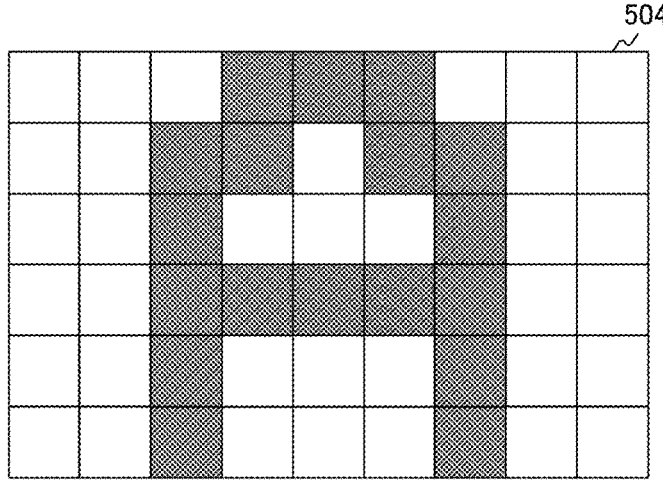
FIGS. 35A and 35B are diagrams illustrating an example of frames before and after pixel interpolation in a horizontal direction and the vertical direction according to the sixth embodiment of the present technology.
Figure 35B:
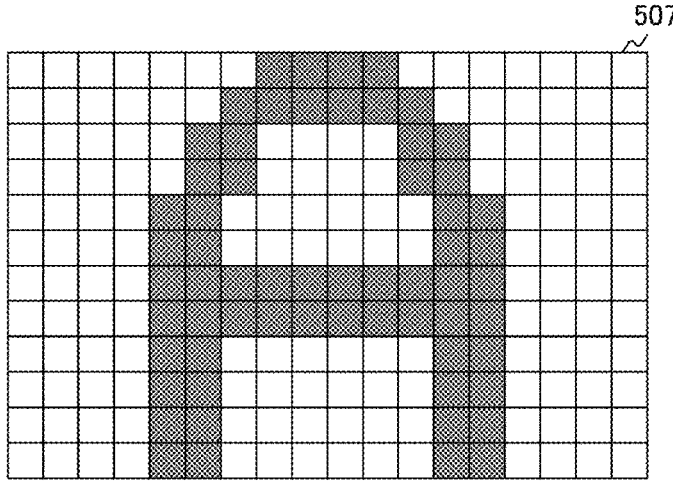

FIGS. 35A and 35B are diagrams illustrating an example of frames before and after pixel interpolation in the horizontal direction and the vertical direction according to the sixth embodiment of the present technology. In the drawing, FIG. 35A is a diagram illustrating an example of a frame 504 before pixel interpolation. In the drawing, FIG. 35B is a diagram illustrating an example of a frame 507 on which the pixel interpolation processing has been performed in the horizontal direction and the vertical direction. As illustrated in FIG. 35B of the drawing, the resolution in the horizontal direction and the vertical direction is improved by the pixel interpolation as compared with FIG. 35A of the drawing.

In this way, according to the sixth embodiment of the present technology, since the coupling circuit 470-1 couples the sample-and-hold circuit 320-1 to either of the sample-and-hold circuits 320-2 and 320-3, it is possible to change the direction of improving the resolution.

7. Seventh Embodiment

In the first embodiment described above, the vertical scanning circuit 211 initializes the post-stage node 340 and then sets the selection signal $\Phi r1$ to a high level, but the control is not limited to this. A vertical scanning circuit 211 of this seventh embodiment is different from the vertical scanning circuit 211 of the first embodiment in that the selection signal $\Phi r1$ is set to the high level and then the post-stage node 340 is initialized.

Figure 36:
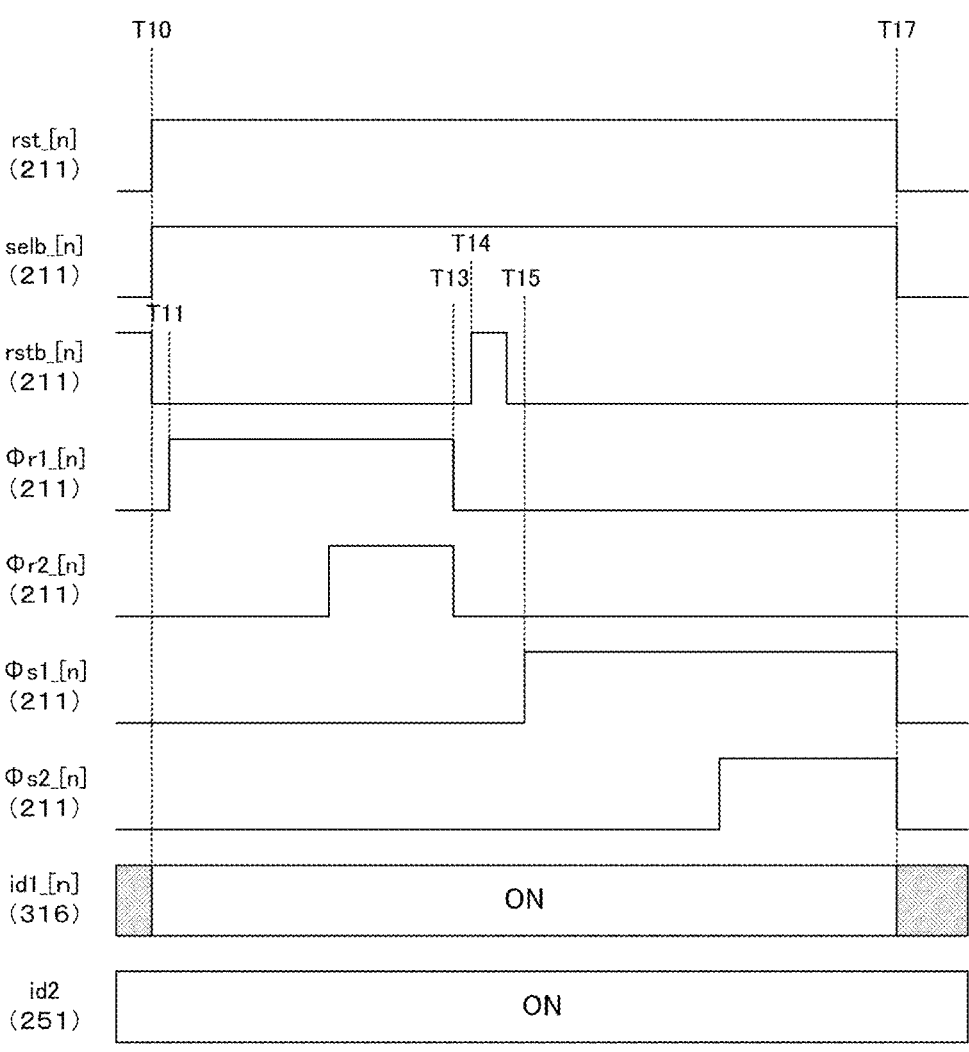
FIG. 36 is a timing chart illustrating an example of a read operation according to a seventh embodiment of the present technology.

FIG. 36 is a timing chart illustrating an example of a read operation according to the seventh embodiment of the present technology. During a read period of the n-th row from timing T10 to timing T17, the vertical scanning circuit 211 sets the FD reset signal rst and the post-stage selection signal selb of the n-th row to the high level. Furthermore, during the read period, the post-stage reset signal rstb of all rows is controlled to the low level.

The vertical scanning circuit 211 supplies a high-level selection signal $\Phi r1$ to the n-th row over a period from timing T11 immediately after timing T10 to timing T13.

The vertical scanning circuit 211 supplies a high-level post-stage reset signal rstb to the n-th row over the pulse period from timing T14 immediately after timing T13. Accordingly, in a case where a parasitic capacitance exists in the post-stage node 340, the history of the previous signal held in the parasitic capacitance can be erased. The vertical scanning circuit 211 supplies a high-level selection signal $\Phi s1$ to the n-th row over a period from timing T15 immediately after the initialization of the post-stage node 340 to timing T17.

Through the control illustrated in the drawing, the selection circuit 330 of the selected row sequentially performs control to connect the capacitor element 321 to the post-stage node 340, control to disconnect the capacitor elements 321 to 324 from the post-stage node 340, and control to connect the capacitor element 323 to the post-stage node 340. Furthermore, when the capacitor elements 321 to 324 are disconnected from the post-stage node 340, the post-stage reset transistor 341 of the selected row initializes the level of the post-stage node 340.

By disconnecting the capacitor elements 321 to 324 at the time of driving the post-stage reset transistor 341, kTC noise generated at that time can be reduced. Thereby, the image quality of the frame can be improved.

Note that, each of the first to sixth embodiments can be applied to the seventh embodiment.

In this way, according to the seventh embodiment of the present technology, since the post-stage reset transistor 341 initializes the post-stage node 340 when the capacitor elements 321 to 324 are disconnected from the post-stage node 340, kTC noise can be reduced.

First Modification Example

In the seventh embodiment described above, the pre-stage circuit 310 reads a signal with the pre-stage circuit 310 connected to the pre-stage node 319, but this configuration cannot block noise from the pre-stage node 319 during reading. A pixel 300 of a first modification example of the seventh embodiment is different from the pixel 300 of the seventh embodiment in that a transistor is inserted between the pre-stage circuit 310 and the pre-stage node 319.

Figure 37:
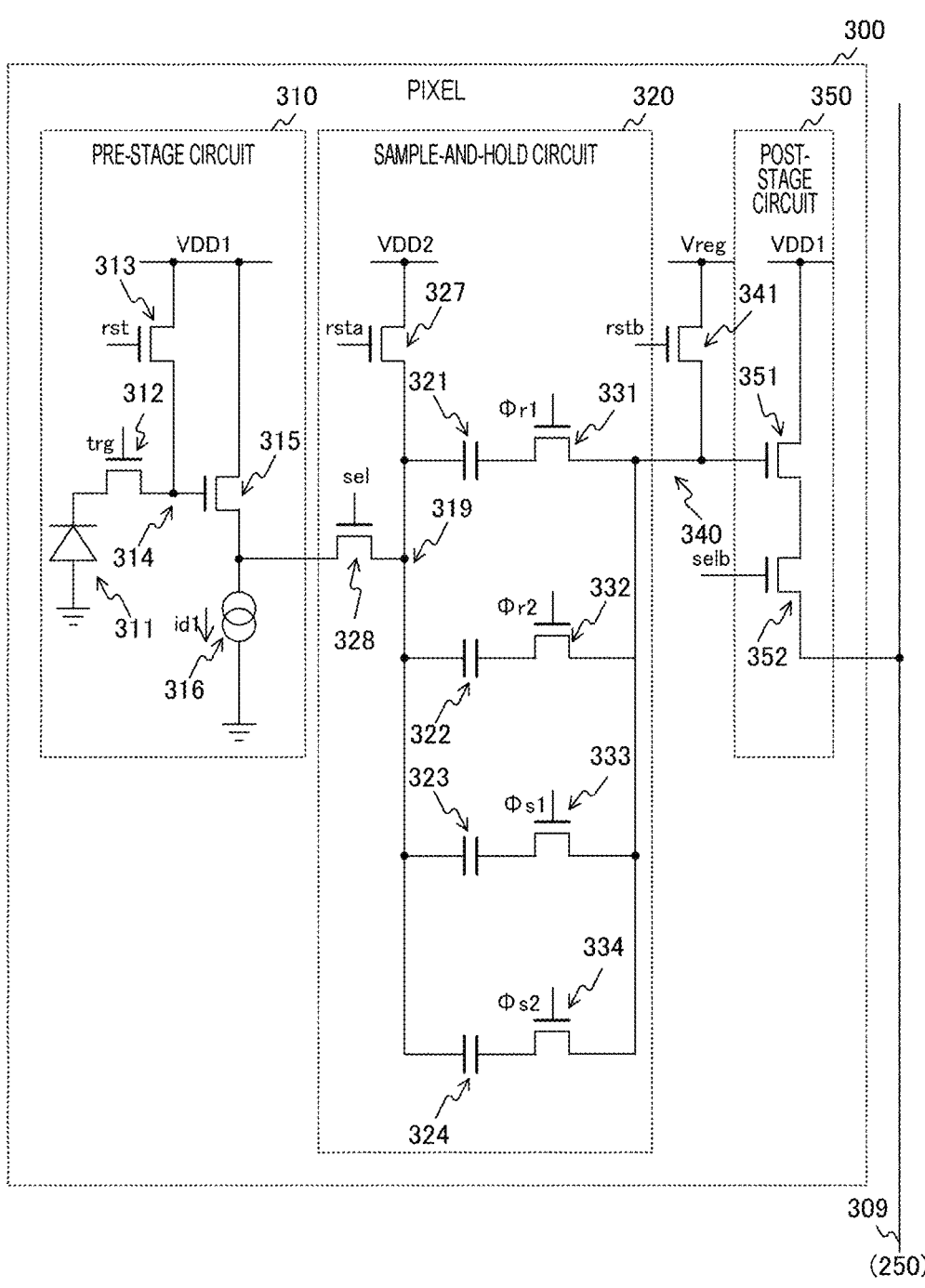
FIG. 37 is a circuit diagram illustrating a configuration example of a pixel according to a first modification example of the seventh embodiment of the present technology.

FIG. 37 is a circuit diagram illustrating a configuration example of the pixel 300 according to the first modification example of the seventh embodiment of the present technology. The pixel 300 of the first modification example of the seventh embodiment is different from the pixel 300 of the first embodiment in that a pre-stage reset transistor 327 and a pre-stage selection transistor 328 are further provided. Furthermore, the power supply voltage of the pre-stage circuit 310 and the post-stage circuit 350 of the first modification example of the seventh embodiment is denoted as VDD1.

The pre-stage reset transistor 327 initializes the level of the pre-stage node 319 with a power supply voltage VDD2. It is desirable that the power supply voltage VDD2 be set to a value satisfying the following expression.

$$VDD2 = VDD1 - Vgs \qquad \text{Expression 1}$$

In the above expression, Vgs is a gate-source voltage of the pre-stage amplification transistor 315.

Setting to the value satisfying Expression 1 allow a reduction in variations in potential between the pre-stage node 319 and the post-stage node 340 in the dark. This makes it possible to improve photo response non-uniformity (PRNU).

The pre-stage selection transistor 328 opens and closes a path between the pre-stage circuit 310 and the pre-stage node 319 in accordance with a pre-stage selection signal sel from the vertical scanning circuit 211.

Figure 38:
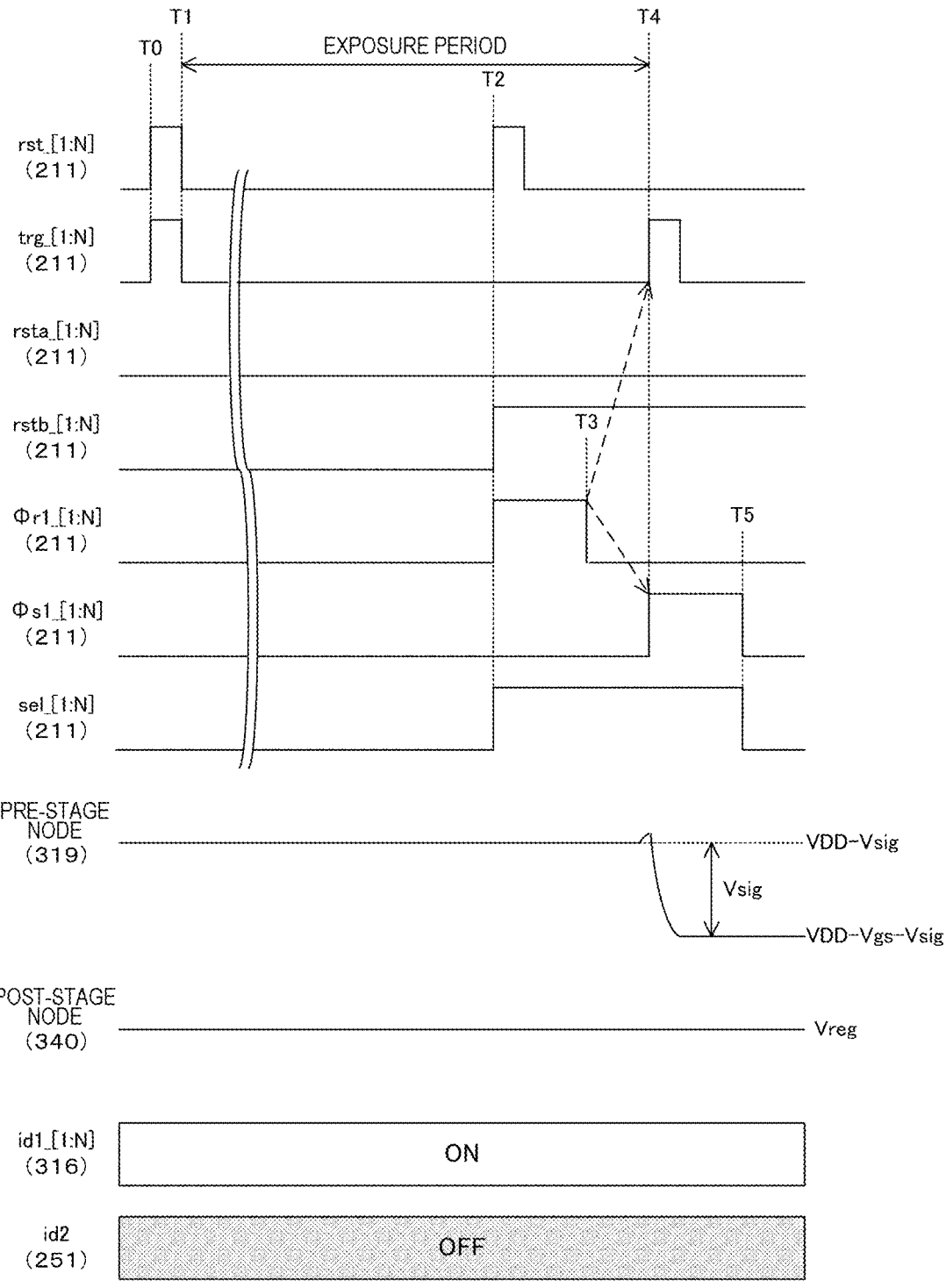
FIG. 38 is a timing chart illustrating an example of a global shutter operation according to the first modification example of the seventh embodiment of the present technology.

FIG. 38 is a timing chart illustrating an example of a global shutter operation according to the first modification example of the seventh embodiment of the present technology. The timing chart of the first modification example of the seventh embodiment is different from the timing chart of the seventh embodiment in that the vertical scanning circuit 211 further supplies a pre-stage reset signal rsta and the pre-stage selection signal sel. In the drawing, rsta_[n] and sel_[n] indicate signals to pixels in the n-th row.

The vertical scanning circuit 211 supplies a high-level pre-stage selection signal sel to all pixels over a period from timing T2 immediately before the end of exposure to timing T5. The pre-stage reset signal rsta is controlled to the low level.

Figure 39:
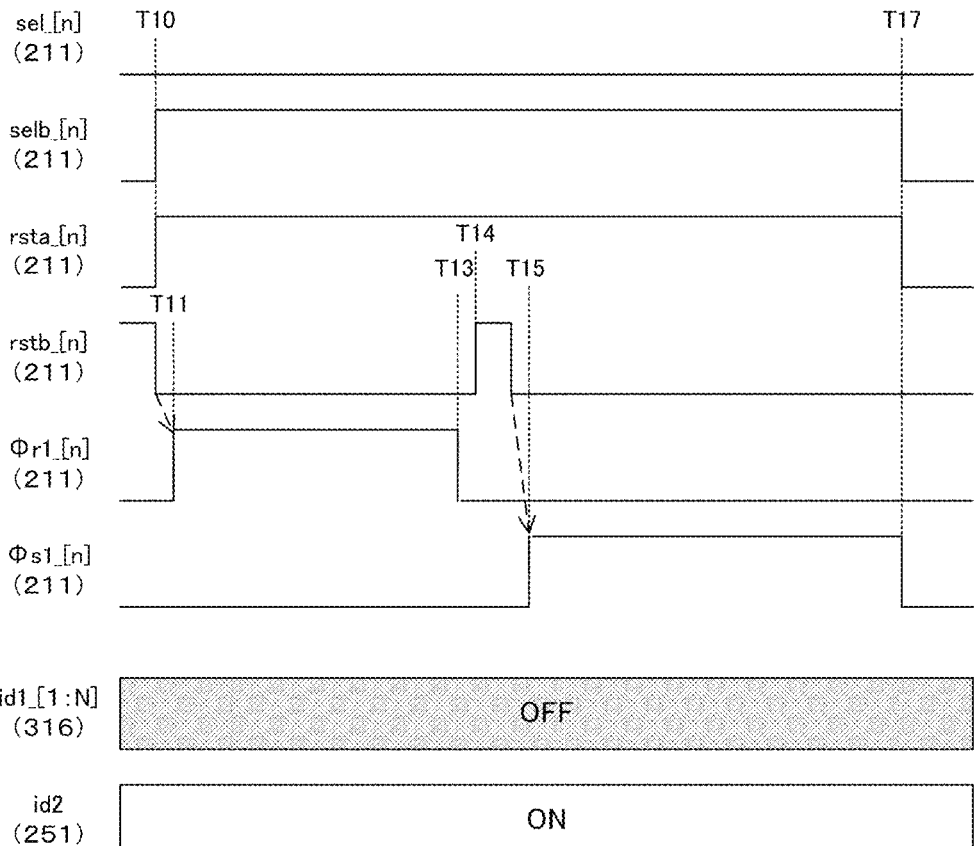
FIG. 39 is a timing chart illustrating an example of a read operation according to the first modification example of the seventh embodiment of the present technology.

FIG. 39 is a timing chart illustrating an example of a read operation according to the first modification example of the first embodiment of the present technology. During reading of each row, the pre-stage selection signal sel is controlled to the low level. Through this control, the pre-stage selection transistor 328 shifts to an open state, and the pre-stage node 319 is disconnected from the pre-stage circuit 310. Thereby, noise from the pre-stage node 319 can be blocked during reading.

Furthermore, during the read period of the n-th row from timing T10 to timing T17, the vertical scanning circuit 211 supplies a high-level pre-stage reset signal rsta to the n-th row.

Furthermore, during reading, the vertical scanning circuit 211 controls the current source transistors 316 of all pixels to stop the supply of the current id1. The current id2 is supplied in a manner similar to the first embodiment. In this way, the control of the current id1 is simplified as compared with the first embodiment.

In this way, according to the first modification example of the seventh embodiment of the present technology, since the pre-stage selection transistor 328 shifts to the open state during reading to disconnect the pre-stage circuit 310 from the pre-stage node 319, it is possible to block noise from the pre-stage circuit 310.

Second Modification Example

In the seventh embodiment described above, the circuits in the solid-state imaging element 200 are provided in a single semiconductor chip, but there is a possibility that this configuration prevents the elements from fitting in the semiconductor chip in a case where the pixel 300 is miniaturized. A solid-state imaging element 200 of a second modification example of the seventh embodiment is different from the solid-state imaging element 200 of the first embodiment in that the circuits in the solid-state imaging element 200 are dispersedly disposed in two semiconductor chips.

Figure 40:
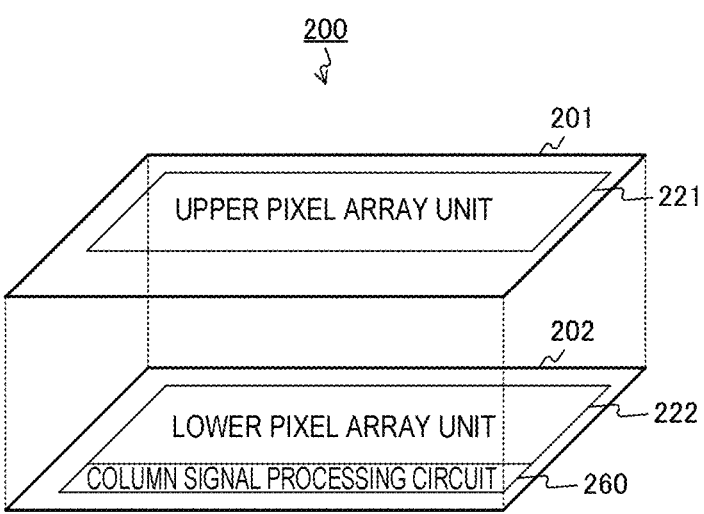
FIG. 40 is a view illustrating an example of a stacked structure of a solid-state imaging element according to a second modification example of the seventh embodiment of the present technology.

FIG. 40 is a view illustrating an example of a stacked structure of the solid-state imaging element 200 according to the second modification example of the seventh embodiment of the present technology. The solid-state imaging element 200 of the seventh modification example of the second embodiment includes a lower pixel chip 202 and an upper pixel chip 201 stacked on the lower pixel chip 202. These chips are electrically connected by, for example, Cu—Cu bonding. Note that, in addition to the Cu—Cu bonding, the connection can be made using a via or a bump.

An upper pixel array unit 221 is disposed in the upper pixel chip 201. A lower pixel array unit 222 and a column signal processing circuit 260 are disposed in the lower pixel chip 202. For each pixel in the pixel array unit 220, a part of the pixel is disposed in the upper pixel array unit 221, and the rest is disposed in the lower pixel array unit 222.

Furthermore, in the lower pixel chip 202, a vertical scanning circuit 211, a timing control circuit 212, a DAC 213, and a load MOS circuit block 250 are also disposed. These circuits are omitted in the drawing.

Furthermore, the upper pixel chip 201 is manufactured, for example, by a pixel-dedicated process, and the lower pixel chip 202 is manufactured, for example, by a complementary MOS (CMOS) process.

Figure 41:
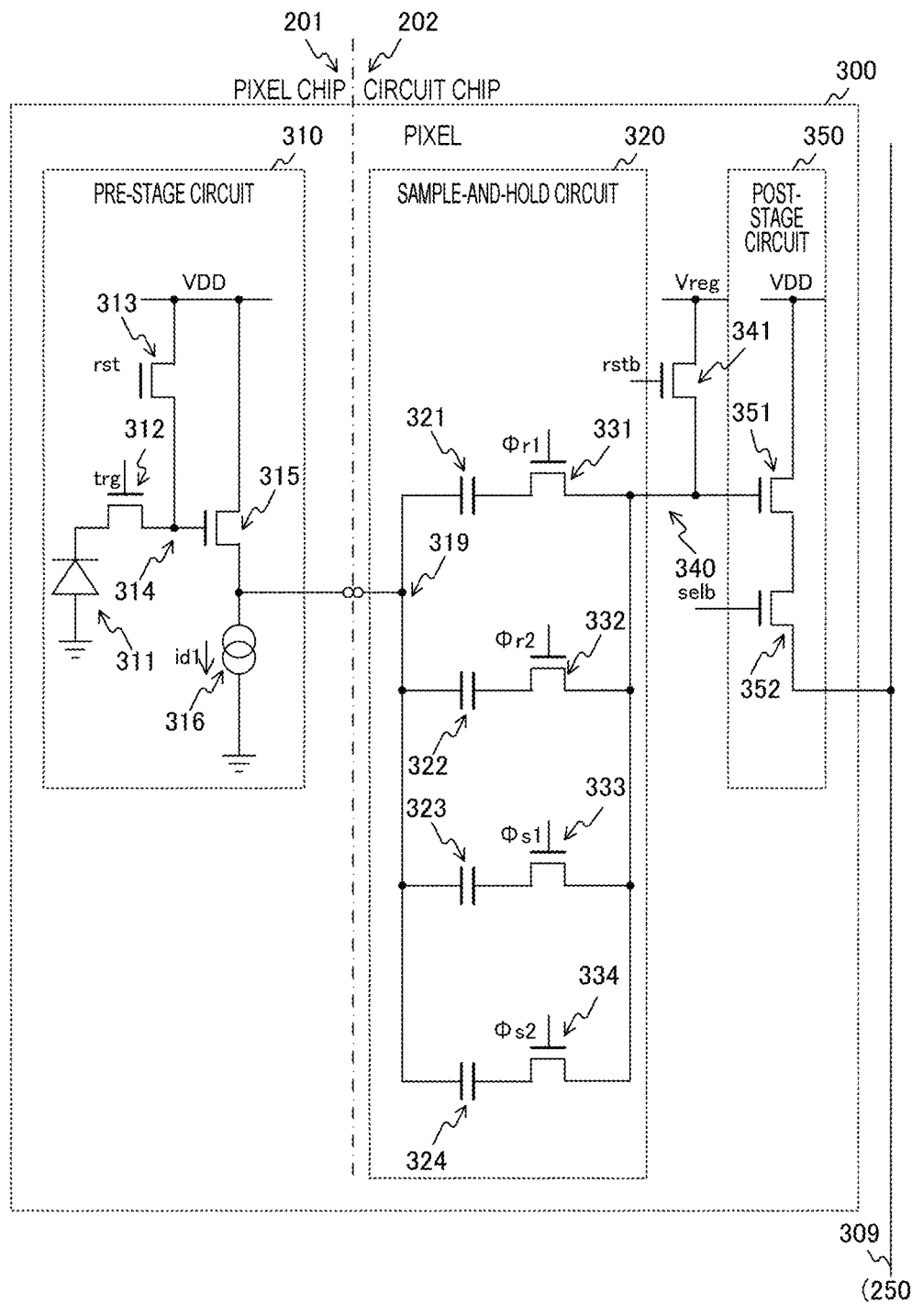
FIG. 41 is a circuit diagram illustrating a configuration example of a pixel according to the second modification example of the seventh embodiment of the present technology.

FIG. 41 is a circuit diagram illustrating a configuration example of the pixel 300 according to the second modification example of the seventh embodiment of the present technology. In the pixel 300, the pre-stage circuit 310 is disposed in the upper pixel chip 201, and the other circuits and elements (such as the capacitor elements 321 and 322) are disposed in the lower pixel chip 202. Note that the current source transistor 316 can be further disposed in the lower pixel chip 202. As illustrated in the drawing, dispersedly disposing the elements in the pixel 300 in the upper pixel chip 201 and lower pixel chip 202 stacked on top of each other allows a reduction in pixel area, thereby facilitating pixel miniaturization.

In this way, according to the second modification example of the seventh embodiment of the present technology, since the circuits and elements in the pixel 300 are dispersedly disposed in the two semiconductor chips, pixel miniaturization is facilitated.

Third Modification Example

In the second modification example of the seventh embodiment described above, a part of the pixel 300 and the peripheral circuits (such as the column signal processing circuit 260) are provided in the lower pixel chip 202 on the lower side. However, in this configuration, the arrangement area of the circuits and elements on the lower pixel chip 202 side is larger than the arrangement area of the upper pixel chip 201 by the peripheral circuit, and there is a possibility that an unnecessary space without circuits and elements is generated in the upper pixel chip 201. A solid-state imaging element 200 of a third modification example of the seventh embodiment is different from the solid-state imaging element 200 of the second modification example of the seventh embodiment in that the circuits in the solid-state imaging element 200 are dispersedly disposed in three semiconductor chips.

Figure 42:
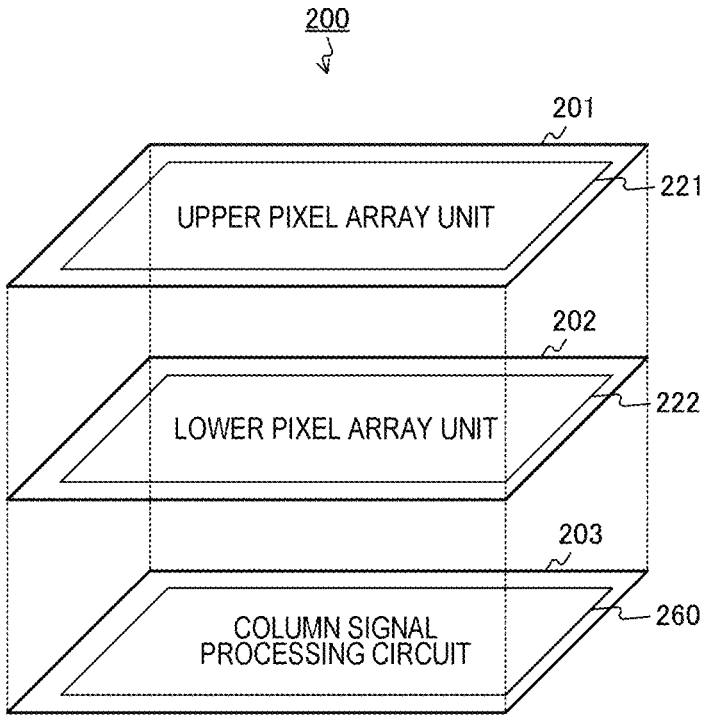
FIG. 42 is a view illustrating an example of a stacked structure of a solid-state imaging element according to a third modification example of the seventh embodiment of the present technology.

FIG. 42 is a view illustrating an example of a stacked structure of the solid-state imaging element 200 according to the third modification example of the seventh embodiment of the present technology. The solid-state imaging element 200 of the third modification example of the seventh embodiment includes the upper pixel chip 201, the lower pixel chip 202, and a circuit chip 203. These chips are stacked, and are electrically connected by, for example, Cu—Cu bonding. Note that, in addition to the Cu—Cu bonding, the connection can be made using a via or a bump.

An upper pixel array unit 221 is disposed in the upper pixel chip 201. The lower pixel array unit 222 is disposed in the lower pixel chip 202. For each pixel in the pixel array unit 220, a part of the pixel is disposed in the upper pixel array unit 221, and the rest is disposed in the lower pixel array unit 222.

Furthermore, in the circuit chip 203, the column signal processing circuit 260, the vertical scanning circuit 211, the timing control circuit 212, the DAC 213, and the load MOS circuit block 250 are disposed. Circuits other than the column signal processing circuit 260 are omitted in the drawing.

Adopting the three-layer configuration as illustrated in the drawing allows a reduction in unnecessary space and further pixel miniaturization as compared with the two-layer configuration. Furthermore, the lower pixel chip 202 that is the second layer can be manufactured by a dedicated process for the capacitor and switch.

In this way, in the third modification example of the seventh embodiment of the present technology, since the circuits in the solid-state imaging element 200 are dispersedly disposed in the three semiconductor chips, the pixel can be further miniaturized as compared with a case where the circuits are dispersedly disposed in the two semiconductor chips.

8. Eighth Embodiment

In the seventh embodiment described above, the reset level is sampled and held in the exposure period, but this configuration prevents the exposure period from being shorter than the sample and hold period of the reset level. A solid-state imaging element 200 of this eighth embodiment is different from the solid-state imaging element 200 of the seventh embodiment in that a transistor that discharges charges from a photoelectric conversion element is added to make the exposure period shorter.

Figure 43:
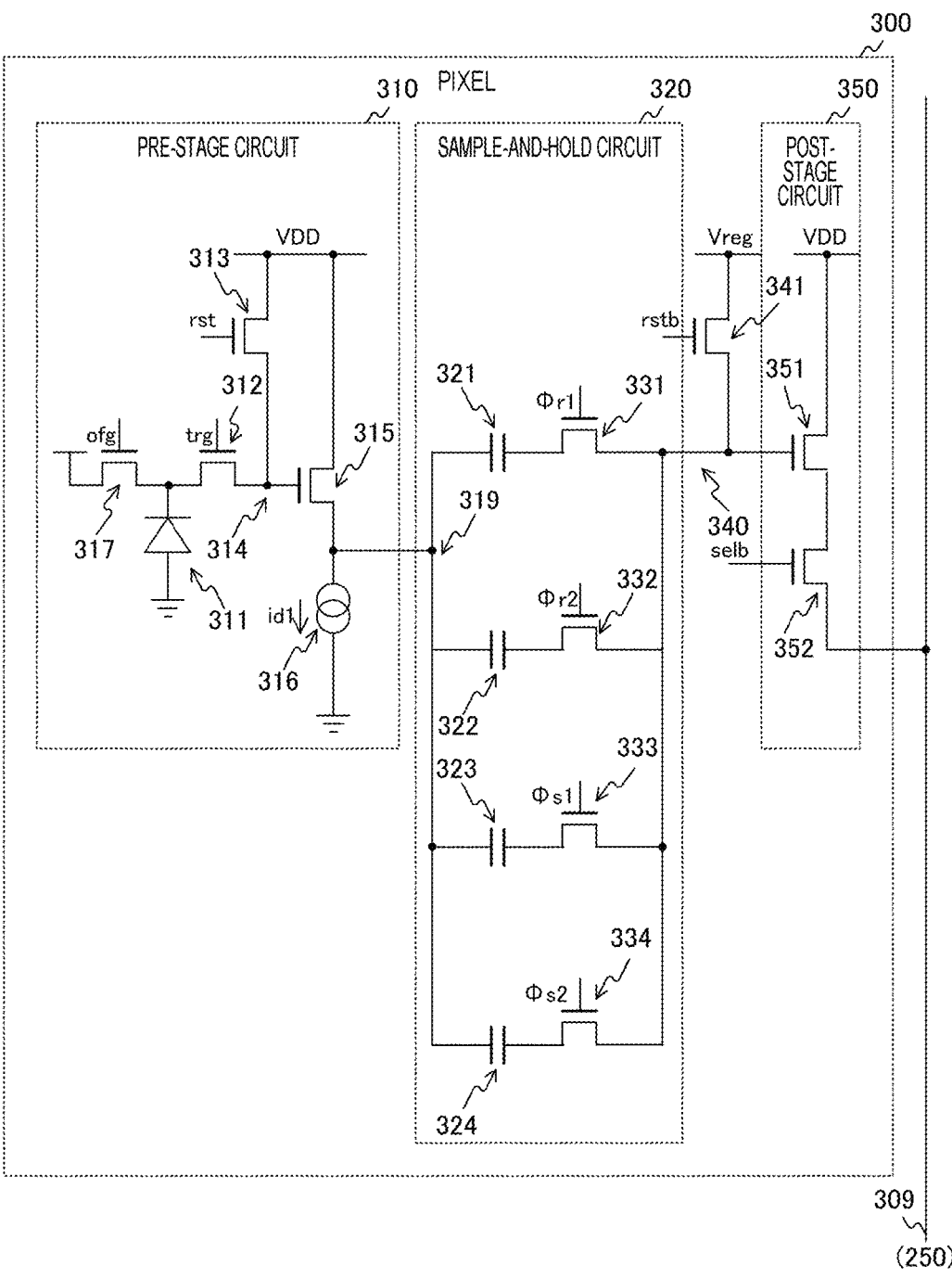
FIG. 43 is a circuit diagram illustrating a configuration example of a pixel according to an eighth embodiment of the present technology.

FIG. 43 is a circuit diagram illustrating a configuration example of a pixel 300 according to the eighth embodiment of the present technology. The pixel 300 of the eighth embodiment is different from the pixel 300 of the seventh embodiment in that a discharge transistor 317 is further provided in the pre-stage circuit 310.

The discharge transistor 317 functions as an overflow drain that discharges charges from the photoelectric conversion element 311 in accordance with a discharge signal ofg from the vertical scanning circuit 211. As the discharge transistor 317, for example, an nMOS transistors is used.

In a configuration in which the discharge transistor 317 is not provided as in the seventh embodiment, blooming may occur when charges are transferred from the photoelectric conversion element 311 to the FD 314 for all pixels. Then, at the time of FD reset, the potential of the FD 314 and the potential of the pre-stage node 319 drop. In response to the drop in potential, a charging and discharging current of the capacitor element 321 or the like continues to occur, and IR drop in the power supply or the ground changes from a steady state without blooming.

On the other hand, at the time of sampling and holding the signal levels of all pixels, after the transfer of the signal charges, the photoelectric conversion element 311 has no charge, so that blooming does not occur, and IR drop in the power supply or the ground goes into the steady state without blooming. Due to a difference in IR drop at the time of sampling and holding the reset level and the signal level, streaking noise occurs.

On the other hand, in the eighth embodiment in which the discharge transistor 317 is provided, the charges in the photoelectric conversion element 311 are discharged toward the overflow drain. Therefore, IR drops at the time of sampling and holding the reset level and the signal level become almost identical to each other, so that it is possible to suppress streaking noise.

Figure 44:
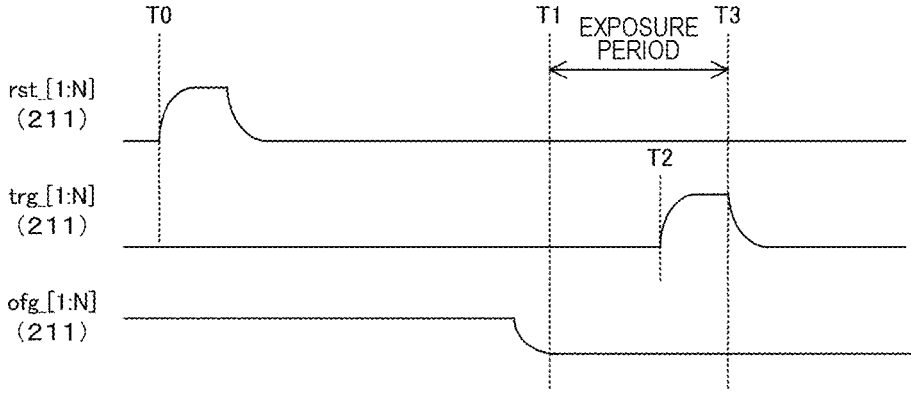
FIG. 44 is a timing chart illustrating an example of a global shutter operation according to the eighth embodiment of the present technology.

FIG. 44 is a timing chart illustrating an example of a global shutter operation according to the second embodiment of the present technology. At timing TO before the start of exposure, the vertical scanning circuit 211 supplies a high-level FD reset signal rst to all pixels over the pulse period while setting the discharge signal ofg to the high level for all pixels. Accordingly, the PD reset and the FD reset are performed for all pixels. Furthermore, the reset level is sampled and held. Here, ofg_[n] in the drawing indicates signals to pixels in the n-th row of the N rows.

Then, at timing T1 that is the start of exposure, the vertical scanning circuit 211 returns the discharge signal ofg to the low level for all pixels. Then, the vertical scanning circuit 211 supplies a high-level transfer signal trg to all pixels over a period from timing T2 immediately before the end of exposure to timing T3 at the end of exposure. Accordingly, the signal level is sampled and held.

In a configuration in which the discharge transistor 317 is not provided as in the seventh embodiment, both the transfer transistor 312 and the FD reset transistor 313 need to be turned on at the start of exposure (that is, at the time of PD reset). With this control, at the time of PD reset, the FD 314 also needs to be reset at the same time. Therefore, it is necessary to perform the FD reset again within the exposure period and sample and hold the reset level, and the exposure period cannot be made shorter than the sample and hold period of the reset level. When the reset levels of all pixels are sampled and held, a certain waiting time is required until the voltage or the current stabilizes, and for example, a sample and hold period of several microseconds (μs) to several tens of microseconds (μs) is required.

On the other hand, in the eighth embodiment in which the discharge transistor 317 is provided, the PD reset and the FD reset can be separately performed. Therefore, as illustrated in the drawing, it is possible to sample and hold the reset level by performing the FD reset before cancellation of the PD reset (the start of exposure). Thereby, the exposure period can be made shorter than the sample hold period of the reset level.

Note that, the first to third modification examples of the seventh embodiment can also be applied to the eighth embodiment.

In this way, according to the eighth embodiment of the present technology, since the discharge transistor 317 that discharges charges from the photoelectric conversion element 311 is provided, it is possible to sample and hold the reset level by performing the FD reset before the start of exposure. Thereby, the exposure period can be made shorter than the sample hold period of the reset level.

9. Ninth Embodiment

In the seventh embodiment described above, the FD 314 is initialized with the power supply voltage VDD, but there is a possibility that this configuration causes deterioration of photo response non-uniformity (PRNU) due to variations of the capacitor elements 321 to 324 or parasitic capacitance. A solid-state imaging element 200 of this ninth embodiment is different from the solid-state imaging element 200 of the seventh embodiment in that PRNU is improved by lowering the power supply of the FD reset transistor 313 during reading.

Figure 45:
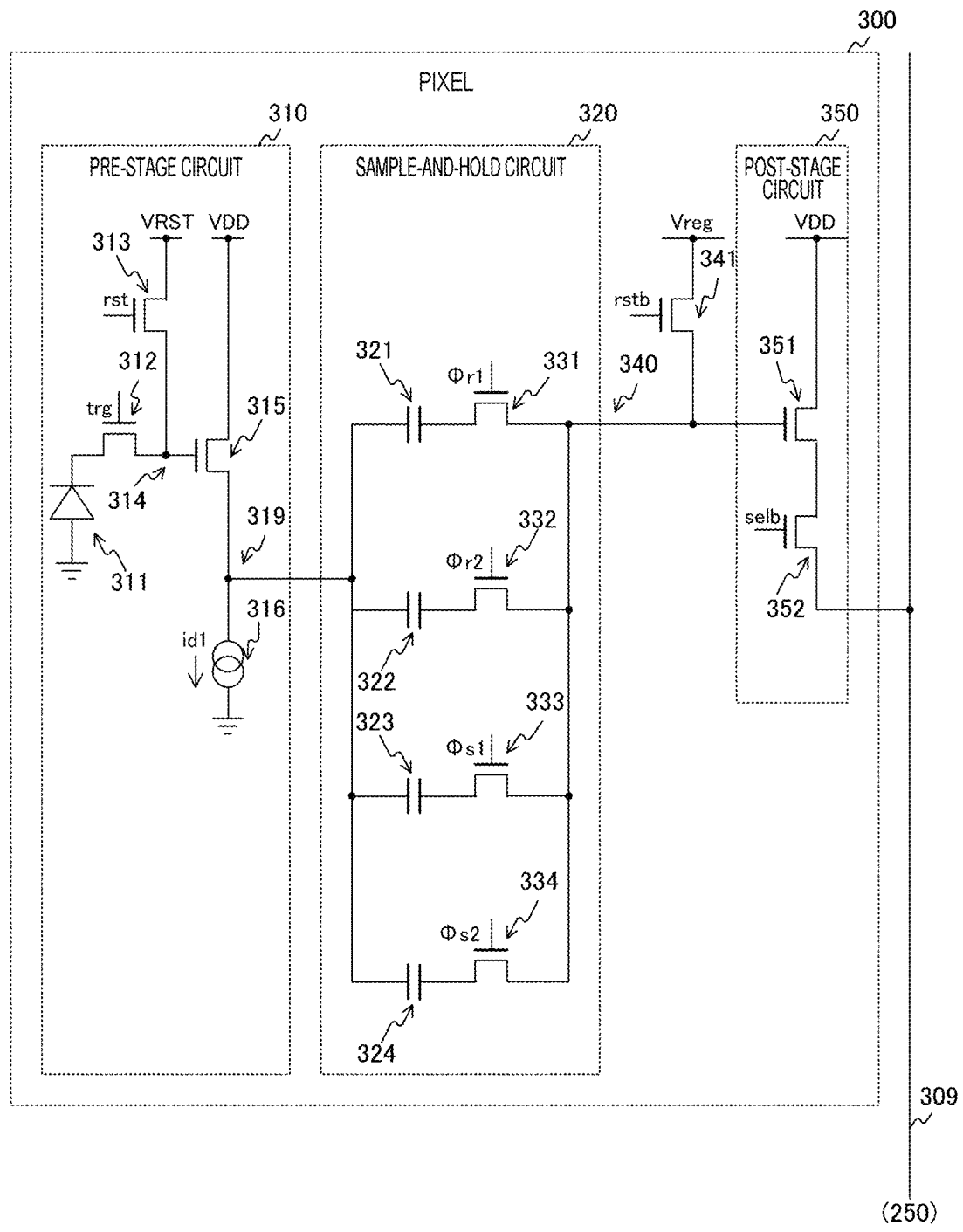
FIG. 45 is a circuit diagram illustrating a configuration example of a pixel according to a ninth embodiment of the present technology.

FIG. 45 is a circuit diagram illustrating a configuration example of a pixel 300 according to the ninth embodiment of the present technology. The pixel 300 of the ninth embodiment is different from the pixel 300 of the first embodiment in that the power supply of the FD reset transistor 313 is separated from the power supply voltage VDD of the pixel 300.

The FD reset transistor 313 of the ninth embodiment has a drain connected to a reset power supply voltage VRST. The reset power supply voltage VRST is controlled by, for example, the timing control circuit 212.

Figure 46:
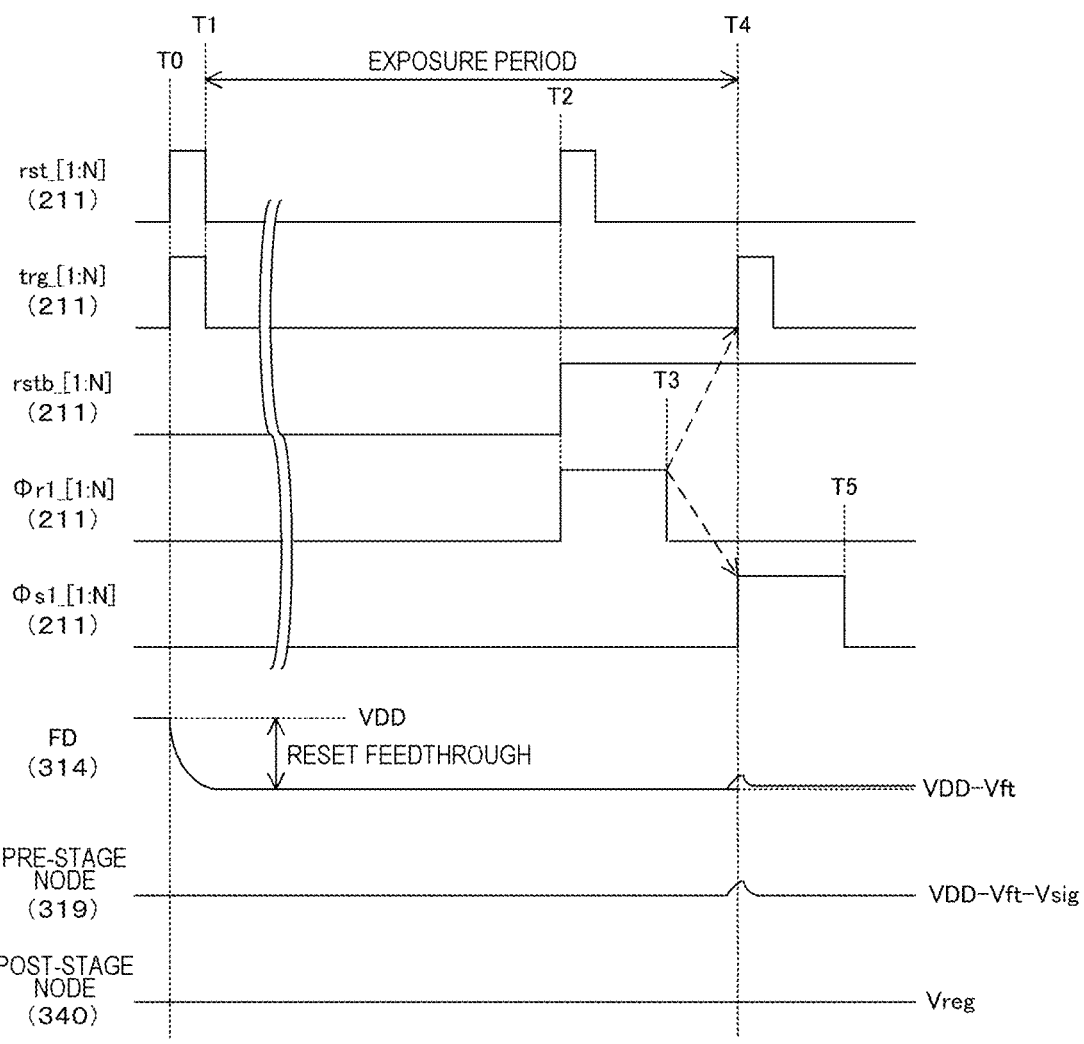
FIG. 46 is a diagram for describing reset feedthrough according to the ninth embodiment of the present technology.
Figure 47:
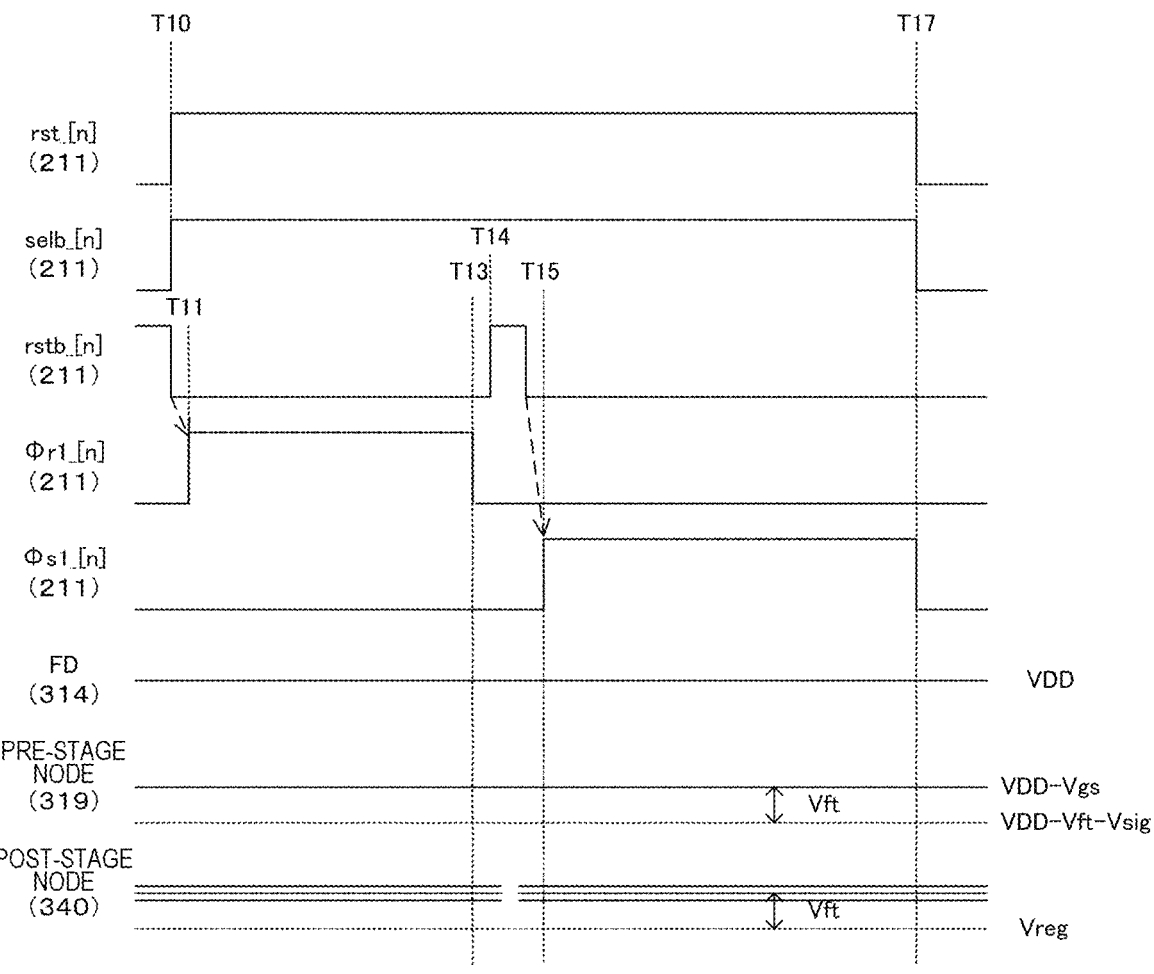
FIG. 47 is a diagram for describing variations in level caused by reset feedthrough according to the ninth embodiment of the present technology.

Here, deterioration of PRNU in the pixel 300 of the seventh embodiment will be considered with reference to FIGS. 46 and 47. In the seventh embodiment, as illustrated in FIG. 46, at timing TO immediately before the start of exposure, the potential of the FD 314 decreases due to reset feedthrough of the FD reset transistor 313. This variation is denoted as Vft.

In the seventh embodiment, since the power supply voltage of the FD reset transistor 313 is VDD, the potential of the FD 314 varies from VDD to VDD-Vft at timing TO. Furthermore, the potential of the pre-stage node 319 during exposure becomes equal to VDD-Vft-Vsig.

Furthermore, in the first embodiment, as illustrated in FIG. 47, the FD reset transistor 313 shifts to the on state during reading to fix the FD 314 to the power supply voltage VDD. The potential of the pre-stage node 319 and the potential of the post-stage node 340 during reading are shifted higher by about the variation Vft of the FD 314. However, due to variations in capacitance values of the capacitor elements 321 and 322 or parasitic capacitance, the shift voltage amount varies for each pixel, which causes deterioration of PRNU.

The amount of transition of the post-stage node 340 in a case where the pre-stage node 319 transitions by Vft is expressed by, for example, the following expression.

$$\{(Cs + \delta Cs)/(Cs + \delta Cs + Cp)\} * Vft \qquad \text{Expression 2}$$

In the above expression, Cs is a capacitance value of the capacitor element 323 on the signal level side, and δCs is a variation in Cs. Cp is a capacitance value of the parasitic capacitance of the post-stage node 340.

Expression 2 can be approximated by the following expression.

$$\{1 - (\delta Cs/Cs) * (Cp/Cs)\} * Vft \qquad \text{Expression 3}$$

From Expression 3, the variations of the post-stage node 340 can be expressed by the following expression.

$$\{(\delta Cs/Cs) * (Cp/Cs)\} * Vft \qquad \text{Expression 4}$$

With (δCs/Cs) set to 10-2, (Cp/Cs) set to 10-1, and Vft set to 400 millivolt (mV), PRNU is 400 μVrms according to Expression 4, which is a relatively large value.

In particular, in order to reduce kTC noise during sampling and holding input conversion capacitance, it is necessary to increase a charge-voltage conversion efficiency of the FD 314. In order to increase the charge-voltage conversion efficiency, it is necessary to reduce the capacitance of the FD 314, but the smaller the capacitance of the FD 314, the larger the variation Vft, which may be several hundred millivolts (mV). In this case, PRNU impact may be non-negligible according to Expression 4.

Figure 48:
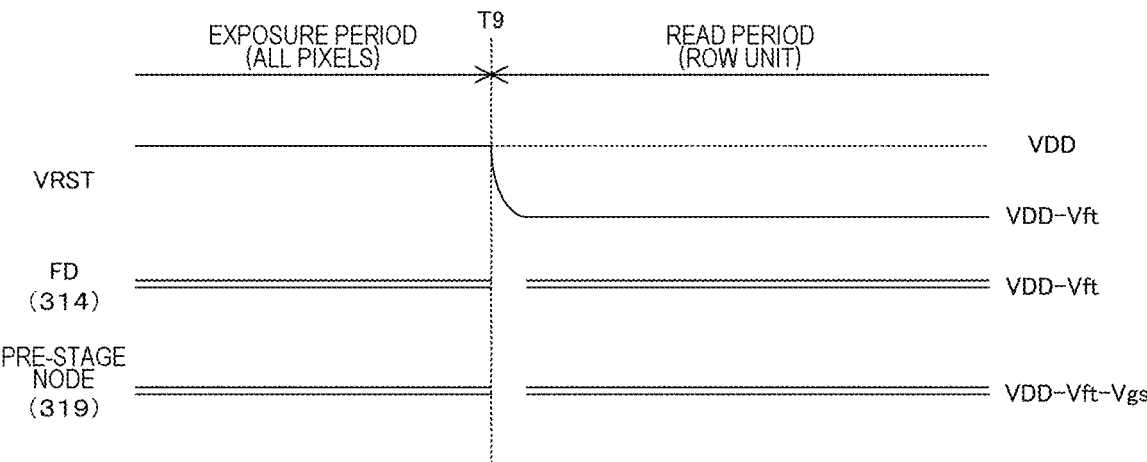
FIG. 48 is a timing chart illustrating an example of voltage control according to the ninth embodiment of the present technology.

FIG. 48 is a timing chart illustrating an example of voltage control according to the ninth embodiment of the present technology.

The timing control circuit 212 performs control to make the reset power supply voltage VRST for the row-by-row read period after timing T9 different from the reset power supply voltage VRST for the exposure period.

For example, for the exposure period, the timing control circuit 212 sets the reset power supply voltage VRST identical to the power supply voltage VDD. On the other hand, during the read period, the timing control circuit 212 decreases the reset power supply voltage VRST to VDD-Vft. That is, during the read period, the timing control circuit 212 decreases the reset power supply voltage VRST by amount approximately equal to the variation Vft caused by reset feedthrough. Through this control, the reset level of the FD 314 can be made the same during exposure and during reading.

Controlling the reset power supply voltage VRST allows, as illustrated in the drawing, a reduction in variations in voltage of the FD 314 and the pre-stage node 319. Therefore, it is possible to suppress variations of the capacitor elements 321 and 322 and deterioration of PRNU due to parasitic capacitance.

Note that the first to third modification examples of the seventh embodiment or the eighth embodiment can also be applied to the ninth embodiment.

In this way, according to the ninth embodiment of the present technology, since the timing control circuit 212 decreases the reset power supply voltage VRST by the variation Vft caused by reset feedthrough during reading, it is possible to make the reset level during exposure and the reset level during reading identical to each other. Therefore, it is possible to suppress deterioration of photo response non-uniformity (PRNU).

10. Tenth Embodiment

In the seventh embodiment described above, the reset level and the signal level are read in this order for each frame, but there is a possibility that this configuration causes deterioration of photo response non-uniformity (PRNU) due to variations of the capacitor elements 321 to 324 or parasitic capacitance. A solid-state imaging element 200 of this tenth embodiment is different from the solid-state imaging element 200 of the seventh embodiment in that PRNU is improved by switching between the level held in the capacitor element 321 and the level held in the capacitor element 323 for each frame.

The solid-state imaging element 200 of the tenth embodiment continuously captures a plurality of frames in synchronization with the vertical synchronization signal. An odd-numbered frame is referred to as "odd frame", and an even-numbered frame is referred to as "even frame".

Figure 49:
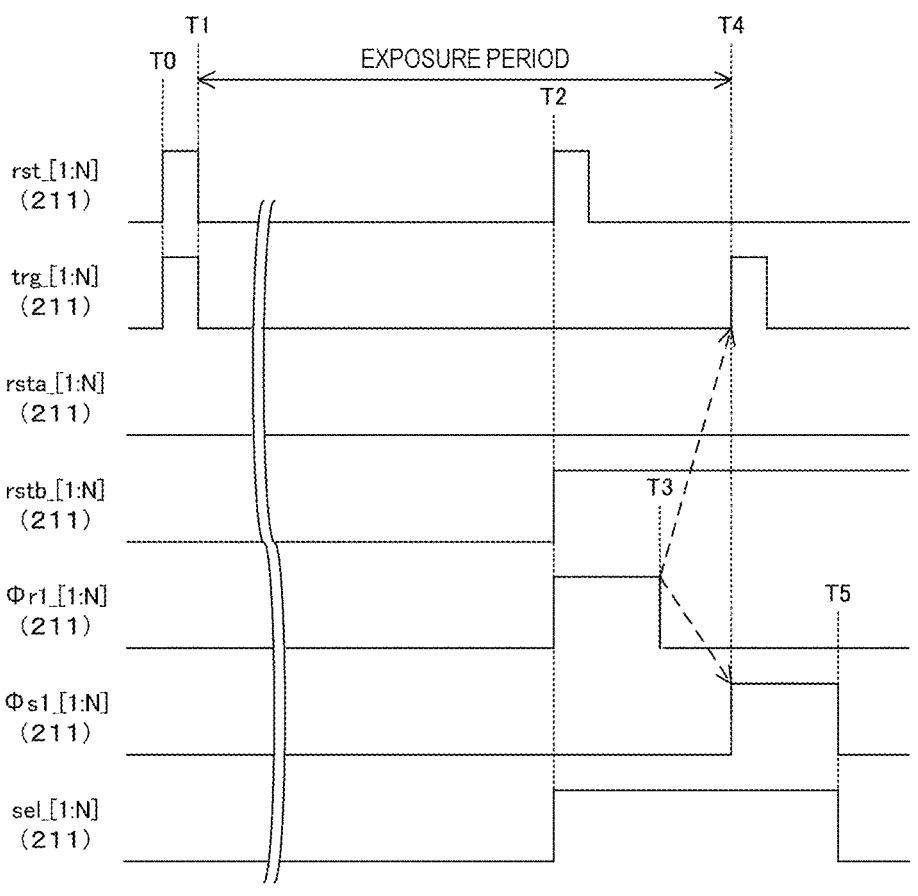
FIG. 49 is a timing chart illustrating an example of a global shutter operation for odd frames according to a tenth embodiment of the present technology.

FIG. 49 is a timing chart illustrating an example of a global shutter operation for odd frames according to the tenth embodiment. The pre-stage circuit 310 in the solid-state imaging element 200 sets the selection signal Φr1 and the selection signal Φs1 to the high level in this order within the exposure period of the odd frame, so as to cause the capacitor element 321 to hold the reset level and then cause the capacitor element 323 to hold the signal level.

Figure 50:
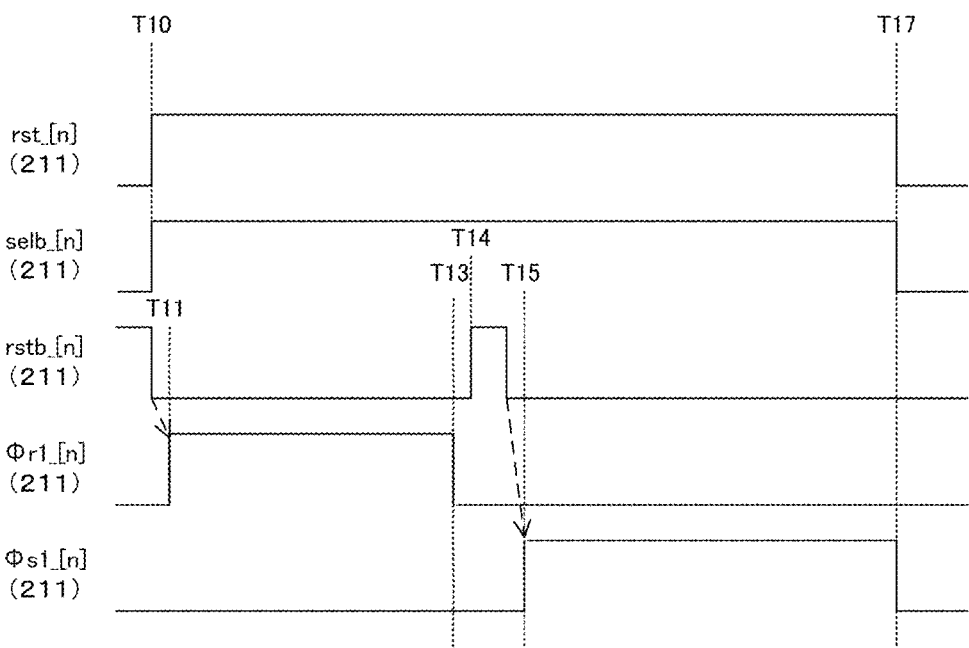
FIG. 50 is a timing chart illustrating an example of a read operation for odd frames according to the tenth embodiment of the present technology.

FIG. 50 is a timing chart illustrating an example of a read operation for odd frames according to the tenth embodiment of the present technology. The post-stage circuit 350 in the solid-state imaging element 200 sets the selection signal Φr1 and the selection signal Φs1 to the high level in this order to read the reset level and the signal level in this order within the read period of the odd frame.

Figure 51:
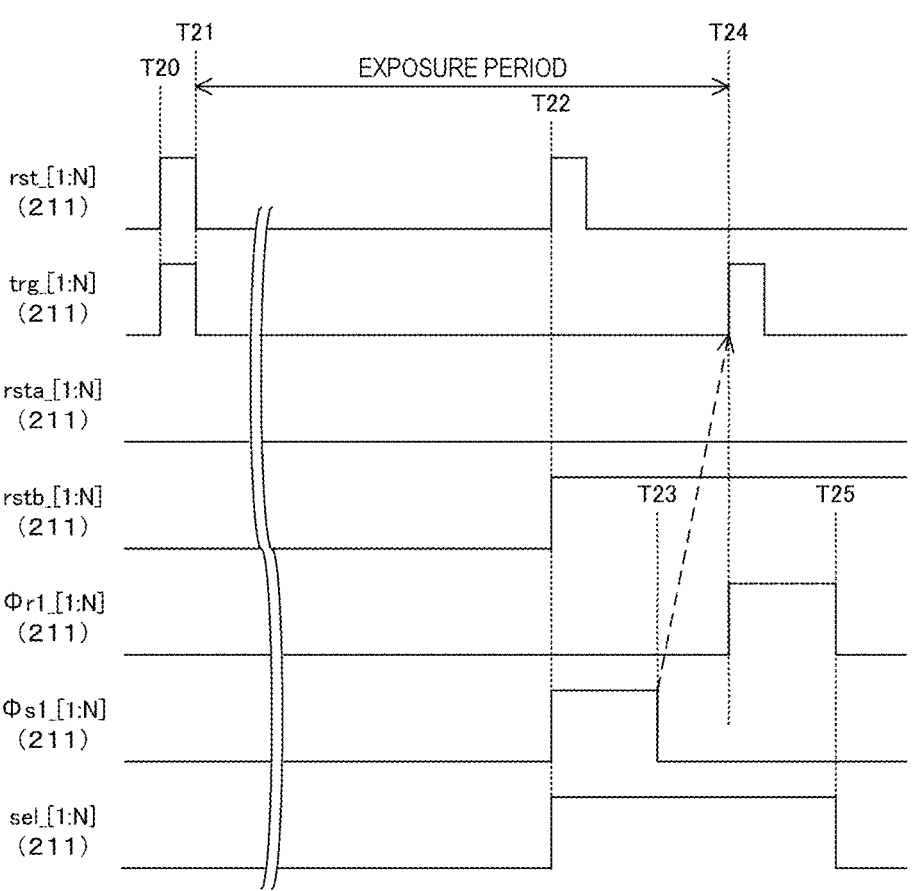
FIG. 51 is a timing chart illustrating an example of a global shutter operation for even frames according to the tenth embodiment of the present technology.

FIG. 51 is a timing chart illustrating an example of a global shutter operation for even frames according to the tenth embodiment. The pre-stage circuit 310 in the solid-state imaging element 200 sets the selection signal Φs1 and the selection signal Φr1 to the high level in this order within the exposure period of the even frame, so as to cause the capacitor element 323 to hold the reset level and then cause the capacitor element 321 to hold the signal level.

Figure 52:
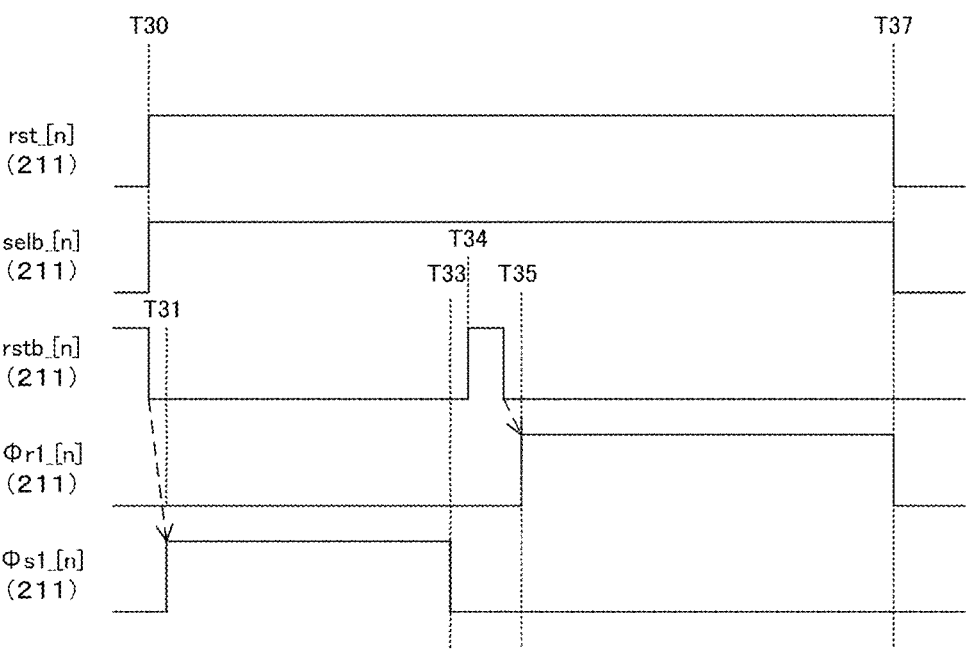
FIG. 52 is a timing chart illustrating an example of a read operation for even frames according to the tenth embodiment of the present technology.

FIG. 52 is a timing chart illustrating an example of a read operation for even frames according to the tenth embodiment of the present technology. The post-stage circuit 350 in the solid-state imaging element 200 sets the selection signal Φs1 and the selection signal Φr1 to the high level in this order to read the reset level and the signal level in this order within the read period of the even frame.

As illustrated in FIGS. 49 and 51, the levels held in the capacitor elements 321 and 323 are reversed between the even frame and the odd frame. Accordingly, the polarity of PRNU is also reversed between even and odd frames. The column signal processing circuit 260 in the subsequent stage obtains an arithmetic mean of the odd frame and the even frame. Accordingly, it is possible to cancel out PRNU with opposite polarities.

This control is effective in capturing a moving image or adding up frames. Furthermore, it is not necessary to add an element to the pixel 300, and it can be achieved only by changing a driving system.

Note that the first to third modification examples of the seventh embodiment or the eighth and ninth embodiments can also be applied to the tenth embodiment.

In this way, according to the tenth embodiment of the present technology, since the level held in the capacitor element 321 and the level held in the capacitor element 323 are reversed between the odd frame and the even frame, the polarity of PRNU can be reversed between the odd frame and the even frame. The column signal processing circuit 260 adds up the odd frame and the even frame, so that it is possible to suppress deterioration of PRNU.

11. Eleventh Embodiment

In the seventh embodiment described above, the column signal processing circuit 260 obtains a difference between the reset level and the signal level for each column. However, there is a possibility that this configuration suffers, when very high intensity light is incident on the pixel, a black spot phenomenon in which luminance decreases due to overflow of charges from the photoelectric conversion element 311 and sinks into black. A solid-state imaging element 200 of this eleventh embodiment is different from the solid-state imaging element 200 of the seventh embodiment in that whether or not the black spot phenomenon has occurred is determined for each pixel.

Figure 53:
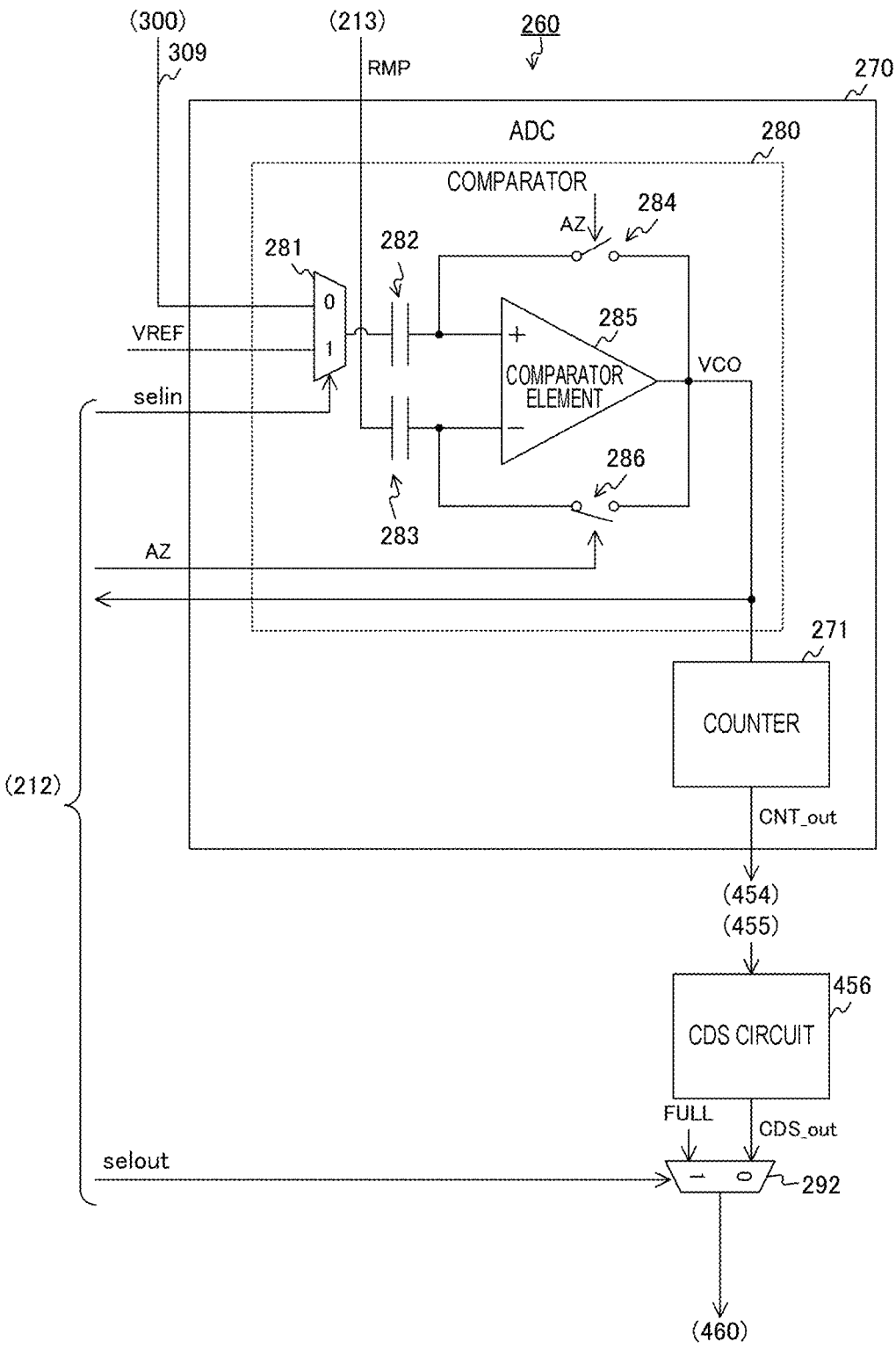
FIG. 53 is a circuit diagram illustrating a configuration example of a column signal processing circuit according to an eleventh embodiment of the present technology.

FIG. 53 is a circuit diagram illustrating a configuration example of a column signal processing circuit 260 according to the eleventh embodiment of the present technology. In the column signal processing circuit 260 of the first embodiment, an ADC 270 is disposed instead of the ADC 451, and a selector 292 is further disposed for each column.

Furthermore, the ADC 270 includes a comparator 280 and a counter 271. The comparator 280 compares the level of the vertical signal line 309 with the ramp signal RMP from the DAC 213, and outputs a comparison result VCO. The comparison result VCO is supplied to the counter 271 and the timing control circuit 212. The comparator 280 includes a selector 281, capacitor elements 282 and 283, auto-zero switches 284 and 286, and a comparator element 285.

The selector 281 connects either the vertical signal line 309 of the corresponding column or a node of a predetermined reference voltage VREF to a non-inverting input terminal (+) of the comparator element 285 via the capacitor element 282 in accordance with an input-side selection signal selin. The input-side selection signal selin is supplied from the timing control circuit 212. Note that the selector 281 is an example of an input-side selector described in the claims.

The comparator element 285 compares a level of the non-inverting input terminal (+) with a level of an inverting input terminal (−), and outputs the comparison result VCO to the counter 271. The ramp signal RMP is input to the inverting input terminal (−) via the capacitor element 283.

The auto-zero switch 284 short-circuits the non-inverting input terminal (+) and an output terminal of the comparison result VCO in accordance with an auto-zero signal Az from the timing control circuit 212. The auto-zero switch 286 short-circuits the inverting input terminal (−) and the output terminal of the comparison result VCO in accordance with the auto-zero signal Az.

The counter 271 counts a count value over a period until the comparison result VCO is inverted, and outputs a digital signal indicating the count value.

The CDS circuit 456 calculates a difference between the digital signal corresponding to the reset level and the digital signal corresponding to the signal level, and outputs the difference to the selector 292 as CDS_out.

The selector 292 outputs, in accordance with an output-side selection signal selout from the timing control circuit 212, either the digital signal CDS_out subjected to the CDS processing or a full-code digital signal FULL as pixel data of the corresponding column.

Figure 54:
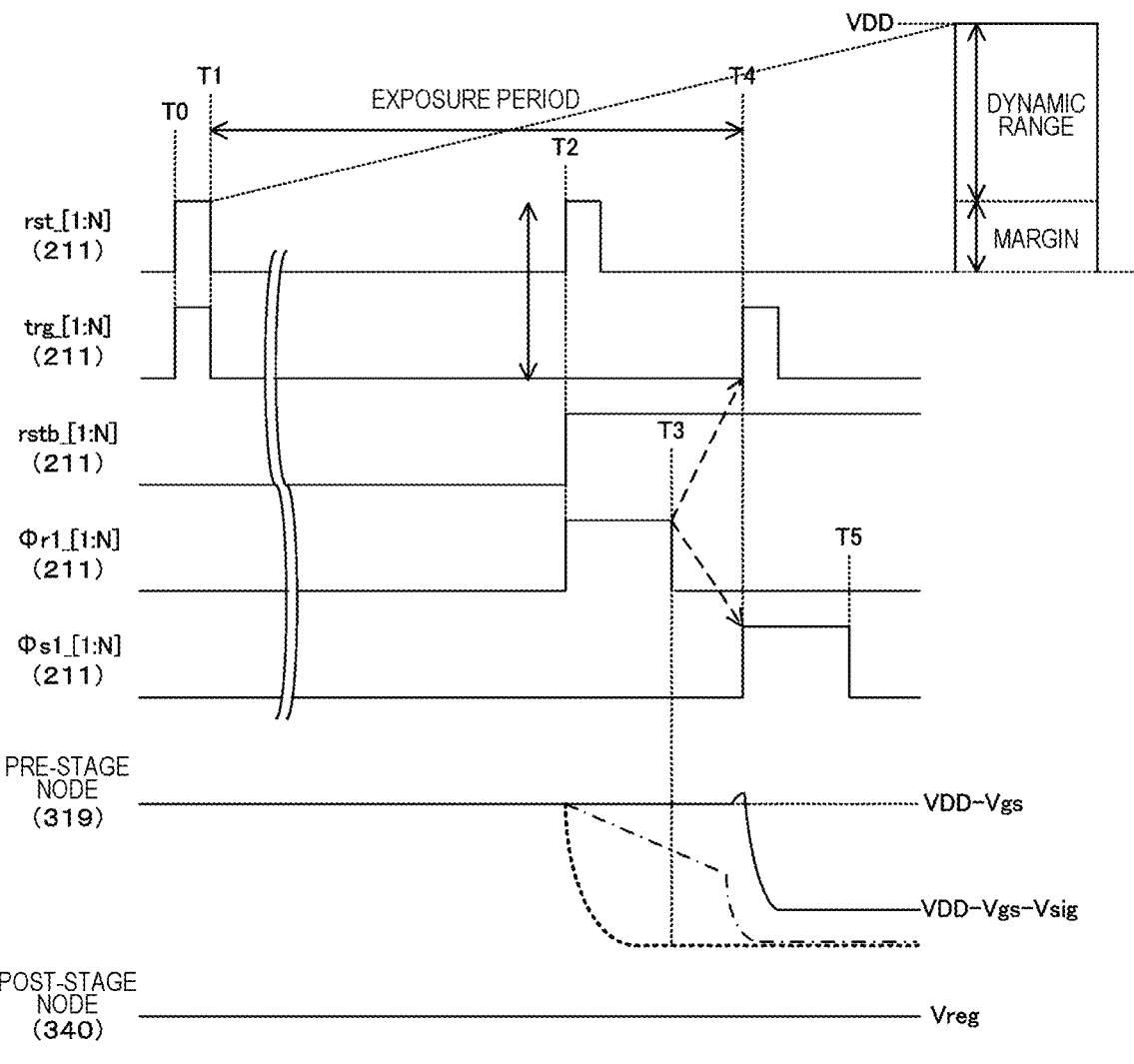
FIG. 54 is a timing chart illustrating an example of a global shutter operation according to the eleventh embodiment of the present technology.

FIG. 54 is a timing chart illustrating an example of a global shutter operation according to the eleventh embodiment of the present technology. A method for controlling transistors at the time of global shutter in the eleventh embodiment is similar to the method in the seventh embodiment.

Here, it is assumed that very high intensity light is incident on the pixel 300. In this case, the photoelectric conversion element 311 becomes full of charges and the charges overflow from the photoelectric conversion element 311 to the FD 314, thereby causing a decrease in potential of the FD 314 subjected to the FD reset. A long dashed short dashed line in the drawing indicates variations in potential of the FD 314 when weak sunlight that causes a relatively small amount of charges to overflow is incident. A dotted line in the drawing indicates variations in potential of the FD 314 when strong sunlight that causes a relatively large amount of charges to overflow is incident.

When weak sunlight is incident, the reset level is dropping at timing T3 when the FD reset is completed, but the level does not fully drop at this time.

On the other hand, when strong sunlight is incident, the reset level fully drops at timing T3. In this case, the signal level becomes the same as the reset level, and the potential difference between the signal level and the reset level becomes "0", so that the digital signal subjected to the CDS processing becomes the same as a digital signal in a dark state and sinks into black. In this way, a phenomenon in which the pixel becomes black even though very high intensity light such as sunlight is incident is called a black spot phenomenon or blooming.

Furthermore, when the level of the FD 314 of the pixel in which the black spot phenomenon has occurred is too low, the operating point of the pre-stage circuit 310 cannot be secured, and the current id1 of the current source transistor 316 varies accordingly. Since the current source transistor 316 of each pixel is connected to a common power supply or ground, when a certain pixel suffers variations in current, variations in IR drop in the pixel affect a sample level of another pixel. A pixel in which the black spot phenomenon occurs becomes an aggressor, and a pixel whose sample level fluctuates due to the pixel becomes a victim. As a result, streaking noise occurs.

Note that, in a case where the discharge transistor 317 is provided as in the eighth embodiment, in a pixel suffering a black spot (blooming), overflow charges are discharged toward the discharge transistor 317, so that the black spot phenomenon is less likely to occur. However, even if the discharge transistor 317 is provided, some charges may flow to the FD 314, and the black spot phenomenon may be difficult to get rid of completely. Moreover, there is also a disadvantage that a ratio of the effective area/the charge amount for each pixel decreases due to the addition of the discharge transistor 317. Therefore, it is desirable to suppress the black spot phenomenon without using the discharge transistor 317.

As a method for suppressing the black spot phenomenon without using the discharge transistor 317, there are two possible methods. The first is adjustment of a clip level of the FD 314. The second is a method in which whether or not the black spot phenomenon has occurred during reading is determined, and when the black spot phenomenon has occurred, the output is replaced with the full code.

Regarding the first method, the high level of the FD reset signal rst (in other words, the gate of the FD reset transistor 313) in the drawing corresponds to the power supply voltage VDD, and the low level corresponds to the clip level of the FD 314. In the seventh embodiment, a difference between the high level and the low level (that is, amplitude) is set to a value corresponding to a dynamic range. In contrast, in the eleventh embodiment, the value is adjusted to a value that further adds a margin to that value. Here, the value corresponding to the dynamic range corresponds to a difference between the power supply voltage VDD and the potential of the FD 314 when the digital signal becomes the full code.

Lowering the gate voltage (the low level of the FD reset signal rst) when the FD reset transistor 313 is off makes it possible to prevent the FD 314 from being excessively lowered due to blooming and the operating point of the pre-stage amplification transistor 315 from being lost.

Note that the dynamic range varies in a manner that depends on the analog gain of the ADC. When the analog gain is low, a large dynamic range is required; conversely, when the analog gain is high, a small dynamic range is required. Therefore, it is possible to change the gate voltage when the FD reset transistor 313 is off in accordance with the analog gain.

Figure 55:
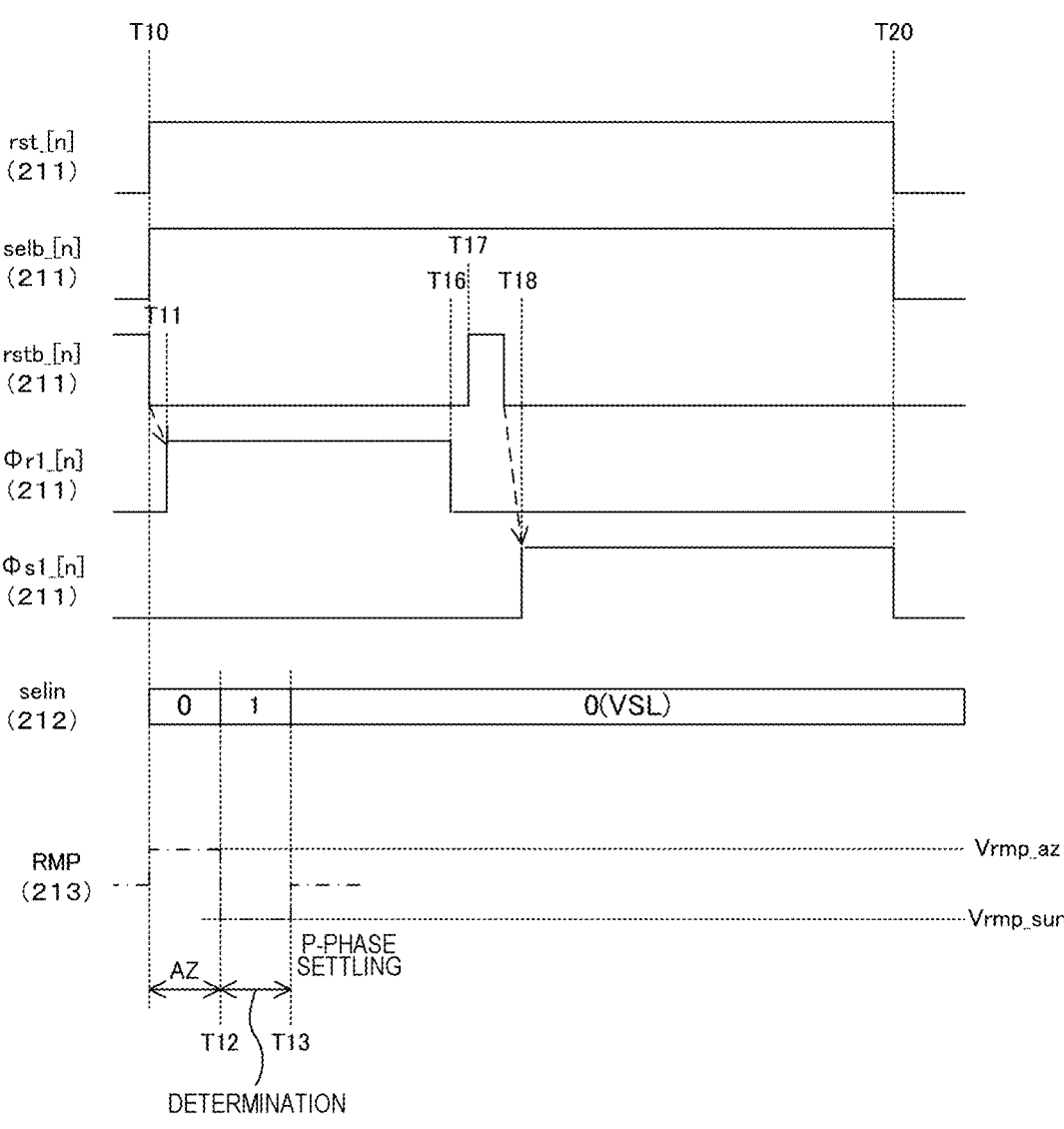
FIG. 55 is a timing chart illustrating an example of a read operation according to the eleventh embodiment of the present technology.

FIG. 55 is a timing chart illustrating an example of a read operation according to the eleventh embodiment of the present technology. When the selection signal Φr1 becomes the high level at timing T11 immediately after timing T10 that is the start of reading, the potential of the vertical signal line 309 varies in the pixel on which sunlight is incident. A long dashed short dashed line in the drawing indicates variations in potential of the vertical signal line 309 when weak sunlight is incident. A dotted line in the drawing indicates variations in potential of the vertical signal line 309 when strong sunlight is incident.

In an auto-zero period from timing T10 to timing T12, the timing control circuit 212 supplies, for example, the input-side selection signal selin of "0" to connect the comparator element 285 to the vertical signal line 309. Within this auto-zero period, the timing control circuit 212 performs auto-zero using the auto-zero signal Az.

Regarding the second method, the timing control circuit 212 supplies, for example, the input-side selection signal selin of "1" within a determination period from timing T12 to timing T13. The input-side selection signal selin disconnects the comparator element 285 from the vertical signal line 309 and connects the comparator element 285 to the node of the reference voltage VREF. The reference voltage VREF is set to an expected value of the level of the vertical signal line 309 when blooming does not occur. For example, when the gate-source voltage of the post-stage amplification transistor 351 is denoted as Vgs2, Vrst corresponds to Vreg-Vgs2. Furthermore, the DAC 213 lowers the level of the ramp signal RMP from Vrmp_az to Vrmp_sun within the determination period.

Furthermore, in a case where blooming does not occur within the determination period, the reset level Vrst of the vertical signal line 309 is almost the same as the reference voltage VREF, and is not much different from when the potential of the inverting input terminal (+) of the comparator element 285 is auto-zero. On the other hand, since the non-inverting input terminal (−) lowers from Vrmp_az to Vrmp_sun, the comparison result VCO becomes the high level.

Conversely, in a case where blooming occurs, the reset level Vrst becomes sufficiently higher than the reference voltage VREF, and the comparison result VCO becomes the low level when the following expression is established.

$$Vrst - VREF > Vrmp\_az - Vrmp\_sun \qquad \text{Expression 5}$$

That is, the timing control circuit 212 can determine whether or not blooming has occurred on the basis of whether or not the comparison result VCO becomes the low level within the determination period.

Note that it is necessary to secure some large margin for sun determination (the right side of Expression 5) so as to prevent erroneous determination due to variations in threshold voltage of the post-stage amplification transistor 351, IR drop differences of the in-plane Vreg, or the like.

After timing T13 after the determination period has elapsed, the timing control circuit 212 connects the comparator element 285 to the vertical signal line 309.

In a case where it is determined that blooming has not occurred during the determination period, the timing control circuit 212 controls the selector 292 in accordance with the output-side selection signal selout to output the digital signal CDS_out subjected to the CDS processing as it is.

On the other hand, in a case where it is determined that blooming has occurred during the determination period, the timing control circuit 212 controls the selector 292 in accordance with the output-side selection signal selout to output the full code FULL instead of the digital signal CDS_out subjected to the CDS processing. Therefore, it is possible to suppress the black spot phenomenon.

Note that the first to third modification examples of the seventh embodiment or the eighth to tenth embodiments can also be applied to the eleventh embodiment.

In this way, according to the eleventh embodiment of the present technology, since the timing control circuit 212 determines whether or not the black spot phenomenon has occurred on the basis of the comparison result VCO, and outputs the full code when the black spot phenomenon has occurred, it is possible to suppress the black spot phenomenon.

12. Twelfth Embodiment

In the seventh embodiment described above, the vertical scanning circuit 211 performs control to simultaneously expose all rows (all pixels) (that is, the global shutter operation). However, in a case where the simultaneity of exposure is not required, but low noise is required, such as during test or analysis, it is desirable to perform a rolling shutter operation. A solid-state imaging element 200 of this twelfth embodiment is different from the solid-state imaging element 200 of the seventh embodiment in that the rolling shutter operation is performed during test or the like.

Figure 56:
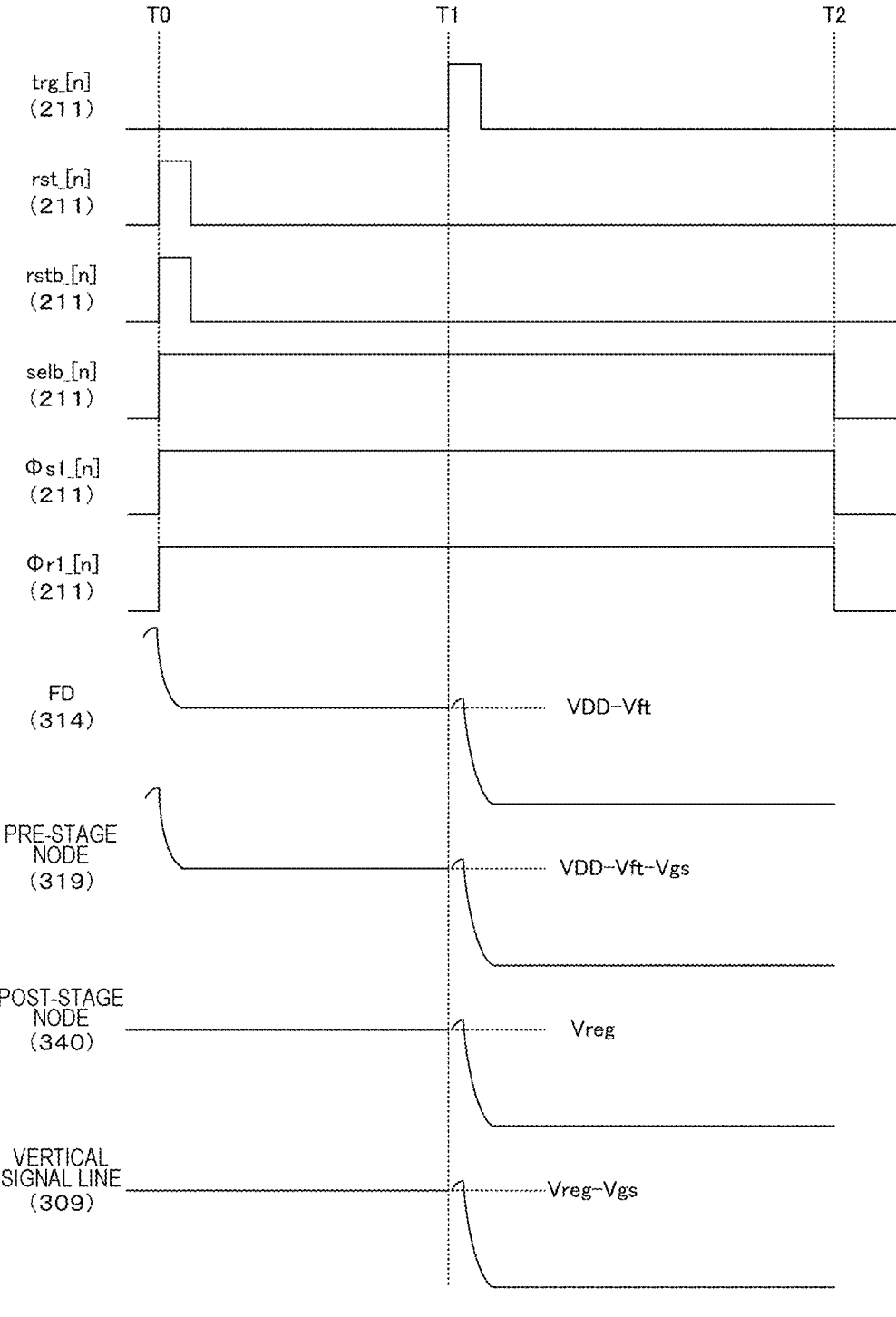
FIG. 56 is a timing chart illustrating an example of a rolling shutter operation according to a twelfth embodiment of the present technology.

FIG. 56 is a timing chart illustrating an example of a rolling shutter operation according to the twelfth embodiment of the present technology. The vertical scanning circuit 211 performs control to sequentially select a plurality of rows and start exposure. This drawing illustrates exposure control of the n-th row.

During the period from timing T0 to timing T2, the vertical scanning circuit 211 supplies a high-level post-stage selection signal selb, the high-level selection signal Φr1, and the high-level selection signal Φs1 to the n-th row. Furthermore, at timing TO that is the start of exposure, the vertical scanning circuit 211 supplies a high-level FD reset signal rst and the high-level post-stage reset signal rstb to the n-th row over the pulse period. At timing T1 at the end of exposure, the vertical scanning circuit 211 supplies the transfer signal trg to the n-th row. The rolling shutter operation in the drawing allows the solid-state imaging element 200 to generate low-noise image data.

Note that, during normal imaging, the solid-state imaging element 200 of the twelfth embodiment performs the global shutter operation in a manner similar to the seventh embodiment. Furthermore, the first to third modification examples of the seventh embodiment or the eighth to eleventh embodiments can also be applied to the twelfth embodiment.

In this way, according to the twelfth embodiment of the present technology, since the vertical scanning circuit 211 performs control to sequentially select a plurality of rows and start exposure (that is, the rolling shutter operation), it is possible to generate low-noise image data.

13. Thirteenth Embodiment

In the seventh embodiment described above, the source of the pre-stage source follower (the pre-stage amplification transistor 315 and the current source transistor 316) is connected to the power supply voltage VDD, and row-by-row reading is performed with the source follower in the on state. However, there is a possibility that this driving method causes circuit noise of the pre-stage source follower during row-by-row reading to propagate to the subsequent stages, and random noise increases accordingly. A solid-state imaging element 200 of this thirteenth embodiment is different from the solid-state imaging element 200 of the seventh embodiment in that the pre-stage source follower is brought into the off state during reading to reduce noise.

Figure 57:
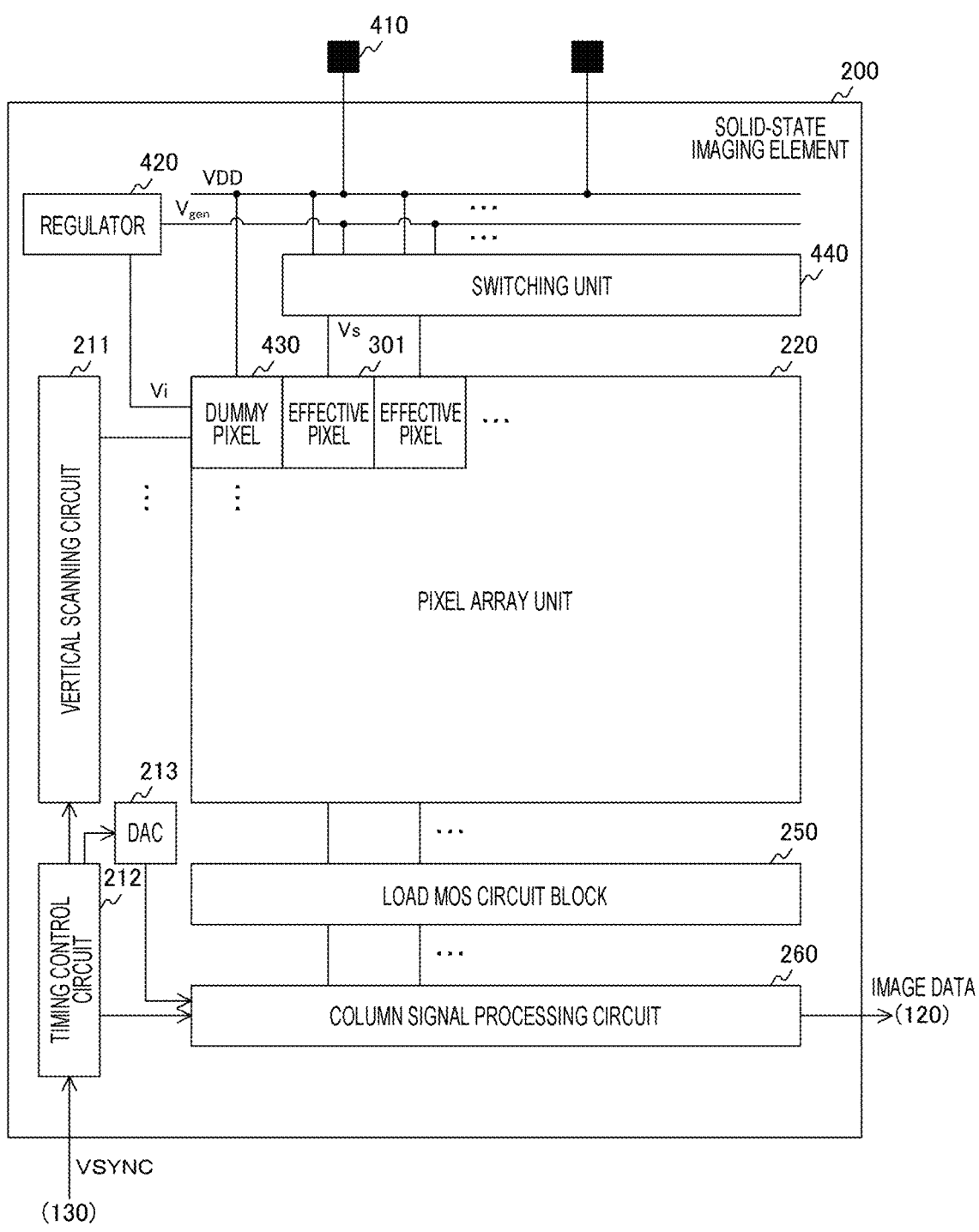
FIG. 57 is a block diagram illustrating a configuration example of a solid-state imaging element according to a thirteenth embodiment of the present technology.

FIG. 57 is a block diagram illustrating a configuration example of the solid-state imaging element 200 according to the thirteenth embodiment of the present technology. The solid-state imaging element 200 of the thirteenth embodiment is different from the solid-state imaging element 200 of the seventh embodiment in that a regulator 420 and a switching unit 440 are further provided. Furthermore, in the pixel array unit 220 of the thirteenth embodiment, a plurality of effective pixels 301 and a predetermined number of dummy pixels 430 are arranged. The dummy pixels 430 are arranged around a region where the effective pixels 301 are arranged.

Furthermore, the power supply voltage VDD is supplied to each of the dummy pixels 430, and the power supply voltage VDD and a source voltage Vs are supplied to each of the effective pixels 301. A signal line through which the power supply voltage VDD is supplied to the effective pixels 301 is omitted in the drawing. Furthermore, the power supply voltage VDD is supplied from a pad 410 located outside the solid-state imaging element 200.

The regulator 420 generates a constant generated voltage $V_{gen}$ on the basis of an input potential Vi from the dummy pixel 430 and supplies the generated voltage $V_{gen}$ to the switching unit 440. The switching unit 440 selects either the power supply voltage VDD from the pad 410 or the generated voltage $V_{gen}$ from the regulator 420, and supplies the selected voltage as the source voltage Vs to each of the columns of the effective pixels 301.

Figure 58A:
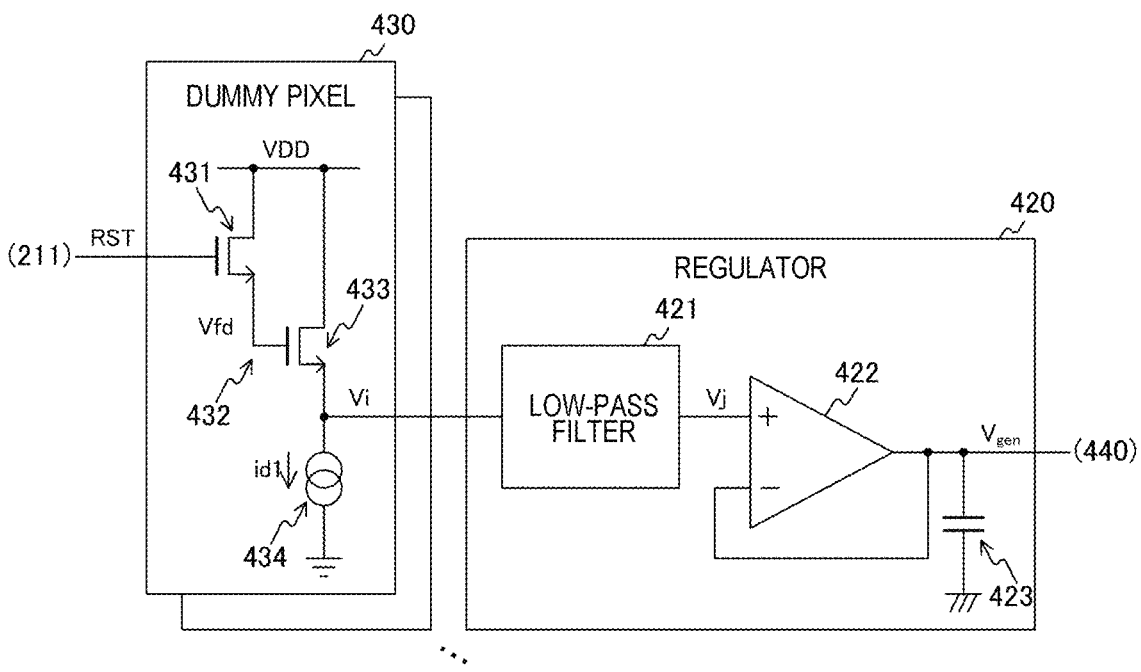
FIGS. 58A and 58B are circuit diagrams illustrating a configuration example of a dummy pixel, a regulator, and a switching unit according to the thirteenth embodiment of the present technology.
Figure 58B:
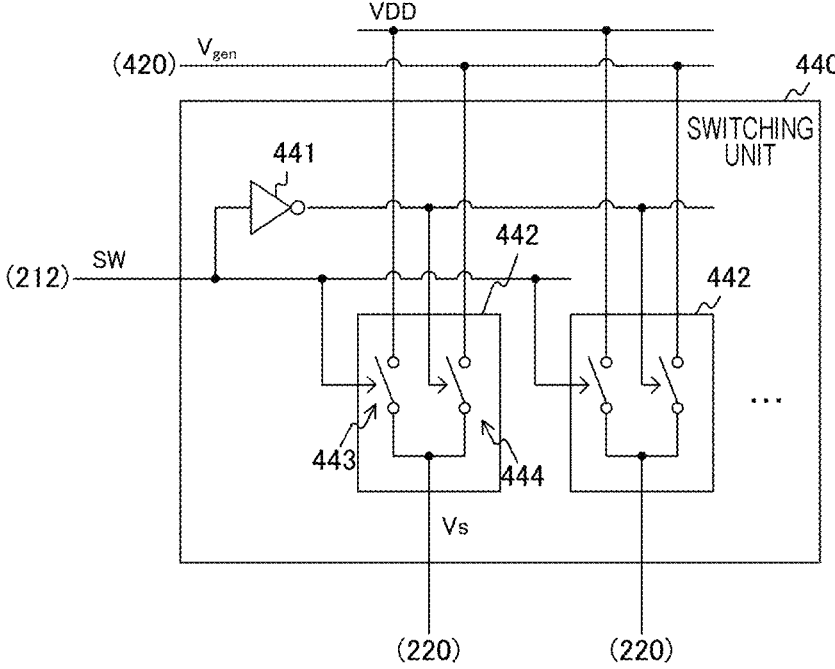

FIGS. 58A and 58B are circuit diagrams illustrating a configuration example of the dummy pixel 430, the regulator 420, and the switching unit 440 according to the thirteenth embodiment of the present technology. In the drawing, FIG. 58A indicates a circuit diagram of the dummy pixel 430 and the regulator 420, and FIG. 58B in the drawing indicates a circuit diagram of the switching unit 440.

As illustrated in FIG. 58A of the drawing, the dummy pixel 430 includes a reset transistor 431, an FD 432, an amplification transistor 433, and a current source transistor 434. The reset transistor 431 initializes the FD 432 in accordance with a reset signal RST from the vertical scanning circuit 211. The FD 432 accumulates charges, and generates a voltage corresponding to a charge amount. The amplification transistor 433 amplifies a level of a voltage of the FD 432 and supplies the amplified voltage as the input voltage Vi to the regulator 420.

Furthermore, the reset transistor 431 and the amplification transistor 433 have their respective sources connected to the power supply voltage VDD. The current source transistor 434 is connected to a drain of the amplification transistor 433. The current source transistor 434 supplies the current id1 under the control of the vertical scanning circuit 211.

The regulator 420 includes a low-pass filter 421, a buffer amplifier 422, and a capacitor element 423. The low-pass filter 421 passes, as an output voltage Vj, a component in a low-frequency band below a predetermined frequency out of a signal of the input voltage Vi.

The output voltage Vj is input to a non-inverting input terminal (+) of the buffer amplifier 422. An inverting input terminal (−) of the buffer amplifier 422 is connected to an output terminal of the buffer amplifier 422. The capacitor element 423 holds a voltage of the output terminal of the buffer amplifier 422 as $V_{gen}$. This $V_{gen}$ is supplied to the switching unit 440.

As illustrated in FIG. 58B of the drawing, the switching unit 440 includes an inverter 441 and a plurality of switching circuits 442. The switching circuits 442 are each disposed for a corresponding one of the columns of the effective pixels 301.

The inverter 441 inverts a switching signal SW sent from the timing control circuit 212. The inverter 441 supplies the inverted signal to each of the switching circuits 442.

The switching circuit 442 selects either the power supply voltage VDD or the generated voltage $V_{gen}$ and supplies the selected voltage as the source voltage Vs to the corresponding column in the pixel array unit 220. The switching circuit 442 includes switches 443 and 444. The switch 443 opens and closes a path between the node of the power supply voltage VDD and the corresponding column in accordance with the switching signal SW. The switch 444 opens and closes a path between the node of the generated voltage $V_{gen}$ and the corresponding column in accordance with the inverted signal of the switching signal SW.

Figure 59:
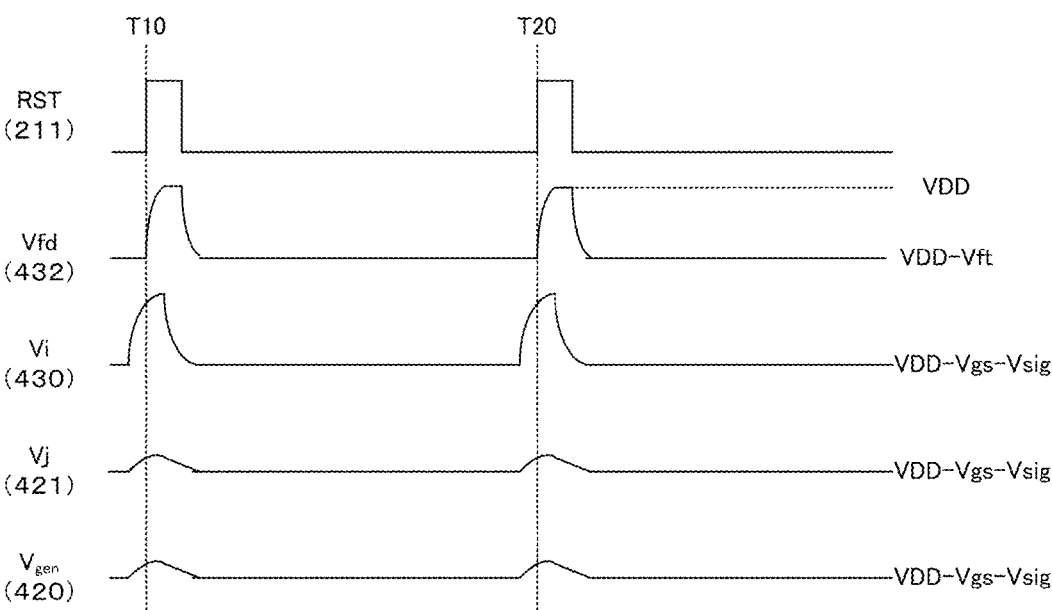
FIG. 59 is a timing chart illustrating an example of an operation of the dummy pixel and the regulator according to the thirteenth embodiment of the present technology.

FIG. 59 is a timing chart illustrating an example of how the dummy pixel 430 and the regulator 420 operate according to the thirteenth embodiment of the present technology.

At timing T10 immediately before reading of a certain row, the vertical scanning circuit 211 supplies a high-level reset signal RST (here, the power supply voltage VDD) to each of the dummy pixels 430. A potential Vfd of the FD 432 in the dummy pixel 430 is initialized to the power supply voltage VDD. Then, when the reset signal RST becomes the low level, reset feedthrough causes a change to VDD–Vft.

Furthermore, the input voltage Vi decreases to VDD–Vgs–Vsig after the reset. By passing through the low-pass filter 421, Vj and $V_{gen}$ become approximately constant voltages.

After timing T20 immediately before reading of the next row, similar control is performed for each row, and the constant generated voltage $V_{gen}$ is supplied.

Figure 60:
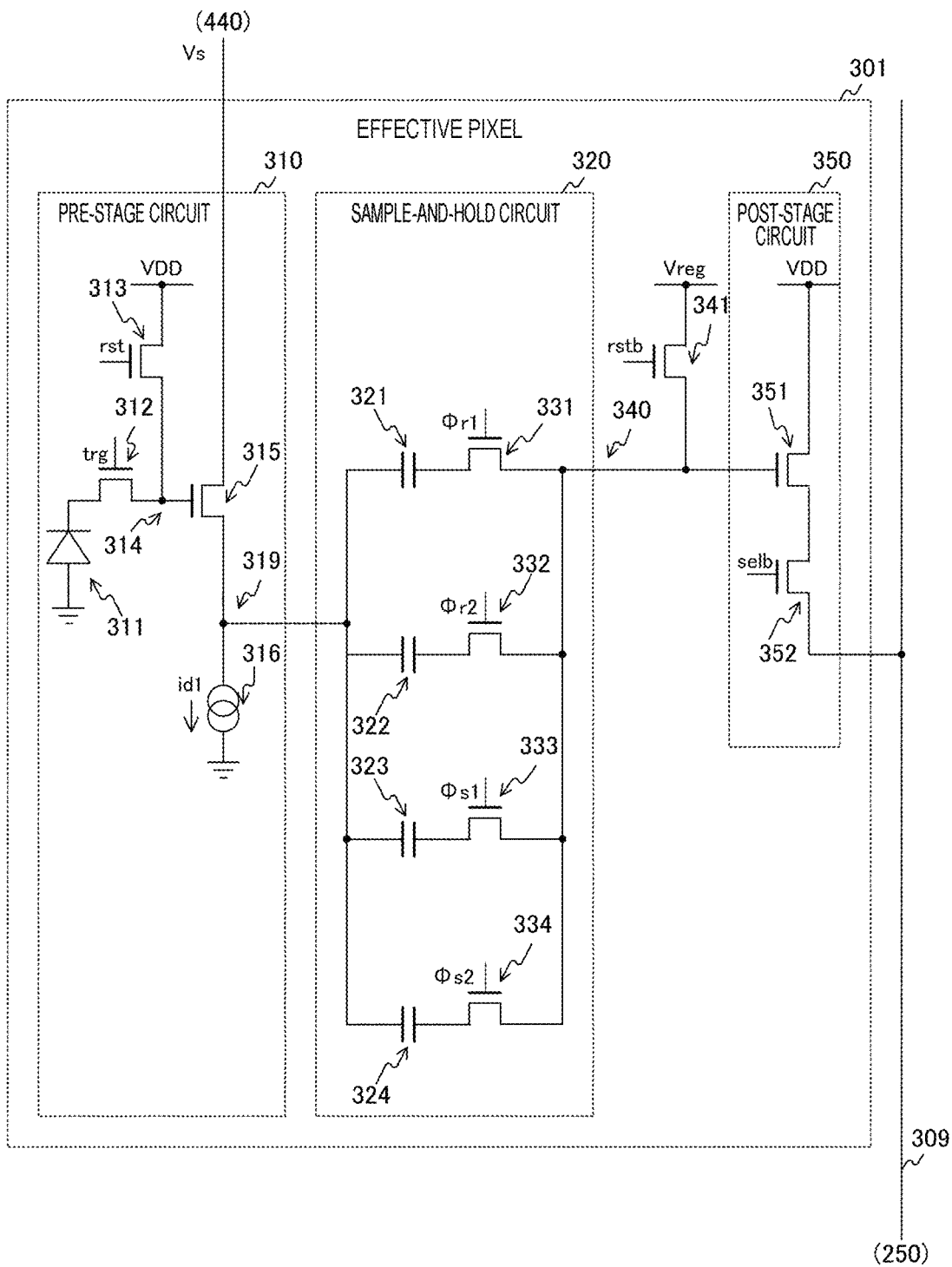
FIG. 60 is a circuit diagram illustrating a configuration example of an effective pixel according to the thirteenth embodiment of the present technology.

FIG. 60 is a circuit diagram illustrating a configuration example of the effective pixel 301 according to the thirteenth embodiment of the present technology. The effective pixel 301 is similar in circuit configuration to the pixel 300 of the seventh embodiment except that the source voltage Vs from the switching unit 440 is supplied to the source of the pre-stage amplification transistor 315.

Figure 61:
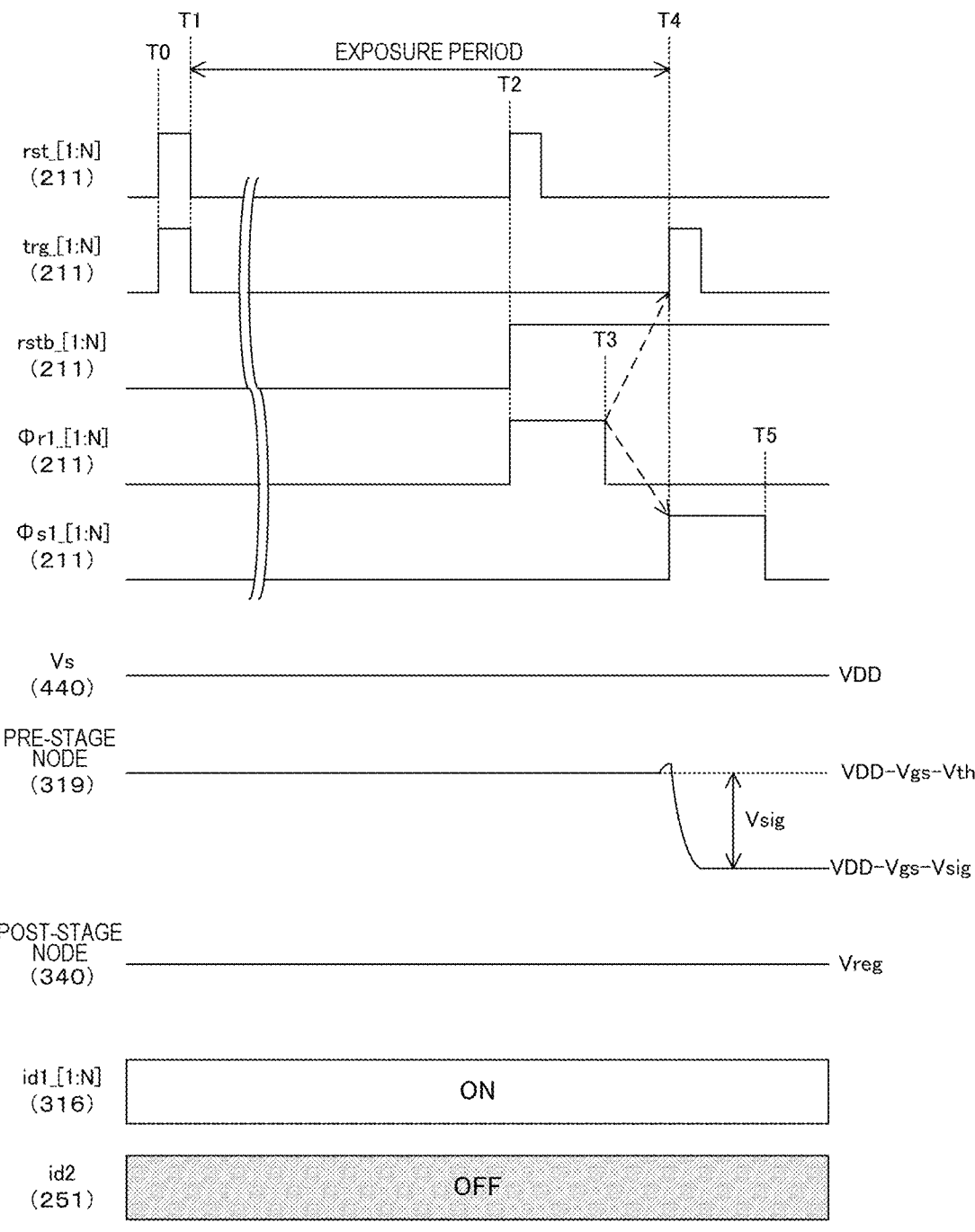
FIG. 61 is a timing chart illustrating an example of a global shutter operation according to the thirteenth embodiment of the present technology.

FIG. 61 is a timing chart illustrating an example of a global shutter operation according to the thirteenth embodiment of the present technology. In the thirteenth embodiment, when all pixels are exposed simultaneously, the switching unit 440 selects the power supply voltage VDD and supplies the power supply voltage VDD as the source voltage Vs. Furthermore, the voltage of the pre-stage node decreases from VDD–Vgs–Vth to VDD–Vgs–Vsig at timing T4. Here, Vth represents a threshold voltage of the transfer transistor 312.

Figure 62:
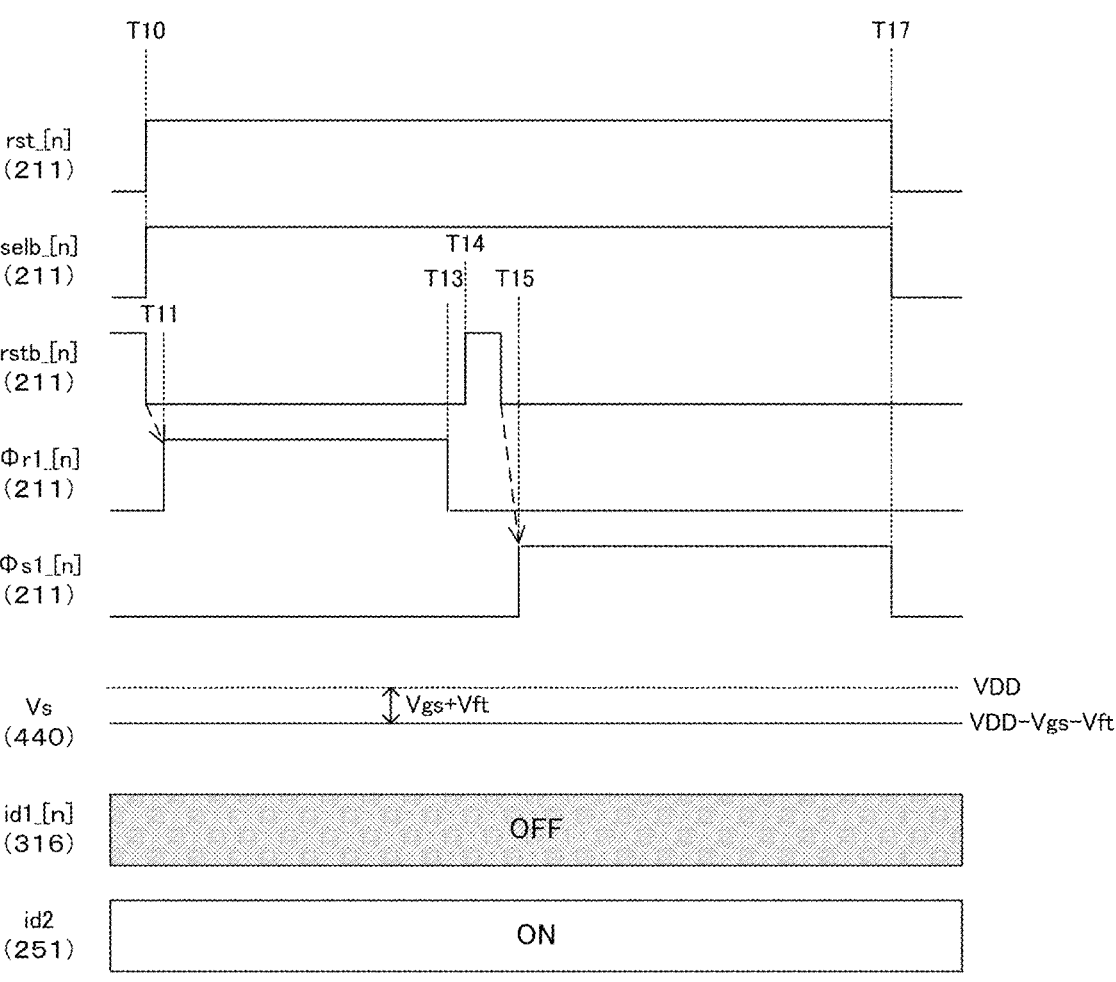
FIG. 62 is a timing chart illustrating an example of a read operation according to the thirteenth embodiment of the present technology.

FIG. 62 is a timing chart illustrating an example of a read operation according to the thirteenth embodiment of the present technology. In the thirteenth embodiment, during reading, the switching unit 440 selects the generated voltage $V_{gen}$ and supplies the generated voltage $V_{gen}$ as the source voltage Vs. The generated voltage $V_{gen}$ is adjusted to VDD–Vgs–Vft. Furthermore, in the thirteenth embodiment, the vertical scanning circuit 211 controls the current source transistors 316 of all rows (all pixels) to stop the supply of the current id1.

FIG. 63 is a diagram for describing effects according to the thirteenth embodiment of the present technology. In the first embodiment, the source follower (the pre-stage amplification transistor 315 and the current source transistor 316) of the pixel 300 to be read is turned on during the row-by-row reading. However, there is a possibility that this driving method causes circuit noise of the pre-stage source follower to propagate to the subsequent stages (capacitor element, and post-stage source follower and ADC), and read noise increases accordingly.

For example, in the seventh embodiment, as illustrated in the drawing, kTC noise generated in a pixel during the global shutter operation is 450 (μVrms). Furthermore, noise generated in the pre-stage source follower (the pre-stage amplification transistor 315 and the current source transistor 316) during the row-by-row reading is 380 (μVrms). Noise generated in the post-stage source follower and the subsequent stages is 160 (μVrms). Therefore, the total noise is 610 (μVrms). In this way, in the seventh embodiment, a proportion of the noise of the pre-stage source follower in the total noise becomes relatively large.

In order to reduce the noise of the pre-stage source follower in the thirteenth embodiment, the voltage (Vs) that can be adjusted is supplied to the source of the pre-stage source follower as described above. During the global shutter (exposure) operation, the switching unit 440 selects the power supply voltage VDD and supplies the selected power supply voltage as the source voltage Vs. Then, after the end of exposure, the switching unit 440 switches the source voltage Vs to VDD–Vgs–Vft. Furthermore, the timing control circuit 212 turns on the pre-stage current source transistor 316 during the global shutter (exposure) operation, and turns off the pre-stage current source transistor 316 after the end of exposure.

As illustrated in FIGS. 61 and 62, the above-described control makes the potential of the pre-stage node during the global shutter operation and the potential during the row-by-row reading identical to each other and thus allows an improvement in PRNU. Furthermore, since the pre-stage source follower is in the off state during the row-by-row reading, circuit noise of the source follower does not occur and becomes zero (μVrms) as illustrated in FIG. 63. Note that, in the pre-stage source follower, the pre-stage amplification transistor 315 is in the on state.

In this way, according to the thirteenth embodiment of the present technology, since the pre-stage source follower is brought into the off state during reading, noise generated in the source follower can be reduced.

14. Application Example to Mobile Body

The technology according to the present disclosure (the present technology) is applicable to various products. For example, the technology according to the present disclosure may also be realized as a device mounted on any type of mobile body such as an automobile, an electric vehicle, a hybrid electric vehicle, a motorcycle, a bicycle, a personal mobility, an airplane, a drone, a ship, and a robot.

Figure 64:
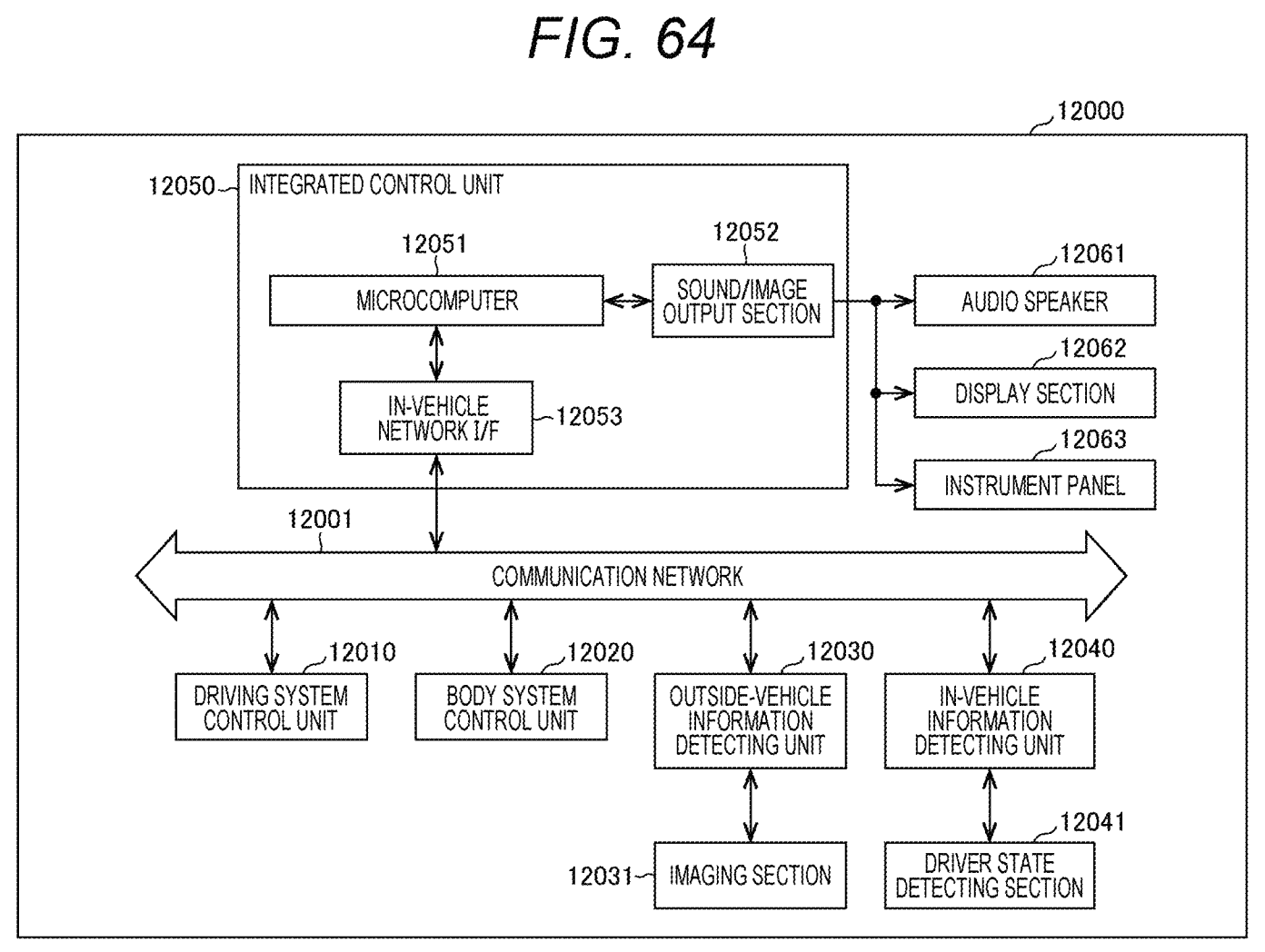

FIG. 64 is a block diagram illustrating a schematic configuration example of a vehicle control system which is an example of a mobile body control system to which the technology according to the present disclosure can be applied.

The vehicle control system 12000 includes a plurality of electronic control units connected to each other via a communication network 12001. In the example illustrated in FIG. 64, the vehicle control system 12000 includes a driving system control unit 12010, a body system control unit 12020, an outside-vehicle information detecting unit 12030, an in-vehicle information detecting unit 12040, and an integrated control unit 12050. Furthermore, as a functional configuration of the integrated control unit 12050, a microcomputer 12051, a sound/image output section 12052, and an in-vehicle network interface (I/F) 12053 are illustrated.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the vehicle exterior information acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 64, an audio speaker 12061, a display section 12062, and an instrument panel 12063 are illustrated as the output device. The display section 12062 may, for example, include at least one of an on-board display and a head-up display.

Figure 65:
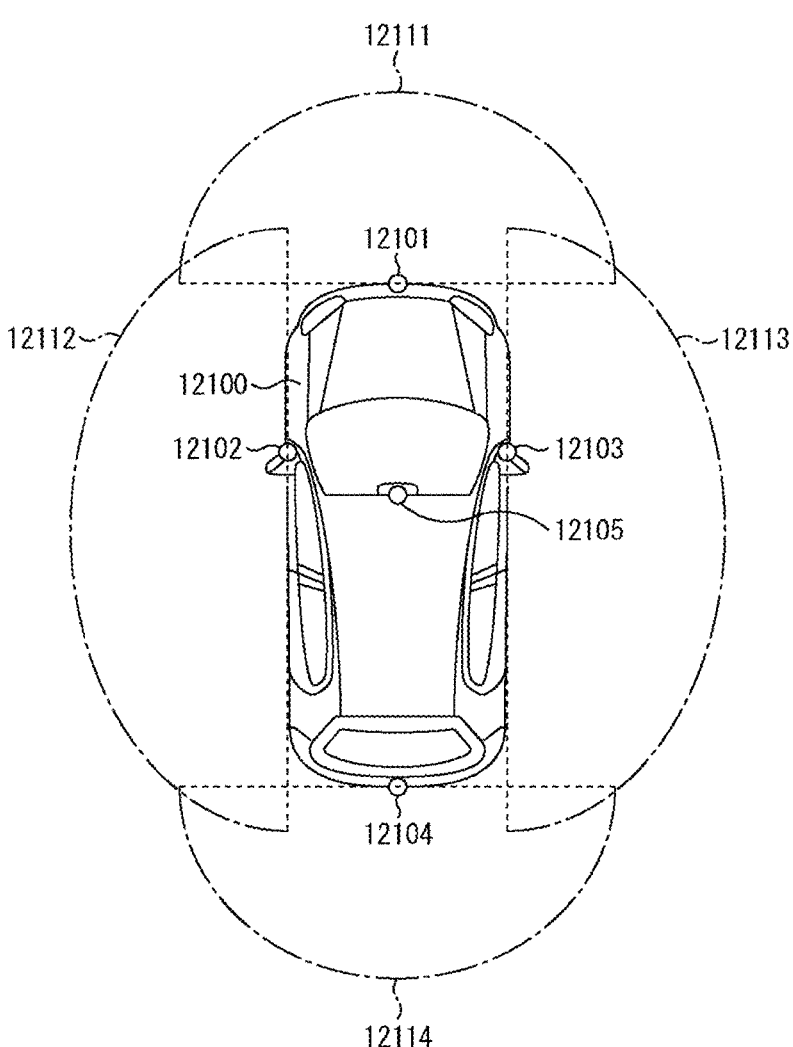
FIG. 65 is an explanatory view illustrating an example of an installation position of an imaging section.

FIG. 65 is a diagram illustrating an example of the installation position of the imaging section 12031.

In FIG. 65, the imaging section 12031 includes imaging sections 12101, 12102, 12103, 12104, and 12105.

The imaging sections 12101, 12102, 12103, 12104, and 12105 are, for example, provided at positions on a front nose, sideview mirrors, a rear bumper, and a back door of the vehicle 12100 as well as a position on an upper portion of a windshield within the interior of the vehicle, for example. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 65 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure may be applied to the imaging section 12031 among the configurations described above. Specifically, for example, the imaging device 100 in FIG. 1 can be applied to the imaging section 12031. By applying the technology according to the present disclosure to the imaging section 12031, it is possible to obtain a captured image that is easier to view by expanding the dynamic range, etc., thereby making it possible to reduce driver fatigue.

Note that the embodiments described above are examples for embodying the present technology, and the matters in the embodiments and the matters used to specify the invention in the claims have a corresponding relationship. Similarly, there is a correspondence relationship between the matters specifying the invention in claims and the matters in the embodiments of the present technology having the same names. However, the present technology is not limited to the embodiments, and can be embodied by applying various modifications to the embodiments without departing from the gist thereof.

Note that, the effects described in the present specification are merely examples and are not limiting, and other effects may also be present.

Note that the present technology may also have the following configuration.

(1) A solid-state imaging element including:

a pre-stage circuit that generates an analog signal as a pixel signal;

a sample-and-hold circuit that holds a high gain signal obtained by amplifying the pixel signal with a predetermined high gain in any of a plurality of capacitor elements, and generates a low gain signal obtained by amplifying the pixel signal with a low gain that is smaller than the high gain and corresponds to a combined capacitance of the plurality of capacitor elements; and a post-stage circuit that sequentially reads and outputs the high gain signal and the low gain signal from the sample-and-hold circuit.

(2) The solid-state imaging element according to (1), in which the plurality of capacitor elements includes a first capacitor element, a second capacitor element, a third capacitor element, and a fourth capacitor element, and the sample-and-hold circuit includes:

the first capacitor element;

the second capacitor element;

the third capacitor element;

the fourth capacitor element; and a selection circuit that connects one or more of the first capacitor element, the second capacitor element, the third capacitor element, and the fourth capacitor element to the post-stage circuit.

(3) The solid-state imaging element according to (2), in which the pre-stage circuit, the sample-and-hold circuit, and the post-stage circuit are disposed in each of a plurality of pixels, a level of the pixel signal includes a reset level when a floating diffusion layer in the pre-stage circuit is initialized and a signal level when a charge is transferred to the floating diffusion layer, the pre-stage circuit generates the reset level immediately before a timing at which exposure of all of the plurality of pixels ends, and generates the signal level at the timing, and the selection circuit connects the first capacitor element to the post-stage circuit immediately before the timing, and connects the third capacitor element to the post-stage circuit at the timing.

(4) The solid-state imaging element according to (3), in which the selection circuit sequentially performs control to connect the first capacitor element to the post-stage circuit, control to connect the first capacitor element and the second capacitor element to the post-stage circuit, control to connect the third capacitor element to the post-stage circuit, and control to connect the third capacitor element and the fourth capacitor element to the post-stage circuit within a read period of the pixel signal.

(5) The solid-state imaging element according to (3), in which the selection circuit sequentially performs control to connect the first capacitor element to the post-stage circuit, control to connect the first capacitor element and the second capacitor element to the post-stage circuit, and control to connect the third capacitor element to the post-stage circuit in a case where it is determined that the signal level does not exceed a predetermined determination value and to connect the third capacitor element and the fourth capacitor element to the post-stage circuit in a case where it is determined that the signal level is higher than the determination value within a read period of the pixel signal.

(6) The solid-state imaging element according to (5), further including a determination circuit that determines whether or not the signal level is higher than the determination value and supplies a determination result to the sample-and-hold circuit.

(7) The solid-state imaging element according to (6), in which the determination circuit is disposed in each of the plurality of pixels.

(8) The solid-state imaging element according to (6), in which the determination circuit is disposed outside the plurality of pixels.

(9) The solid-state imaging element according to (8), in which the determination circuit compares a determination signal corresponding to the determination value with the high gain signal corresponding to the signal level to generate the determination result.

(10) The solid-state imaging element according to (8), further including:

an analog-to-digital converter that converts each of the high gain signal and the low gain signal into a digital signal on the basis of a predetermined ramp signal, in which the determination circuit compares the ramp signal with the high gain signal corresponding to the signal level to generate the determination result.

(11) The solid-state imaging element according to (1), further including:

a coupling circuit, in which the pre-stage circuit, the sample-and-hold circuit, and the post-stage circuit are disposed in each of a plurality of pixels, and the coupling circuit couples the sample-and-hold circuit of each of a pair of pixels among the plurality of pixels.

(12) The solid-state imaging element according to (11), in which the coupling circuit selects and connects one of the sample-and-hold circuit of each of a pair of pixels arranged in a predetermined direction and the sample-and-hold circuit of each of a pair of pixels arranged in a direction perpendicular to the predetermined direction.

(13) The solid-state imaging element according to (1), further including:

a logic circuit that combines a frame in which digital signals obtained by converting the high gain signals are arranged and a frame in which digital signals obtained by converting the low gain signals are arranged.

(14) The solid-state imaging element according to (1), further including:

a post-stage reset transistor that initializes a predetermined post-stage node when the plurality of capacitor elements is disconnected from the post-stage node, in which the plurality of capacitor elements includes a first capacitor element, a second capacitor element, a third capacitor element, and a fourth capacitor element, the post-stage circuit reads the pixel signal via the post-stage node, and the sample-and-hold circuit includes:

the first capacitor element;

the second capacitor element;

the third capacitor element;

the fourth capacitor element; and a selection circuit that sequentially performs control to connect the first capacitor element to the post-stage node, control to disconnect the first capacitor element, the second capacitor element, the third capacitor element, and the fourth capacitor element from the post-stage node, and control to connect the third capacitor element to the post-stage node.

(15) An imaging device including:

a pre-stage circuit that generates an analog signal as a pixel signal;

a sample-and-hold circuit that holds a high gain signal obtained by amplifying the pixel signal with a predetermined high gain in any of a plurality of capacitor elements, and generates a low gain signal obtained by amplifying the pixel signal with a low gain that is smaller than the high gain and corresponds to a combined capacitance of the plurality of capacitor elements;

a post-stage circuit that sequentially reads and outputs the high gain signal and the low gain signal from the sample-and-hold circuit; and a recording unit that records a frame generated from the high gain signal and the low gain signal.

(16) A method for controlling solid-state imaging element, the method including:

a pre-stage procedure in which a pre-stage circuit generates an analog signal as a pixel signal;

a sample-and-hold procedure in which a sample-and-hold circuit holds a high gain signal obtained by amplifying the pixel signal with a predetermined high gain in any of a plurality of capacitor elements, and generates a low gain signal obtained by amplifying the pixel signal with a low gain that is smaller than the high gain and corresponds to a combined capacitance of the plurality of capacitor elements; and a post-stage procedure in which a post-stage circuit sequentially reads and outputs the high gain signal and the low gain signal from the sample-and-hold circuit.

REFERENCE SIGNS LIST

100 Imaging device
110 Imaging lens
120 Recording unit
130 Imaging control unit
200 Solid-state imaging element
201 Upper pixel chip
202 Lower pixel chip
203 Circuit chip
211 Vertical scanning circuit
212 Timing control circuit
213 DAC
220 Pixel array unit 221 Upper pixel array unit
222 Lower pixel array unit
250 Load MOS circuit block
251 Load MOS transistor
260 Column signal processing circuit
270, 451 ADC
271, 453 Counter
280, 452 Comparator
281, 292, 454, 471, 472 Selector
282, 283, 321 to 326, 423 Capacitor element
284, 286 Auto-zero switch
285 Comparator element
300, 300-1, 300-2, 300-3, 300-4 Pixel
301 Effective pixel
310, 310-1, 310-2, 310-3, 310-4 Pre-stage circuit
311 Photoelectric conversion element
312 Transfer transistor
313 FD reset transistor
314, 432 FD
315 Pre-stage amplification transistor
316, 434 Current source transistor
317 Discharge transistor
320, 320-1, 320-2, 320-3, 320-4 Sample-and-hold circuit
327 Pre-stage reset transistor
328 Pre-stage selection transistor
330 Selection circuit
331 to 336 Selection transistor
337 Sampling transistor
338, 457 Determination circuit
341 Post-stage reset transistor
350, 350-1, 350-2, 350-3, 350-4 Post-stage circuit
351, 351-1, 351-2 Post-stage amplification transistor
352, 352-1, 352-2 Post-stage selection transistor
420 Regulator
421 Low-pass filter
422 Buffer amplifier
430 Dummy pixel
431 Reset transistor
433 Amplification transistor
440 Switching unit
441 Inverter
442 Switching circuit
443, 444 Switch
450 Column circuit
455 P-phase holding memory
456 CDS circuit
460 Logic circuit
461 Frame memory
462 Multiplication circuit
463 HDR composition unit
470-1, 470-2, 470-3, 470-4 Coupling circuit
12031 Imaging section

The invention claimed is:

1. A solid-state imaging element comprising:

a pre-stage circuit that generates an analog signal as a pixel signal;

a sample-and-hold circuit that holds a high gain signal obtained by amplifying the pixel signal with a predetermined high gain in any of a plurality of capacitor elements, and generates a low gain signal obtained by amplifying the pixel signal with a low gain that is smaller than the predetermined high gain and corresponds to a combined capacitance of the plurality of capacitor elements; and a post-stage circuit that sequentially reads and outputs the high gain signal and the low gain signal from the sample-and-hold circuit.

2. The solid-state imaging element according to claim 1, wherein the plurality of capacitor elements includes a first capacitor element, a second capacitor element, a third capacitor element, and a fourth capacitor element, and the sample-and-hold circuit includes:

the first capacitor element;

the second capacitor element;

the third capacitor element;

the fourth capacitor element; and a selection circuit that connects one or more of the first capacitor element, the second capacitor element, the third capacitor element, and the fourth capacitor element to the post-stage circuit.

3. The solid-state imaging element according to claim 2, wherein the pre-stage circuit, the sample-and-hold circuit, and the post-stage circuit are disposed in each of a plurality of pixels, a level of the pixel signal includes a reset level when a floating diffusion layer in the pre-stage circuit is initialized and a signal level when a charge is transferred to the floating diffusion layer, the pre-stage circuit generates the reset level immediately before a timing at which exposure of all of the plurality of pixels ends, and generates the signal level at the timing, and the selection circuit connects the first capacitor element to the post-stage circuit immediately before the timing, and connects the third capacitor element to the post-stage circuit at the timing.

4. The solid-state imaging element according to claim 3, wherein the selection circuit sequentially performs control to connect the first capacitor element to the post-stage circuit, control to connect the first capacitor element and the second capacitor element to the post-stage circuit, control to connect the third capacitor element to the post-stage circuit, and control to connect the third capacitor element and the fourth capacitor element to the post-stage circuit within a read period of the pixel signal.

5. The solid-state imaging element according to claim 3, wherein the selection circuit sequentially performs control to connect the first capacitor element to the post-stage circuit, control to connect the first capacitor element and the second capacitor element to the post-stage circuit, and control to connect the third capacitor element to the post-stage circuit in a case where it is determined that the signal level does not exceed a predetermined determination value and to connect the third capacitor element and the fourth capacitor element to the post-stage circuit in a case where it is determined that the signal level is higher than the predetermined determination value within a read period of the pixel signal.

6. The solid-state imaging element according to claim 5, further comprising a determination circuit that determines whether or not the signal level is higher than the predetermined determination value and supplies a determination result to the sample-and-hold circuit.

7. The solid-state imaging element according to claim 6, wherein the determination circuit is disposed in each of the plurality of pixels.

8. The solid-state imaging element according to claim 6, wherein the determination circuit is disposed outside the plurality of pixels.

9. The solid-state imaging element according to claim 8, wherein the determination circuit compares a determination signal corresponding to the predetermined determination value with the high gain signal corresponding to the signal level to generate the determination result.

10. The solid-state imaging element according to claim 8, further comprising:

an analog-to-digital converter that converts each of the high gain signal and the low gain signal into a digital signal on a basis of a predetermined ramp signal, wherein the determination circuit compares the predetermined ramp signal with the high gain signal corresponding to the signal level to generate the determination result.

11. The solid-state imaging element according to claim 1, further comprising:

a coupling circuit, wherein the pre-stage circuit, the sample-and-hold circuit, and the post-stage circuit are disposed in each of a plurality of pixels, and the coupling circuit couples the sample-and-hold circuit of each of a pair of pixels among the plurality of pixels.

12. The solid-state imaging element according to claim 11, wherein the coupling circuit selects and connects one of the sample-and-hold circuit of each of a pair of pixels arranged in a predetermined direction and the sample-and-hold circuit of each of a pair of pixels arranged in a direction perpendicular to the predetermined direction.

13. The solid-state imaging element according to claim 1, further comprising:

a logic circuit that combines a frame in which digital signals obtained by converting high gain signals are arranged and a frame in which digital signals obtained by converting low gain signals are arranged.

14. The solid-state imaging element according to claim 1, further comprising:

a post-stage reset transistor that initializes a predetermined post-stage node when the plurality of capacitor elements is disconnected from the predetermined post-stage node, wherein the plurality of capacitor elements includes a first capacitor element, a second capacitor element, a third capacitor element, and a fourth capacitor element, the post-stage circuit reads the pixel signal via the predetermined post-stage node, and the sample-and-hold circuit includes:

the first capacitor element;

the second capacitor element;

the third capacitor element;

the fourth capacitor element; and a selection circuit that sequentially performs control to connect the first capacitor element to the predetermined post-stage node, control to disconnect the first capacitor element, the second capacitor element, the third capacitor element, and the fourth capacitor element from the predetermined post-stage node, and control to connect the third capacitor element to the predetermined post-stage node.

15. An imaging device comprising:

a pre-stage circuit that generates an analog signal as a pixel signal;

a sample-and-hold circuit that holds a high gain signal obtained by amplifying the pixel signal with a predetermined high gain in any of a plurality of capacitor elements, and generates a low gain signal obtained by amplifying the pixel signal with a low gain that is smaller than the predetermined high gain and corre- sponds to a combined capacitance of the plurality of capacitor elements;

a post-stage circuit that sequentially reads and outputs the high gain signal and the low gain signal from the sample-and-hold circuit; and a recording unit that records a frame generated from the high gain signal and the low gain signal.

16. A method for controlling solid-state imaging element, the method comprising:

a pre-stage procedure in which a pre-stage circuit gener- ates an analog signal as a pixel signal; a sample-and-hold procedure in which a sample-and-hold circuit holds a high gain signal obtained by amplifying the pixel signal with a predetermined high gain in any of a plurality of capacitor elements, and generates a low gain signal obtained by amplifying the pixel signal with a low gain that is smaller than the predetermined high gain and corresponds to a combined capacitance of the plurality of capacitor elements; and a post-stage procedure in which a post-stage circuit sequentially reads and outputs the high gain signal and the low gain signal from the sample-and-hold circuit.

* * * * *